United States Patent
Xiong et al.

(10) Patent No.: US 11,698,170 B2
(45) Date of Patent: Jul. 11, 2023

(54) LED TUBE LAMP

(71) Applicant: JIAXING SUPER LIGHTING ELECTRIC APPLIANCE CO., LTD, Jiaxing (CN)

(72) Inventors: Aiming Xiong, Jiaxing (CN); Wentao Yao, Jiaxing (CN); Hong Xu, Jiaxing (CN)

(73) Assignee: Jiaxing Super Lighting Electric Appliance Co., Ltd., Zhejiang (CN)

( * ) Notice: Subject to any disclaimer, the term of this patent is extended or adjusted under 35 U.S.C. 154(b) by 0 days.

(21) Appl. No.: 17/555,874

(22) Filed: Dec. 20, 2021

(65) Prior Publication Data

US 2022/0112990 A1    Apr. 14, 2022

Related U.S. Application Data

(63) Continuation of application No. 17/136,135, filed on Dec. 29, 2020, now Pat. No. 11,226,073, which is a
(Continued)

(30) Foreign Application Priority Data

Mar. 10, 2015 (CN) .......................... 201510104823.3
Mar. 25, 2015 (CN) ......................... 201510133689.X
(Continued)

(51) Int. Cl.
*F21K 9/278* (2016.01)
*F21K 9/275* (2016.01)
(Continued)

(52) U.S. Cl.
CPC .............. *F21K 9/278* (2016.08); *F21K 9/275* (2016.08); *F21K 9/66* (2016.08); *F21V 3/062* (2018.02);
(Continued)

(58) Field of Classification Search
None
See application file for complete search history.

(56) References Cited

U.S. PATENT DOCUMENTS 1,088,142 A    2/1914 Jesse
4,059,324 A    11/1977 Snyder et al.
(Continued)

FOREIGN PATENT DOCUMENTS

CN    2058533 U    6/1990
CN    1171839 A    1/1998
(Continued)

OTHER PUBLICATIONS

Petition for Inter Parte Review of U.S. Pat. No. 9,897,265 Under 35 U.S.C.311-319 and 37 C.F.R. 42.1-080, 42.100-.123., Nov. 18, 2019.
(Continued)

*Primary Examiner* — Jany Richardson
(74) *Attorney, Agent, or Firm* — Muir Patent Law, PLLC

(57) ABSTRACT

An LED tube lamp comprises: a glass lamp tube; a light diffusion layer disposed on a surface of the glass lamp tube; an LED light strip, which comprises a fixing portion and an extending portion disposed in the glass lamp tube; a plurality of LED light sources mounted on the fixing portion of the LED light strip; a fixing structure disposed between the fixing portion and the inner circumferential surface the glass lamp tube; a power supply module disposed on the fixing structure and electrically connecting to the LED light strip and two end caps attached to two ends of the glass lamp tube respectively. The fixing structure comprises a first end fixedly connected to the inner circumferential surface of the glass lamp tube and a second end fixedly connected to the fixing portion of the LED light strip and not connected to the extending portion of the LED light strip.

20 Claims, 44 Drawing Sheets

Related U.S. Application Data continuation of application No. 16/691,859, filed on Nov. 22, 2019, now Pat. No. 10,890,300, which is a continuation of application No. 16/273,439, filed on Feb. 12, 2019, now Pat. No. 10,487,991, which is a continuation of application No. 15/889,634, filed on Feb. 6, 2018, now Pat. No. 10,240,725, which is a continuation of application No. 15/386,139, filed on Dec. 21, 2016, now Pat. No. 9,897,265, which is a continuation-in-part of application No. 15/055,630, filed on Feb. 28, 2016, now Pat. No. 9,781,805.

(30) Foreign Application Priority Data

| Mar. 26, 2015 | (CN) | ........................ 201510134586.5 |
|---|---|---|
| Apr. 14, 2015 | (CN) | ........................ 201510173861.4 |
| Apr. 22, 2015 | (CN) | ........................ 201510193980.6 |
| May 19, 2015 | (CN) | ........................ 201510259151.3 |
| May 29, 2015 | (CN) | ........................ 201510284720.X |
| Jun. 10, 2015 | (CN) | ........................ 201510315636.X |
| Jun. 12, 2015 | (CN) | ........................ 201510324394.0 |
| Jun. 17, 2015 | (CN) | ........................ 201510338027.6 |
| Jun. 26, 2015 | (CN) | ........................ 201510372375.5 |
| Jun. 26, 2015 | (CN) | ........................ 201510373492.3 |
| Jul. 10, 2015 | (CN) | ........................ 201510406595.5 |
| Jul. 27, 2015 | (CN) | ........................ 201510448220.5 |
| Aug. 7, 2015 | (CN) | ........................ 201510482944.1 |
| Aug. 8, 2015 | (CN) | ........................ 201510483475.5 |
| Aug. 8, 2015 | (CN) | ........................ 201510486115.0 |
| Aug. 14, 2015 | (CN) | ........................ 201510499512.1 |
| Aug. 26, 2015 | (CN) | ........................ 201510530110.3 |
| Sep. 2, 2015 | (CN) | ........................ 201510555543.4 |
| Sep. 6, 2015 | (CN) | ........................ 201510557717.0 |
| Sep. 18, 2015 | (CN) | ........................ 201510595173.7 |
| Oct. 20, 2015 | (CN) | ........................ 201510680883.X |
| Oct. 29, 2015 | (CN) | ........................ 201510724263.1 |
| Oct. 30, 2015 | (CN) | ........................ 201510726484.2 |
| Jan. 26, 2016 | (CN) | ........................ 201610050944.9 |

(51) Int. Cl.

| F21K 9/66 | (2016.01) |
|---|---|
| F21V 25/10 | (2006.01) |
| F21V 3/06 | (2018.01) |
| H05B 45/50 | (2022.01) |
| H05B 45/3578 | (2020.01) |
| H05B 45/3725 | (2020.01) |
| H05B 45/00 | (2022.01) |
| H05B 45/37 | (2020.01) |
| H05B 45/59 | (2022.01) |
| F21Y 115/10 | (2016.01) |
| F21Y 103/10 | (2016.01) |
| H05B 45/345 | (2020.01) |
| H05B 45/36 | (2020.01) |

(52) U.S. Cl.
CPC ............. *F21V 25/10* (2013.01); *H05B 45/00* (2020.01); *H05B 45/3578* (2020.01); *H05B 45/37* (2020.01); *H05B 45/3725* (2020.01); *H05B 45/50* (2020.01); *H05B 45/59* (2022.01); *F21Y 2103/10* (2016.08); *F21Y 2115/10* (2016.08); *H05B 45/345* (2020.01); *H05B 45/36* (2020.01)

(56) References Cited

U.S. PATENT DOCUMENTS

| 5,616,990 A | 4/1997 | Garbowicz et al. |
|---|---|---|
| 5,920,465 A | 7/1999 | Tanaka |
| 5,936,599 A | 8/1999 | Reymond |
| 5,964,518 A | 10/1999 | Shen |
| 6,118,072 A | 9/2000 | Scott |
| 6,186,649 B1 | 2/2001 | Zou et al. |
| 6,246,167 B1 | 6/2001 | Sica |
| 6,365,841 B1 | 4/2002 | Takigami |
| 6,703,795 B2 | 3/2004 | Johnson |
| 6,762,562 B2 | 7/2004 | Leong |
| 6,846,094 B2 | 1/2005 | Luk |
| 6,853,151 B2 | 2/2005 | Leong et al. |
| 6,860,628 B2 | 3/2005 | Robertson et al. |
| 7,049,761 B2 | 5/2006 | Timmermans et al. |
| 7,067,032 B1 | 6/2006 | Bremont et al. |
| 7,067,992 B2 | 6/2006 | Leong et al. |
| 7,086,747 B2 | 8/2006 | Nielson et al. |
| 7,114,830 B2 | 10/2006 | Robertson et al. |
| 7,256,505 B2 | 8/2007 | Arms et al. |
| 7,380,961 B2 | 6/2008 | Moriyama et al. |
| 7,399,429 B2 | 7/2008 | Liu et al. |
| 7,482,059 B2 | 1/2009 | Peng et al. |
| 7,557,521 B2 | 7/2009 | Lys |
| 7,594,738 B1 | 9/2009 | Lin et al. |
| 7,611,260 B1 | 11/2009 | Lin |
| 7,766,536 B2 | 8/2010 | Peifer et al. |
| 7,806,541 B2 | 10/2010 | Schug et al. |
| 7,815,338 B2 | 10/2010 | Siemiet et al. |
| 7,887,226 B2 | 2/2011 | Huang et al. |
| 7,914,193 B2 | 3/2011 | Peifer et al. |
| 7,918,598 B2 | 4/2011 | Peifer et al. |
| 7,926,975 B2 | 4/2011 | Siemiet |
| 7,929,100 B2 | 4/2011 | Kim |
| 7,966,075 B2 | 6/2011 | Johnson et al. |
| 8,007,286 B1 | 8/2011 | Holec et al. |
| 8,093,823 B1 | 1/2012 | Ivey et al. |
| 8,134,297 B2 | 3/2012 | Busse et al. |
| 8,143,803 B2 | 3/2012 | Beij et al. |
| 8,240,875 B2 | 8/2012 | Roberts et al. |
| 8,247,999 B2 | 8/2012 | Chen et al. |
| 8,304,993 B2 | 11/2012 | Tzou et al. |
| 8,330,381 B2 | 12/2012 | Langovsky |
| 8,358,056 B2 | 1/2013 | Park |
| 8,360,599 B2 | 1/2013 | Ivey et al. |
| 8,381,299 B2 | 2/2013 | Burdalski et al. |
| 8,427,070 B2 | 4/2013 | Matsuda |
| 8,441,824 B2 | 5/2013 | Eberbaum |
| 8,456,075 B2 | 6/2013 | Axelsson |
| 8,461,602 B2 | 6/2013 | Lerman et al. |
| 8,482,212 B1 | 7/2013 | Ivey et al. |
| 8,558,255 B2 | 10/2013 | Bisberg |
| 8,591,057 B2 | 11/2013 | KaWabata et al. |
| 8,602,604 B2 | 12/2013 | Zhang et al. |
| 8,608,351 B2 | 12/2013 | Peifer |
| 8,624,509 B2 | 1/2014 | Hartikka et al. |
| 8,684,566 B2 | 4/2014 | Bretschneider et al. |
| 8,729,809 B2 | 5/2014 | Kit et al. |
| 8,740,410 B2 | 6/2014 | Peifer et al. |
| 8,749,167 B2 | 6/2014 | Hsia et al. |
| 8,757,832 B2 | 6/2014 | Kim |
| 8,773,031 B2 | 7/2014 | Sadwick |
| 8,779,679 B2 | 7/2014 | Miyamichi |
| 8,789,970 B2 | 7/2014 | Mahowald |
| 8,791,650 B2 | 7/2014 | Shan |
| 8,792,253 B2 | 7/2014 | Wang et al. |
| 8,796,943 B2 | 8/2014 | Miyamichi |
| 8,833,965 B2 | 9/2014 | Shimasaki et al. |
| 8,841,897 B2 | 9/2014 | Williams et al. |
| 8,866,396 B2 | 10/2014 | Timmermans et al. |
| 8,870,415 B2 | 10/2014 | Ivey |
| 8,872,437 B2 | 10/2014 | Esaki et al. |
| 8,888,976 B2 | 11/2014 | Zhang et al. |
| 8,896,207 B2 | 11/2014 | Thomas et al. |
| 8,907,556 B2 | 12/2014 | Park |
| 8,915,611 B2 | 12/2014 | Zhang |

(56) References Cited

U.S. PATENT DOCUMENTS

| | | |
|---|---|---|
| 8,931,918 B2 | 1/2015 | Liu et al. |
| 9,000,668 B2 | 4/2015 | Qiu |
| 9,006,993 B1 | 4/2015 | Timmermans et al. |
| 9,016,890 B2 | 4/2015 | Kim et al. |
| 9,028,105 B2 | 5/2015 | Barnetson et al. |
| 9,033,545 B2 | 5/2015 | Barnetson et al. |
| 9,066,403 B2 | 6/2015 | Neser et al. |
| 9,103,953 B2 | 8/2015 | Gardner et al. |
| 9,146,017 B2 | 9/2015 | Van Der Wei et al. |
| 9,148,922 B2 | 9/2015 | Shteynberg et al. |
| 9,151,475 B2 | 10/2015 | Huang et al. |
| 9,163,818 B2 | 10/2015 | Hsia et al. |
| 9,184,518 B2 | 11/2015 | Ivey et al. |
| 9,206,970 B2 | 12/2015 | Halliwell et al. |
| 9,210,774 B2 | 12/2015 | Kim et al. |
| 9,222,659 B2 | 12/2015 | Medendorp, Jr. et al. |
| 9,228,727 B2 | 1/2016 | May |
| 9,234,632 B2 | 1/2016 | Kawabata |
| 9,237,610 B2 | 1/2016 | Neser et al. |
| 9,239,157 B2 | 1/2016 | Özgüc et al. |
| 9,243,757 B2 | 1/2016 | Barnetson et al. |
| 9,271,354 B2 | 2/2016 | Takahashi et al. |
| 9,277,603 B2 | 3/2016 | Hsia |
| 9,288,867 B2 | 3/2016 | Hsia et al. |
| 9,288,879 B2 | 3/2016 | Tao et al. |
| 9,322,531 B2 | 4/2016 | Liang et al. |
| 9,328,874 B2 | 5/2016 | Demuynck et al. |
| 9,338,853 B2 | 5/2016 | Guang |
| 9,360,188 B2 | 6/2016 | Kircher et al. |
| 9,388,948 B2 | 7/2016 | Demuynck |
| 9,420,663 B1 | 8/2016 | Hsia et al. |
| 9,445,463 B2 | 9/2016 | Choi et al. |
| 9,448,660 B2 | 9/2016 | Seo et al. |
| 9,462,658 B1 | 10/2016 | Kim |
| 9,464,793 B2 | 10/2016 | May |
| 9,468,046 B2 | 10/2016 | Barnetson et al. |
| 9,468,054 B2 | 10/2016 | Barnetson et al. |
| 9,468,060 B2 | 10/2016 | Barnetson et al. |
| 9,480,109 B2 | 10/2016 | Ye et al. |
| 9,480,123 B2 | 10/2016 | Van Dijk et al. |
| 9,488,767 B2 | 11/2016 | Nava et al. |
| 9,496,795 B2 | 11/2016 | Morota et al. |
| 9,497,821 B2 | 11/2016 | Liu |
| 9,521,718 B2 | 12/2016 | Xiong et al. |
| 9,526,133 B2 | 12/2016 | Tao et al. |
| 9,526,145 B2 | 12/2016 | Xiong et al. |
| 9,541,274 B2 | 1/2017 | Bertram et al. |
| 9,551,463 B2 | 1/2017 | Barnetson et al. |
| 9,551,480 B2 | 1/2017 | Speer |
| 9,574,717 B2 | 2/2017 | Scapa et al. |
| 9,585,221 B1 | 2/2017 | Chen |
| 9,587,817 B2 | 3/2017 | Liu et al. |
| 9,609,711 B2 | 3/2017 | Jiang et al. |
| 9,618,168 B1 | 4/2017 | Jiang et al. |
| 9,622,317 B2 | 4/2017 | Ackermann |
| 9,625,129 B2 | 4/2017 | Jiang et al. |
| 9,625,137 B2 | 4/2017 | Li et al. |
| 9,629,211 B2 | 4/2017 | Xiong et al. |
| 9,629,215 B2 | 4/2017 | Xiong et al. |
| 9,629,216 B2 | 4/2017 | Jiang et al. |
| 9,668,308 B2 | 5/2017 | Hsia |
| 9,689,536 B2 | 6/2017 | Xiong et al. |
| 9,723,662 B2 | 8/2017 | Ye et al. |
| 9,726,330 B2 | 8/2017 | Wilcox et al. |
| 9,743,467 B2 | 8/2017 | Malyna et al. |
| 9,750,096 B2 | 8/2017 | Xiong et al. |
| D797,323 S | 9/2017 | Yang et al. |
| 9,756,698 B2 | 9/2017 | Xiong et al. |
| 9,765,935 B2 | 9/2017 | Rowlete, Jr. et al. |
| 9,775,215 B2 | 9/2017 | Xiong et al. |
| 9,777,891 B2 | 10/2017 | Kawabata et al. |
| 9,781,805 B2 | 10/2017 | Xiong et al. |
| 9,791,139 B2 | 10/2017 | Van Delden et al. |
| 9,794,990 B2 | 10/2017 | Ye et al. |
| 9,795,001 B2 | 10/2017 | Ye et al. |
| 9,801,240 B2 | 10/2017 | Xiong et al. |
| 9,807,826 B2 | 10/2017 | Xiong et al. |
| 9,810,384 B2 | 11/2017 | Yingchun |
| 9,820,341 B2 | 11/2017 | Xiong et al. |
| 9,826,585 B2 | 11/2017 | Xiong |
| 9,826,595 B2 | 11/2017 | Hsia |
| 9,839,081 B2 | 12/2017 | Park |
| 9,841,174 B2 | 12/2017 | Liu et al. |
| 9,864,438 B2 | 1/2018 | Seo et al. |
| 9,883,555 B2 | 1/2018 | Deng et al. |
| 9,885,449 B2 | 2/2018 | Jiang |
| 9,894,732 B2 | 2/2018 | Xiong et al. |
| 9,897,265 B2 | 2/2018 | Xiong et al. |
| 9,920,887 B2 | 3/2018 | Wilhelmus et al. |
| 9,927,100 B2 | 3/2018 | Rowlette, Jr. et al. |
| 9,945,542 B2 | 4/2018 | Evitt |
| 9,958,117 B2 | 5/2018 | Engel et al. |
| 9,958,118 B2 | 5/2018 | Luo et al. |
| 9,970,602 B2 | 5/2018 | Xiong et al. |
| 9,970,640 B2 | 5/2018 | Zhao |
| 9,989,200 B2 | 6/2018 | Yingchun |
| 10,021,742 B2 | 7/2018 | Jiang |
| 10,045,406 B2 | 8/2018 | Zhang |
| 10,104,723 B2 | 10/2018 | Zhang |
| 10,117,296 B1 | 10/2018 | Zhao |
| 10,161,569 B2 | 12/2018 | Xu et al. |
| 10,176,689 B2 | 1/2019 | Ivey et al. |
| 10,199,714 B2 | 2/2019 | Ge et al. |
| 10,205,265 B2 | 2/2019 | Wu et al. |
| 10,208,898 B2 | 2/2019 | Xiong et al. |
| 10,281,092 B2 | 5/2019 | Xiong et al. |
| 10,288,272 B2 | 5/2019 | Yao et al. |
| 10,299,333 B2 | 5/2019 | Xiong et al. |
| 10,317,017 B2 | 6/2019 | Xiong et al. |
| 10,337,676 B2 | 7/2019 | Xiong et al. |
| 10,560,989 B2 | 2/2020 | Jiang et al. |
| 10,645,784 B1 | 5/2020 | Lu et al. |
| 10,697,593 B2 | 6/2020 | Yingchun |
| 11,122,665 B1 | 9/2021 | He |
| 11,262,028 B2 | 3/2022 | Janik et al. |
| 2002/0093082 A1 | 7/2002 | Miyamoto et al. |
| 2002/0176262 A1 | 11/2002 | Tripathi et al. |
| 2003/0102819 A1 | 6/2003 | Min et al. |
| 2003/0189829 A1 | 10/2003 | Shimizu et al. |
| 2004/0007980 A1 | 1/2004 | Shibata |
| 2004/0026006 A1 | 2/2004 | Arai et al. |
| 2004/0095078 A1 | 5/2004 | Leong |
| 2004/0189218 A1 | 9/2004 | Leong et al. |
| 2005/0162101 A1 | 7/2005 | Leong et al. |
| 2005/0162850 A1 | 7/2005 | Luk et al. |
| 2005/0168123 A1 | 8/2005 | Taniwa |
| 2005/0185396 A1 | 8/2005 | Kutler |
| 2005/0281030 A1 | 12/2005 | Leong |
| 2006/0146527 A1 | 7/2006 | VanderSchuit |
| 2007/0001709 A1 | 1/2007 | Shen |
| 2007/0103902 A1 | 5/2007 | Hsiao |
| 2007/0127242 A1 | 6/2007 | Allen et al. |
| 2007/0267976 A1 | 11/2007 | Bohler et al. |
| 2008/0037245 A1 | 2/2008 | Chan |
| 2008/0055894 A1 | 3/2008 | Deng et al. |
| 2008/0192476 A1 | 8/2008 | Mirai |
| 2008/0290814 A1 | 11/2008 | Leong et al. |
| 2009/0040415 A1 | 2/2009 | Kim |
| 2009/0045715 A1 | 2/2009 | Shantha et al. |
| 2009/0159919 A1 | 6/2009 | Simon et al. |
| 2009/0160369 A1 | 6/2009 | Godbole et al. |
| 2009/0219713 A1 | 9/2009 | Siemiet et al. |
| 2009/0290334 A1 | 11/2009 | Ivey et al. |
| 2010/0033964 A1 | 2/2010 | Choi et al. |
| 2010/0053394 A1 | 3/2010 | Kinoshita |
| 2010/0066230 A1 | 3/2010 | Lin et al. |
| 2010/0096976 A1 | 4/2010 | Park et al. |
| 2010/0102729 A1 | 4/2010 | Katzir et al. |
| 2010/0103673 A1 | 4/2010 | Ivey |
| 2010/0185772 A1 | 4/2010 | Song et al. |
| 2010/0124054 A1 | 5/2010 | Chen et al. |
| 2010/0135009 A1 | 6/2010 | Duncan et al. |
| 2010/0157608 A1 | 6/2010 | Chen et al. |
| 2010/0181925 A1 | 7/2010 | Ivey et al. |

(56) References Cited

U.S. PATENT DOCUMENTS

| | | |
|---|---|---|
| 2010/0188001 A1 | 7/2010 | Broitzman et al. |
| 2010/0201239 A1 | 8/2010 | Mostoller et al. |
| 2010/0201269 A1 | 8/2010 | Tzou et al. |
| 2010/0220469 A1 | 9/2010 | Ivey et al. |
| 2010/0253226 A1 | 10/2010 | Oki |
| 2010/0265732 A1 | 10/2010 | Liu |
| 2010/0277918 A1 | 11/2010 | Chen et al. |
| 2010/0289428 A1 | 11/2010 | Frazier et al. |
| 2011/0006688 A1 | 1/2011 | Shim |
| 2011/0019421 A1 | 1/2011 | Lai |
| 2011/0038146 A1 | 2/2011 | Chen |
| 2011/0043127 A1 | 2/2011 | Yamasaki |
| 2011/0057572 A1 | 3/2011 | Kit et al. |
| 2011/0080110 A1 | 4/2011 | Nuhfer et al. |
| 2011/0084554 A1 | 4/2011 | Tian |
| 2011/0084608 A1 | 4/2011 | Lin et al. |
| 2011/0084627 A1 | 4/2011 | Sloan et al. |
| 2011/0121756 A1 | 5/2011 | Thomas et al. |
| 2011/0148313 A1 | 6/2011 | Ramaker et al. |
| 2011/0149563 A1 | 6/2011 | Hsia et al. |
| 2011/0175536 A1 | 7/2011 | Fujita et al. |
| 2011/0176297 A1 | 7/2011 | Hsia et al. |
| 2011/0205738 A1 | 8/2011 | Peifer et al. |
| 2011/0228526 A1 | 9/2011 | Hartikka et al. |
| 2011/0234107 A1 | 9/2011 | Simon et al. |
| 2011/0260614 A1 | 10/2011 | Hartikka et al. |
| 2011/0279063 A1 | 11/2011 | Wang et al. |
| 2011/0291154 A1 | 12/2011 | Noichi et al. |
| 2011/0291592 A1 | 12/2011 | Anissimov |
| 2011/0305021 A1 | 12/2011 | Chang |
| 2011/0309745 A1 | 12/2011 | Westermarck et al. |
| 2012/0008316 A1 | 1/2012 | Ivey |
| 2012/0026761 A1 | 2/2012 | Young |
| 2012/0038289 A1 | 2/2012 | Jee et al. |
| 2012/0047598 A1 | 2/2012 | Wohleser |
| 2012/0049684 A1 | 3/2012 | Bodenstein et al. |
| 2012/0051039 A1 | 3/2012 | Chang |
| 2012/0069556 A1 | 3/2012 | Bertram et al. |
| 2012/0092856 A1 | 4/2012 | Zhang et al. |
| 2012/0113659 A1 | 5/2012 | Hermitte et al. |
| 2012/0146503 A1 | 6/2012 | Negley et al. |
| 2012/0147564 A1 | 6/2012 | Russell et al. |
| 2012/0147598 A1 | 6/2012 | Ivey |
| 2012/0155116 A1 | 6/2012 | Gardner |
| 2012/0161666 A1 | 6/2012 | Antony et al. |
| 2012/0162965 A1 | 6/2012 | Takeuchi et al. |
| 2012/0170260 A1 | 7/2012 | Gardner et al. |
| 2012/0176784 A1 | 7/2012 | Peifer et al. |
| 2012/0181952 A1 | 7/2012 | Roeer |
| 2012/0201908 A1 | 8/2012 | Miller |
| 2012/0206433 A1 | 8/2012 | Suzuki et al. |
| 2012/0212951 A1 | 8/2012 | Lai et al. |
| 2012/0230019 A1 | 9/2012 | Peifer |
| 2012/0248986 A1 | 10/2012 | Gibbs |
| 2012/0248989 A1 | 10/2012 | Ikami |
| 2012/0249014 A1 | 10/2012 | Mei |
| 2012/0256551 A1 | 10/2012 | Kim et al. |
| 2012/0257383 A1 | 10/2012 | Zhang |
| 2012/0293991 A1 | 11/2012 | Lin |
| 2012/0299500 A1 | 11/2012 | Sadwick et al. |
| 2012/0299501 A1 | 11/2012 | Kost et al. |
| 2012/0300445 A1 | 11/2012 | Chu et al. |
| 2012/0300501 A1 | 11/2012 | Kojima et al. |
| 2012/0312590 A1 | 12/2012 | Maeda et al. |
| 2012/0313265 A1 | 12/2012 | Yamanishi |
| 2012/0313540 A1 | 12/2012 | Lin et al. |
| 2012/0319150 A1 | 12/2012 | Shimomura et al. |
| 2013/0003346 A1 | 1/2013 | Letoquin et al. |
| 2013/0010453 A1 | 1/2013 | Mahowald |
| 2013/0010459 A1 | 1/2013 | Wilson |
| 2013/0021809 A1 | 1/2013 | Dellian et al. |
| 2013/0033881 A1 | 2/2013 | Terazawa et al. |
| 2013/0033888 A1 | 2/2013 | Van Der Wel et al. |
| 2013/0048342 A1 | 2/2013 | Malstrom et al. |
| 2013/0050998 A1 | 2/2013 | Chu et al. |
| 2013/0051008 A1 | 2/2013 | Shew |
| 2013/0058080 A1 | 3/2013 | Ge et al. |
| 2013/0069538 A1 | 3/2013 | So |
| 2013/0076255 A1 | 3/2013 | Kang et al. |
| 2013/0119869 A1 | 5/2013 | Peng |
| 2013/0127327 A1 | 5/2013 | Heil et al. |
| 2013/0135852 A1 | 5/2013 | Chan et al. |
| 2013/0135857 A1 | 5/2013 | Chen et al. |
| 2013/0141890 A1 | 6/2013 | Carlin et al. |
| 2013/0147350 A1 | 6/2013 | Yang |
| 2013/0170196 A1 | 7/2013 | Huang et al. |
| 2013/0182407 A1 | 7/2013 | Wu |
| 2013/0182425 A1 | 7/2013 | Seki et al. |
| 2013/0207534 A1 | 8/2013 | Masuda et al. |
| 2013/0215609 A1 | 8/2013 | Liu et al. |
| 2013/0223053 A1 | 8/2013 | Liu et al. |
| 2013/0229104 A1 | 9/2013 | Green et al. |
| 2013/0230995 A1 | 9/2013 | Ivey et al. |
| 2013/0234620 A1 | 9/2013 | Wang et al. |
| 2013/0235570 A1 | 9/2013 | Hood et al. |
| 2013/0250565 A1 | 9/2013 | Chiang et al. |
| 2013/0256704 A1 | 10/2013 | Hsiao et al. |
| 2013/0258650 A1 | 10/2013 | Sharrah |
| 2013/0258668 A1 | 10/2013 | Delian et al. |
| 2013/0293098 A1 | 11/2013 | Li et al. |
| 2013/0301255 A1 | 11/2013 | Kim et al. |
| 2013/0313983 A1 | 11/2013 | Radermacher |
| 2013/0320869 A1 | 12/2013 | Jans et al. |
| 2013/0335959 A1 | 12/2013 | Hsia et al. |
| 2014/0009076 A1 | 1/2014 | Tsuda |
| 2014/0009923 A1 | 1/2014 | Wu et al. |
| 2014/0015345 A1 | 1/2014 | Ivey et al. |
| 2014/0035463 A1 | 2/2014 | Miyamichi |
| 2014/0055029 A1 | 2/2014 | Jans |
| 2014/0062320 A1 | 3/2014 | Urano et al. |
| 2014/0070396 A1 | 3/2014 | Kyozuka et al. |
| 2014/0078771 A1 | 3/2014 | Chen et al. |
| 2014/0084701 A1 | 3/2014 | Bae |
| 2014/0084800 A1 | 3/2014 | Lee |
| 2014/0117853 A1 | 5/2014 | Miyamichi |
| 2014/0153231 A1 | 6/2014 | Bittmann |
| 2014/0185269 A1 | 7/2014 | Li |
| 2014/0192526 A1 | 7/2014 | Qiu |
| 2014/0203717 A1 | 7/2014 | Zhang |
| 2014/0218892 A1 | 8/2014 | Edwards et al. |
| 2014/0218908 A1 | 8/2014 | Kawashima et al. |
| 2014/0225519 A1 | 8/2014 | Yu et al. |
| 2014/0226320 A1 | 8/2014 | Halliwell et al. |
| 2014/0239827 A1 | 8/2014 | Park |
| 2014/0239834 A1 | 8/2014 | Choi et al. |
| 2014/0265899 A1 | 9/2014 | Sadwick |
| 2014/0265900 A1 | 9/2014 | Sadwick et al. |
| 2014/0306599 A1 | 10/2014 | Edwards et al. |
| 2014/0328065 A1 | 11/2014 | Barnetson et al. |
| 2014/0328066 A1 | 11/2014 | Barnetson et al. |
| 2014/0331532 A1 | 11/2014 | Deppiesse |
| 2015/0021988 A1 | 1/2015 | Barnetson et al. |
| 2015/0022114 A1 | 1/2015 | Kim |
| 2015/0049473 A1 | 2/2015 | Pan et al. |
| 2015/0049490 A1 | 2/2015 | Barnetson et al. |
| 2015/0061520 A1 | 3/2015 | Tao et al. |
| 2015/0070885 A1 | 3/2015 | Petro et al. |
| 2015/0077001 A1 | 3/2015 | Takahashi et al. |
| 2015/0173138 A1 | 6/2015 | Roberts |
| 2015/0176770 A1 | 6/2015 | Wilcox et al. |
| 2015/0181661 A1 | 6/2015 | Hsia et al. |
| 2015/0195880 A1 | 7/2015 | Barnetson et al. |
| 2015/0195889 A1 | 7/2015 | Chou et al. |
| 2015/0198291 A1 | 7/2015 | Lin et al. |
| 2015/0223303 A1 | 8/2015 | Hsia et al. |
| 2015/0241000 A1 | 8/2015 | Barnetson et al. |
| 2015/0252958 A1 | 9/2015 | Barnetson et al. |
| 2015/0327368 A1 | 11/2015 | Su et al. |
| 2015/0345712 A1 | 12/2015 | Purdy |
| 2015/0345755 A1 | 12/2015 | Purdy |
| 2015/0359059 A1 | 12/2015 | Barnetson et al. |
| 2015/0366008 A1 | 12/2015 | Barnetson et al. |
| 2016/0010804 A1 | 1/2016 | Barnetson et al. |
| 2016/0018061 A1 | 1/2016 | Barnetson et al. |

(56) References Cited

U.S. PATENT DOCUMENTS

| | | |
|---|---|---|
| 2016/0081147 A1 | 3/2016 | Guang |
| 2016/0084449 A1 | 3/2016 | Speer et al. |
| 2016/0084455 A1 | 3/2016 | Chen |
| 2016/0091147 A1 | 3/2016 | Jiang et al. |
| 2016/0091179 A1 | 3/2016 | Jiang et al. |
| 2016/0109109 A1 | 4/2016 | Yingchun |
| 2016/0113091 A1 | 4/2016 | Tao |
| 2016/0128154 A1 | 5/2016 | Barnetson et al. |
| 2016/0174307 A1 | 6/2016 | Tao |
| 2016/0174329 A1 | 6/2016 | Su et al. |
| 2016/0178137 A1 | 6/2016 | Jiang |
| 2016/0219658 A1 | 7/2016 | Xiong et al. |
| 2016/0262220 A1 | 9/2016 | Barnetson et al. |
| 2016/0270163 A1 | 9/2016 | Hu et al. |
| 2016/0286621 A1 | 9/2016 | Tao et al. |
| 2016/0305641 A1 | 10/2016 | Lin et al. |
| 2016/0316533 A1 | 10/2016 | Hsia |
| 2016/0341414 A1 | 11/2016 | Jiang |
| 2016/0345394 A1 | 11/2016 | Warren et al. |
| 2016/0369952 A1 | 12/2016 | Weekamp |
| 2016/0381760 A1 | 12/2016 | Xiong et al. |
| 2017/0006672 A1 | 1/2017 | Barneston et al. |
| 2017/0059096 A1 | 3/2017 | Xu et al. |
| 2017/0067627 A1 | 3/2017 | Liu et al. |
| 2017/0079115 A1 | 3/2017 | Hsia |
| 2017/0089521 A1 | 3/2017 | Jiang |
| 2017/0089525 A1 | 3/2017 | Xiong et al. |
| 2017/0089530 A1 | 3/2017 | Jiang |
| 2017/0094746 A1 | 3/2017 | Xiong et al. |
| 2017/0094748 A1 | 3/2017 | Park |
| 2017/0105263 A1 | 4/2017 | Xiong et al. |
| 2017/0130911 A1 | 5/2017 | Li et al. |
| 2017/0159894 A1 | 6/2017 | Jiang |
| 2017/0167664 A1 | 6/2017 | Li et al. |
| 2017/0184294 A1 | 6/2017 | Tao |
| 2017/0211753 A1 | 7/2017 | Jiang et al. |
| 2017/0219169 A1 | 8/2017 | Jiang |
| 2017/0290119 A1 | 10/2017 | Xiong et al. |
| 2017/0311397 A1 | 10/2017 | Hsia |
| 2017/0311398 A1 | 10/2017 | Jiang et al. |
| 2017/0318678 A1 | 11/2017 | Miao et al. |
| 2018/0209593 A1 | 7/2018 | Luo et al. |
| 2018/0259135 A1 | 9/2018 | Xiong et al. |
| 2018/0310370 A1 | 10/2018 | Heilman et al. |
| 2018/0335200 A1 | 11/2018 | Jiang et al. |
| 2019/0041008 A1 | 2/2019 | Xiong et al. |
| 2019/0137047 A1 | 5/2019 | Hu |
| 2019/0277484 A1 | 9/2019 | Kwisthout |
| 2020/0240594 A1 | 7/2020 | Jiang et al. |

FOREIGN PATENT DOCUMENTS

| | | | |
|---|---|---|---|
| CN | 1292930 A | 4/2001 | |
| CN | 2498692 Y | 7/2002 | |
| CN | 1460165 A | 12/2003 | |
| CN | 2802892 Y | 8/2006 | |
| CN | 1914458 A | 2/2007 | |
| CN | 2911390 Y | 6/2007 | |
| CN | 200965185 Y | 10/2007 | |
| CN | 200980183 Y | 11/2007 | |
| CN | 101092545 A | 12/2007 | |
| CN | 200997391 Y | 12/2007 | |
| CN | 201014273 Y | 1/2008 | |
| CN | 101182919 A | 5/2008 | |
| CN | 101200622 A | 6/2008 | |
| CN | 101208195 A | 6/2008 | |
| CN | 101228393 A | 7/2008 | |
| CN | 101320669 A | 12/2008 | |
| CN | 101352105 A | 1/2009 | |
| CN | 201247758 Y | 5/2009 | |
| CN | 201255393 Y | 6/2009 | |
| CN | 201363601 Y | 12/2009 | |
| CN | 201377712 Y | 1/2010 | |
| CN | 201391776 Y | 1/2010 | |
| CN | 201437921 U | 4/2010 | |
| CN | 101715265 A | 5/2010 | |
| CN | 201515528 U | 6/2010 | |
| CN | 101787255 A | 7/2010 | |
| CN | 101787273 A | 7/2010 | |
| CN | 101806444 A | 8/2010 | |
| CN | 201555053 U | 8/2010 | |
| CN | 101922640 A | 12/2010 | |
| CN | 201661897 U | 12/2010 | |
| CN | 101945512 A | 1/2011 | |
| CN | 101968168 A | 2/2011 | |
| CN | 201731327 U | 2/2011 | |
| CN | 201739830 U | 2/2011 | |
| CN | 102014560 A | 4/2011 | |
| CN | 102016661 A | 4/2011 | |
| CN | 201796567 U | 4/2011 | |
| CN | 201827683 U | 5/2011 | |
| CN | 102109125 A | 6/2011 | |
| CN | 201851921 U | 6/2011 | |
| CN | 201852052 U | 6/2011 | |
| CN | 201866575 U | 6/2011 | |
| CN | 102116460 A | 7/2011 | |
| CN | 102121690 A | 7/2011 | |
| CN | 201904973 U | 7/2011 | |
| CN | 102155642 A | 8/2011 | |
| CN | 102159867 A | 8/2011 | |
| CN | 102162583 A | 8/2011 | |
| CN | 201954169 U | 8/2011 | |
| CN | 201954350 U | 8/2011 | |
| CN | 201964162 U | 9/2011 | |
| CN | 102216671 A | 10/2011 | |
| CN | 102226504 A | 10/2011 | |
| CN | 202012753 U | 10/2011 | |
| CN | 202059618 U | 11/2011 | |
| CN | 102287737 A | 12/2011 | |
| CN | 202100985 U | 1/2012 | |
| CN | 202100996 U | 1/2012 | |
| CN | 202120982 U | 1/2012 | |
| CN | 202125774 U | 1/2012 | |
| CN | 102355780 A | 2/2012 | |
| CN | 102359697 A | 2/2012 | |
| CN | 202132647 U | 2/2012 | |
| CN | 102376843 A | 3/2012 | |
| CN | 102410458 A | 4/2012 | |
| CN | 202216003 U | 5/2012 | |
| CN | 102518972 A | 6/2012 | |
| CN | 202281101 U | 6/2012 | |
| CN | 202302841 U | 7/2012 | |
| CN | 102625525 A | 8/2012 | |
| CN | 102635804 A | 8/2012 | |
| CN | 202392485 U | 8/2012 | |
| CN | 102720901 A | 10/2012 | |
| CN | 102738355 A | 10/2012 | |
| CN | 202469638 U | 10/2012 | |
| CN | 202493914 U | 10/2012 | |
| CN | 102777788 A | 11/2012 | |
| CN | 202546288 U | 11/2012 | |
| CN | 202546330 U | 11/2012 | |
| CN | 202546668 U | 11/2012 | |
| CN | 102818213 A | 12/2012 | |
| CN | 102829364 A | 12/2012 | |
| CN | 102889446 A | 1/2013 | |
| CN | 202660350 U | 1/2013 | |
| CN | 102155642 B | 2/2013 | |
| CN | 102932997 A | 2/2013 | |
| CN | 202721866 U | 2/2013 | |
| CN | 103016984 A | 4/2013 | |
| CN | 202852551 U | 4/2013 | |
| CN | 202884614 U | 4/2013 | |
| CN | 103094451 A | 5/2013 | |
| CN | 103096586 A | 5/2013 | |
| CN | 202955542 U | 5/2013 | |
| CN | 202972731 U | 6/2013 | |
| CN | 103195999 A | 7/2013 | |
| CN | 203036285 U | 7/2013 | |
| CN | 203036295 U | 7/2013 | |
| CN | 203068187 U | 7/2013 | |
| CN | 101715265 B | 8/2013 | |
| CN | 103270618 A | 8/2013 | |
| CN | 203115646 U | 8/2013 | |

(56) References Cited

FOREIGN PATENT DOCUMENTS

| | | |
|---|---|---|
| CN | 203131520 U | 8/2013 |
| CN | 203162690 U | 8/2013 |
| CN | 203162856 U | 8/2013 |
| CN | 103313472 A | 9/2013 |
| CN | 203176871 U | 9/2013 |
| CN | 203202740 U | 9/2013 |
| CN | 203202766 U | 9/2013 |
| CN | 203240337 U | 10/2013 |
| CN | 203240353 U | 10/2013 |
| CN | 203240362 U | 10/2013 |
| CN | 103411140 A | 11/2013 |
| CN | 203273451 U | 11/2013 |
| CN | 203322772 U | 12/2013 |
| CN | 103486554 A | 1/2014 |
| CN | 103511892 A | 1/2014 |
| CN | 103563490 A | 2/2014 |
| CN | 103574331 A | 2/2014 |
| CN | 103672530 A | 3/2014 |
| CN | 203464014 U | 3/2014 |
| CN | 203477954 U | 3/2014 |
| CN | 203500909 U | 3/2014 |
| CN | 103742875 A | 4/2014 |
| CN | 203517436 U | 4/2014 |
| CN | 203517629 U | 4/2014 |
| CN | 203533269 U | 4/2014 |
| CN | 203549435 U | 4/2014 |
| CN | 203571498 U | 4/2014 |
| CN | 103822121 A | 5/2014 |
| CN | 203615126 U | 5/2014 |
| CN | 203615157 U | 5/2014 |
| CN | 103851390 A | 6/2014 |
| CN | 103851547 A | 6/2014 |
| CN | 203628340 U | 6/2014 |
| CN | 203645869 U | 6/2014 |
| CN | 103899939 A | 7/2014 |
| CN | 103925487 A | 7/2014 |
| CN | 103939773 A | 7/2014 |
| CN | 103943752 A | 7/2014 |
| CN | 203686635 U | 7/2014 |
| CN | 203686730 U | 7/2014 |
| CN | 203691724 U | 7/2014 |
| CN | 102932997 B | 8/2014 |
| CN | 103968272 A | 8/2014 |
| CN | 103982782 A | 8/2014 |
| CN | 203757616 U | 8/2014 |
| CN | 203771102 U | 8/2014 |
| CN | 203797382 U | 8/2014 |
| CN | 203797412 U | 8/2014 |
| CN | 104019378 A | 9/2014 |
| CN | 104033772 A | 9/2014 |
| CN | 203848044 U | 9/2014 |
| CN | 203848055 U | 9/2014 |
| CN | 104089209 A | 10/2014 |
| CN | 203857296 U | 10/2014 |
| CN | 203927469 U | 11/2014 |
| CN | 203963553 U | 11/2014 |
| CN | 104246348 A | 12/2014 |
| CN | 204005873 U | 12/2014 |
| CN | 204026211 U | 12/2014 |
| CN | 204042527 U | 12/2014 |
| CN | 204083927 U | 1/2015 |
| CN | 104515014 A | 4/2015 |
| CN | 104565931 A | 4/2015 |
| CN | 204268162 U | 4/2015 |
| CN | 204291454 U | 4/2015 |
| CN | 204300737 U | 4/2015 |
| CN | 103411140 B | 5/2015 |
| CN | 104595765 A | 5/2015 |
| CN | 104633491 A | 5/2015 |
| CN | 104735873 A | 6/2015 |
| CN | 204420636 U | 6/2015 |
| CN | 104776332 A | 7/2015 |
| CN | 204437746 U | 7/2015 |
| CN | 204442771 U | 7/2015 |
| CN | 104832813 A | 8/2015 |
| CN | 204534210 U | 8/2015 |
| CN | 204573639 U | 8/2015 |
| CN | 204573682 U | 8/2015 |
| CN | 204573684 U | 8/2015 |
| CN | 204573700 U | 8/2015 |
| CN | 104990041 A | 10/2015 |
| CN | 204693095 U | 10/2015 |
| CN | 204741593 U | 11/2015 |
| CN | 204795749 U | 11/2015 |
| CN | 204879606 U | 12/2015 |
| CN | 204879985 U | 12/2015 |
| CN | 105465640 A | 4/2016 |
| CN | 205191275 U | 4/2016 |
| CN | 104033772 B | 6/2016 |
| CN | 205316089 U | 6/2016 |
| CN | 205447315 U | 8/2016 |
| CN | 103968285 A | 9/2016 |
| CN | 106015996 A | 10/2016 |
| CN | 205716549 U | 11/2016 |
| CN | 205716559 U | 11/2016 |
| CN | 205877791 U | 1/2017 |
| CN | 106465503 A | 2/2017 |
| CN | 205938621 U | 2/2017 |
| CN | 105325058 B | 3/2017 |
| CN | 104470086 B | 6/2017 |
| CN | 106941746 A | 7/2017 |
| CN | 106996514 A | 8/2017 |
| CN | 107079545 A | 8/2017 |
| CN | 206514107 U | 9/2017 |
| CN | 206555763 U | 10/2017 |
| CN | 206617802 U | 11/2017 |
| CN | 304350803 S | 11/2017 |
| CN | 206771275 U | 12/2017 |
| CN | 206908890 U | 1/2018 |
| CN | 206908891 U | 1/2018 |
| CN | 207039939 U | 2/2018 |
| CN | 207124784 U | 3/2018 |
| CN | 207369353 U | 5/2018 |
| CN | 106326068 B | 1/2019 |
| CN | 209445322 U | 9/2019 |
| DE | 2608761 A1 | 9/1977 |
| DE | 202012011550 U1 | 6/2013 |
| EP | 2554899 A2 | 2/2013 |
| EP | 2602544 A1 | 6/2013 |
| EP | 2615357 A2 | 7/2013 |
| EP | 2727521 A1 | 5/2014 |
| EP | 2914065 A2 | 9/2015 |
| EP | 2477456 B1 | 4/2016 |
| EP | 3146803 A1 | 3/2017 |
| GB | 2465966 A | 6/2010 |
| GB | 2519258 A | 4/2015 |
| GB | 2523275 A | 8/2015 |
| GB | 2531425 A | 4/2016 |
| GB | 2533683 A | 6/2016 |
| GB | 2543380 A | 4/2017 |
| GB | 2544211 A | 5/2017 |
| JP | H01204982 A | 8/1989 |
| JP | 2005063995 A | 3/2005 |
| JP | 2005122906 A | 5/2005 |
| JP | 2008117666 A | 5/2008 |
| JP | 3147313 U | 12/2008 |
| JP | 2009545115 A | 12/2009 |
| JP | 2010129382 A | 6/2010 |
| JP | 2011061056 A | 3/2011 |
| JP | 2012155880 A | 8/2012 |
| JP | 2013243132 A | 12/2013 |
| JP | 2013254667 A | 12/2013 |
| JP | 5383939 B1 | 1/2014 |
| JP | 2014057501 A | 3/2014 |
| JP | 2014103000 A | 6/2014 |
| JP | 2014154479 A | 8/2014 |
| KR | 20090118147 A | 11/2009 |
| KR | 20120055349 A | 5/2012 |
| KR | 101629750 B1 | 6/2016 |
| TW | 201030277 A | 8/2010 |
| WO | 2009111098 A2 | 9/2009 |
| WO | 2009129689 A1 | 10/2009 |
| WO | 2012066822 A1 | 5/2012 |
| WO | 2012114096 A1 | 8/2012 |

(56) References Cited

FOREIGN PATENT DOCUMENTS

| | | |
|---|---|---|
| WO | 2012129301 A1 | 9/2012 |
| WO | 2012139691 A1 | 10/2012 |
| WO | 2013114485 A1 | 8/2013 |
| WO | 2013125803 A1 | 8/2013 |
| WO | 2013150417 A1 | 10/2013 |
| WO | 20130152485 A1 | 10/2013 |
| WO | 2014045523 A1 | 3/2014 |
| WO | 2014068335 A1 | 5/2014 |
| WO | 20140115010 A1 | 7/2014 |
| WO | 2014117435 A1 | 8/2014 |
| WO | 2014118754 A1 | 8/2014 |
| WO | 2014195350 A1 | 12/2014 |
| WO | 2014206785 A1 | 12/2014 |
| WO | 2015001067 A1 | 1/2015 |
| WO | 2015014584 A1 | 2/2015 |
| WO | 2015028329 A1 | 3/2015 |
| WO | 2015028639 A1 | 3/2015 |
| WO | 2015066566 A1 | 5/2015 |
| WO | 2015074917 A1 | 5/2015 |
| WO | 2015081809 A1 | 6/2015 |
| WO | 2015104246 A1 | 7/2015 |
| WO | 2015110306 A1 | 7/2015 |
| WO | 2016086900 A2 | 6/2016 |
| WO | 2016086901 A3 | 6/2016 |
| WO | 2016187846 A1 | 12/2016 |
| WO | 2017012512 A1 | 1/2017 |
| WO | 2017012514 A1 | 1/2017 |
| WO | 2017042379 A1 | 3/2017 |

OTHER PUBLICATIONS

Declaration of Regan Zane, Ph.D., Nov. 18, 2019.
CV of Dr. Regan Zane, Nov. 18, 2019.
Lenk, R. et al., Practical Lighting Design with LEDs, IEEE Press, A John Wiley & Sons, Inc., 2011, pp. 103-106, Nov. 18, 2019.
Philips InstantFit LED T8 Lamps data sheet.
Keystone KT-LED18T8-48G-850-D T8 LED Lamp Data Sheet.
MaxLite LED T8—Linear Replacement Lamp DirectFit G Series Data Sheet.
Defendant Maxlite, Inc.'s Preliminary Noninfringement and Invalidity Contentions Pursuant To Court'S Order, May 19, 2020.
Defendant Maxlite, Inc.'s Preliminary Noninfringement and Invalidity Contentions for Plaintiffs' 35 Elected Claims Pursuant To Court's Order, Jul. 20, 2020.
Cree announces residential-targeted LED T8, new rural outdoor, Jul. 20, 2020.
Show Colors True and Natural, Jul. 20, 2020.
Hands-on testing of popular LED T8 lamps and linear fixtures reveals promises and pitfalls (Magazine), Jul. 20, 2020.
CREE Recalls LED T8 Lamps Due to Burn Hazard; Includes T8 Lamps Provided as Replacements in Previous Recall, Jul. 20, 2020.
Cree LED T8 Replacement Lamp—General Information, Jul. 20, 2020.
LED Lighting Tube Device and Method (U.S. Appl. No. 62/065,959, filed Nov. 3, 2014).
IPR2023_00269_10560989_Petition.
Expert_ACKLEY_Declaration_10560989Patent_IPR.
Ackley_CV_10560989Patent_IPR.
IPR2023_00271 _10295125_Petition.
Baker_Declaration.
CV_JacobBaker.
IPR2023_00272_10830397_Petition.
LebbyDeclaration.
Lebby_CV.
IPR2023_00270_Petition_9723662_Petition.
BakerDeclaration_662.
EX1007_IPR2020_00181Pr_1.
IPR2020_00181Pr_7.
D'AndradeInfringementReport.
20221222 _CurrentLighting_PreliminaryInvalidityContentions.
Declaration of Donald E Ackley, Ph D, from *Current Lighting Solutions, LLC D/B/A GE Current* v. *Jiaxing Super Lighting Electric Appliance Co., Ltd.,* IPR2023-00675.
How_resistors_work, from https://web.archive.org/web/20140717035916/http://riedon.com:80/technical/a-resistance-primer.

LED TUBE LAMP

RELATED APPLICATIONS

This application is a continuation application of U.S. patent application Ser. No. 17/136,135, filed Dec. 29, 2020, incorporated by reference in its entirety, which is a continuation application of U.S. patent application Ser. No. 16/691,859, filed Nov. 22, 2019, incorporated by reference in its entirety, which is a continuation application of U.S. patent application Ser. No. 16/273,439, filed Feb. 12, 2019, incorporated by reference in its entirety, which is a continuation application of U.S. patent application Ser. No. 15/889,634, filed Feb. 6, 2018, incorporated by reference herein in its entirety, which is a continuation application of U.S. patent application Ser. No. 15/386,139, filed Dec. 21, 2016, incorporated by reference herein in its entirety, which is a continuation-in-part application of U.S. patent application Ser. No. 15/055,630, filed Feb. 28, 2016, incorporated by reference herein in its entirety, which claims the benefit of priority under 35 U.S.C. § 119 to the following Chinese Patent Applications, filed with the State Intellectual Property Office (SIPO), each of which is incorporated herein by reference in its entirety: CN201510104823.3, filed Mar. 10, 2015; CN201510134586.5, filed Mar. 26, 2015; CN201510133689.x, filed Mar. 25, 2015; CN201510173861.4, filed Apr. 14, 2015; CN201510193980.6, filed Apr. 22, 2015; CN201510372375.5, filed Jun. 26, 2015; CN201510284720.x, filed May 29, 2015; CN201510338027.6, filed Jun. 17, 2015; CN201510315636.x, filed Jun. 10, 2015; CN201510406595.5, filed Jul. 10, 2015; CN201510486115.0, filed Aug. 8, 2015; CN201510557717.0, filed Sep. 6, 2015; CN201510595173.7, filed Sep. 18, 2015; CN201510530110.3, filed Aug. 26, 2015; CN201510680883.X, filed Oct. 20, 2015; CN201510259151.3, filed May 19, 2015; CN201510324394.0, filed Jun. 12, 2015; CN201510373492.3, filed Jun. 26, 2015; CN201510482944.1, filed Aug. 7, 2015; CN201510499512.1, filed Aug. 14, 2015; CN201510448220.5, filed Jul. 27, 2015; CN201510483475.5, filed Aug. 8, 2015; CN201510555543.4, filed Sep. 2, 2015; CN201510724263.1, filed Oct. 29, 2015; CN201610050944.9, filed Jan. 26, 2016; and CN 201510726484.2, filed Oct. 30, 2015. In addition, Chinese Patent Application No.: CN201510075925.7, filed Feb. 12, 2015 with the State Intellectual Property Office (SIPO) is also incorporated herein by reference in its entirety.

If any terms in this application conflict with terms used in any application(s) to which this application claims priority, or terms incorporated by reference into this application or the application(s) to which this application claims priority, a construction based on the terms as used or defined in this application should be applied.

TECHNICAL FIELD

The invention relates to LED lighting apparatuses or devices. More particularly, the invention relates to LED tube lamps and their structures.

BACKGROUND

LED lighting technology is rapidly developing to replace traditional incandescent and fluorescent lightings. LED tube lamps are mercury-free in comparison with fluorescent tube lamps that need to be filled with inert gas and mercury. Thus, it is not surprising that LED tube lamps are becoming a highly desirable illumination option among different available lighting systems used in homes and workplaces, which used to be dominated by traditional lighting options such as compact fluorescent light bulbs (CFLs) and fluorescent tube lamps. Benefits of LED tube lamps include improved durability and longevity and far less energy consumption. All factors considered, LED tube lamps are typically considered a cost-effective lighting option.

Typical LED tube lamps have a variety of LED lamp components and driving circuits. The LED lamp components include LED chip-packaging elements, light diffusion elements, high-efficiency heat dissipating elements, light reflective boards and light diffusing boards. LED lamps generate considerable amount of heat, which, if not properly dissipated, would shorten the life of the lamps or even destroy them. Problems including power loss, rapid light decay, and short lifetime due to poor heat dissipation are key considerations when improving the performance of the LED illuminating system. Heat dissipation is, therefore, an important issue when designing LED products.

Nowadays, most LED tube lamps use plastic tubes and metallic elements to dissipate heat from the LEDs. The metallic elements are usually exposed and are accessible by users from the outside of the plastic tubes. This design improves heat dissipation but heightens the risk of electric shocks. If we dispose metallic elements inside the plastic tubes, heat would be trapped inside the plastic tubes, which may be deformed through heat. Deformation of the plastic tubes also occurs even when the elements to dissipate heat from the LEDs are not metallic.

Metallic elements for dissipating heat from the LEDs may be made of aluminum. However, aluminum is too soft to sufficiently support the plastic tubes when deformation of plastic tubes occurs due to the heat as far as the metallic elements disposed inside the plastic tubes are concerned.

Present ways of using LED lamps such as LED tube lamps to replace traditional lighting devices (referring mainly to fluorescent lamps) include using a ballast-compatible LED tube lamp. Typically, there is no need to change the electrical or conductive wirings in traditional lamps, an LED tube lamp can be used to directly replace e.g. a fluorescent lamp. Common types of electronic ballast include instant-start ballast and program-start ballast. Electronic ballast typically includes an LC circuit and is designed to match the loading characteristics of a fluorescent lamp in driving the fluorescent lamp. For example, to properly start a fluorescent lamp, the electronic ballast provides driving methods respectively corresponding to the fluorescent lamp working as a capacitive device before emitting light, and working as a resistive device upon emitting light. LED is a nonlinear component with significantly different characteristics from a fluorescent lamp. Therefore, using an LED tube lamp with an electronic ballast impacts the design of the LC circuit of the electronic ballast, causing a compatibility problem.

Further, most of the circuit designs for LED tube lamps fail to provide suitable solutions to comply with relevant certification standards and for better compatibility with the driving structure using an electronic ballast originally for a fluorescent lamp. For example, since there are usually no electronic components in a fluorescent lamp, it is easy for a fluorescent lamp to be certified under EMI (electromagnetic interference) standards and safety standards for lighting equipment as provided by Underwriters Laboratories (UL).

However, there are a considerable number of electronic components in an LED tube lamp. Therefore, consideration of the impacts caused by the layout (structure) of the electronic components is important, resulting in difficulties in complying with such standards.

Further, the driving of an LED uses a DC driving signal, but the driving signal for a fluorescent lamp is a low-frequency, low-voltage AC signal as provided by an AC powerline, a high-frequency, high-voltage AC signal provided by a ballast, or even a DC signal provided by a battery for emergency lighting applications. Since the voltages and frequency spectrums of these types of signals differ significantly, simply performing a rectification to produce the required DC driving signal in an LED tube lamp does not necessarily result in an LED tube lamp compatible with traditional driving systems of a fluorescent lamp.

In addition, for some LED tube lamps, rigid circuit board is typically electrically connected to the end caps by way of wire bonding, in which the wires may be easily damaged and even broken due to any move during manufacturing, transportation, and usage of the LED tube lamps and therefore may disable the LED tube lamps. Or, bendable circuit sheet may be used to electrically connect the LED assembly in the lamp tube and the power supply assembly in the end cap(s). The length of the lamp tube during manufacturing also needs to match for the bendable circuit sheet, and thus the variable factor increases in the manufacture of the lamp tube.

The heat generated by the LED tube lamp can be reduced by controlling the LED illumination and lighting period by an LED driving circuit. However, it is not easy to meet the expected LED illumination requirement based on some analog driving manners for two reasons. The relationship between the LED illumination and the LED current is non-linear, Moreover, color temperature of some LEDs changes in response to LED current. Furthermore, heat convection in the lamp tube is hindered, e.g., in some cases, the lamp tube is a closed space, and once the LED illumination increases, the lifespan of the LED tube lamp shortens because the lifespan of LEDs is sensitive to temperature. Also, some LED driving circuits result in the circuit bandwidth getting smaller since the driving voltage/current repeatedly returns between the maximum and minimum. This may limit the minimum conducting period and affects the driving frequency.

In addition, the LED tube lamp may be provided with power via two ends of the lamp and a user may be easily electric shocked when one end of the lamp is already inserted into a terminal of a power supply while the other end is held by the user to reach the other terminal of the power supply.

Currently applied techniques often fall short when attempting to address the abovementioned worse heat conduction, poor heat dissipation, heat deformation, electric shock, weak electrical connection, smaller driving bandwidth, and variable factor in manufacture defects.

SUMMARY

Therefore, it is an object to provide a significantly improved LED tube lamp that dissipates heat more efficiently. It is a further object to provide an LED tube lamp in which the circuit design is simplified. It is yet another object to provide an LED tube lamp that is assembled easily. It is still another object to provide an LED tube lamp that accommodates a variety of form factors. The electronic components are disposed on the LED light strip, the end cap, the reinforcing portion or on any combination of the above. The distribution of the set of electronic components in a lamp tube depends on a balanced totality of such considerations as heat dissipation, circuit design, easy assembly and form factor of the lamp tube.

In accordance with an exemplary embodiment, the LED tube lamp comprises a glass lamp tube; a light diffusion layer disposed on a surface of the glass lamp tube; an LED light strip, which comprises a fixing portion and an extending portion disposed in the glass lamp tube; a plurality of LED light sources mounted on the fixing portion of the LED light strip; a fixing structure disposed between the fixing portion and the inner circumferential surface the glass lamp tube; a power supply module disposed on the fixing structure and electrically connecting to the LED light strip and two end caps attached to two ends of the glass lamp tube respectively. The fixing structure comprises a first end fixedly connected to the inner circumferential surface of the glass lamp tube and a second end fixedly connected to the fixing portion of the LED light strip and not connected to the extending portion of the LED light strip. The power supply module comprises a circuit board separate from the light strip, a plurality of electronic components mounted on the circuit board and at least two second connecting pads arranged on the circuit board. The two first connecting pads on the extending portion electrically connecting to the two second connecting pads respectively. Wherein the power supply module at least comprising a rectifying circuit and a filtering circuit, the rectifying circuit is coupled to two pins to receive an external signal, and the filtering circuit is coupled to the rectifying circuit and the plurality of LED light sources are coupled to the filtering circuit.

In accordance with an exemplary embodiment, the LED tube lamp comprises a glass lamp tube; a light diffusion layer disposed on a surface of the glass lamp tube; an LED light strip, which comprises a fixing portion and an extending portion disposed in the glass lamp tube; a plurality of LED light sources mounted on the fixing portion of the LED light strip; a fixing structure disposed between the fixing portion and the inner circumferential surface the glass lamp tube; a power supply module electrically connecting to the LED light strip and two end caps attached to two ends of the glass lamp tube respectively. The fixing structure comprises a first end fixedly connected to the inner circumferential surface of the glass lamp tube and a second end fixedly connected to the fixing portion of the LED light strip and not connected to the extending portion of the LED light strip. The power supply module comprises a circuit board separate from the light strip, a plurality of electronic components mounted on the circuit board and at least two second connecting pads arranged on the circuit board. The circuit board electrically connecting to the LED light strip and stacked with a portion of the extending portion in a radial direction of the glass lamp tube. The two first connecting pads on the extending portion electrically connecting to the two second connecting pads respectively. Wherein the power supply module at least comprising a rectifying circuit and a filtering circuit, the rectifying circuit is coupled to two pins to receive an external signal, and the filtering circuit is coupled to the rectifying circuit and the plurality of LED light sources are coupled to the filtering circuit.

In accordance with an exemplary embodiment, the LED tube lamp comprises a glass lamp tube; a light diffusion layer disposed on a surface of the glass lamp tube; an LED light strip, which comprises a fixing portion and an extending portion disposed in the glass lamp tube; a plurality of LED light sources mounted on the fixing portion of the LED light strip; a fixing structure disposed between the fixing portion and the inner circumferential surface the glass lamp tube; a power supply module electrically connecting to the LED light strip and two end caps attached to two ends of the glass lamp tube respectively. The fixing structure comprises a first end fixedly connected to the inner circumferential surface of the glass lamp tube and a second end fixedly connected to the fixing portion of the LED light strip and not connected to the extending portion of the LED light strip. The power supply module comprises a circuit board separate from the light strip, a plurality of electronic components mounted on the circuit board and at least two second connecting pads arranged on the circuit board. The circuit board electrically connecting to the LED light strip and stacked with a portion of the fixing structure in a radial direction of the glass lamp tube. The two first connecting pads on the extending portion electrically connecting to the two second connecting pads respectively. Wherein the power supply module at least comprising a rectifying circuit and a filtering circuit, the rectifying circuit is coupled to two pins to receive an external signal, and the filtering circuit is coupled to the rectifying circuit and the plurality of LED light sources are coupled to the filtering circuit.

In accordance with an exemplary embodiment, the LED light strip further comprising a wiring layer, the plurality of LED light sources are mounted on the wiring layer.

In accordance with an exemplary embodiment, the LED light strip further comprises a protection layer disposed on a first surface of the wiring layer and the plurality of LED light sources are mounted on the first surface of the wiring layer.

In accordance with an exemplary embodiment, the LED light strip further comprises a dielectric layer disposed on a second surface of the wiring layer.

In accordance with an exemplary embodiment, a portion of the extending portion and a portion of the circuit board are disposed on each other in the LED tube lamp.

In accordance with an exemplary embodiment, the two first connecting pads are arranged on the portion of the extending portion.

In accordance with an exemplary embodiment, the light strip is made from flexible material and the extending portion is detached from the inner circumferential surface of the glass lamp tube.

In accordance with an exemplary embodiment, at least some of the electronic components comprise a capacitor electrically connected between the two input terminals of the rectifying circuit and a resistor electrically connected to the capacitor in parallel.

In accordance with an exemplary embodiment, the capacitor and the resistor form a filament-simulating circuit.

In accordance with an exemplary embodiment, at least some of the electronic components form a driving circuit electrically connected to filtering output terminals of the filtering circuit and having two driving output terminals electrically connecting to the LED light strip.

In accordance with an exemplary embodiment, the driving circuit comprises a controller, a diode, a switch and an inductor. The diode has an anode electrically connected to one of the filtering output terminals and one of the driving output terminals. The switch has a first terminal coupled to the other one of the filtering output terminals, a second terminal electrically connected to a cathode of the diode, and a control terminal coupled to the controller, wherein the switch is turned on or off in response to a signal received from the controller. The inductor has an end electrically connected to the second terminal of the switch, and another end electrically connected to the LED light strip via the other one of the driving output terminals.

In accordance with an exemplary embodiment, at least some of the electronic components form an installation detection circuit configured to determine whether to enter a protection state and limit, restrain or clamp down on a level of a signal flew through the power supply module under the protection state.

In accordance with an exemplary embodiment, the installation detection circuit comprises a switch circuit. The switch circuit has a first terminal electrically connected to one of output terminals of the rectifying circuit, a second terminal electrically connected to one of input terminals of the filtering circuit, and a control terminal receives a signal indicating whether the LED tube lamp is correctly inserted into a lamp socket.

In accordance with an exemplary embodiment, another one of the output terminals of the rectifying circuit is electrically connected to another one of the input terminals of the filtering circuit, and a voltage level at the another one of the output terminals of the rectifying circuit is greater than a voltage level at the one of the output terminals of the rectifying circuit.

In accordance with an exemplary embodiment, the switch circuit is in a blocking state to make the one of the input terminals of the filtering circuit electrically disconnects from the one of the output terminals of the rectifying circuit when the signal indicates the LED tube lamp is not correctly installed into the lamp socket.

In accordance with an exemplary embodiment, the switch circuit is in a conduction state to make the one of the input terminals of the filtering circuit electrically connects to the one of the output terminals of the rectifying circuit when the signal indicates the LED tube lamp is correctly installed into the lamp socket.

Various objects, advantages will become readily apparent from the ensuing detailed description, and certain novel features will be particularly pointed out in the appended claims.

BRIEF DESCRIPTION OF FIGURES

The following detailed descriptions, given by way of example, and not intended to be limiting solely thereto, will be best be understood in conjunction with the accompanying figures.

DETAILED DESCRIPTION OF THE EMBODIMENTS

Figure 1:
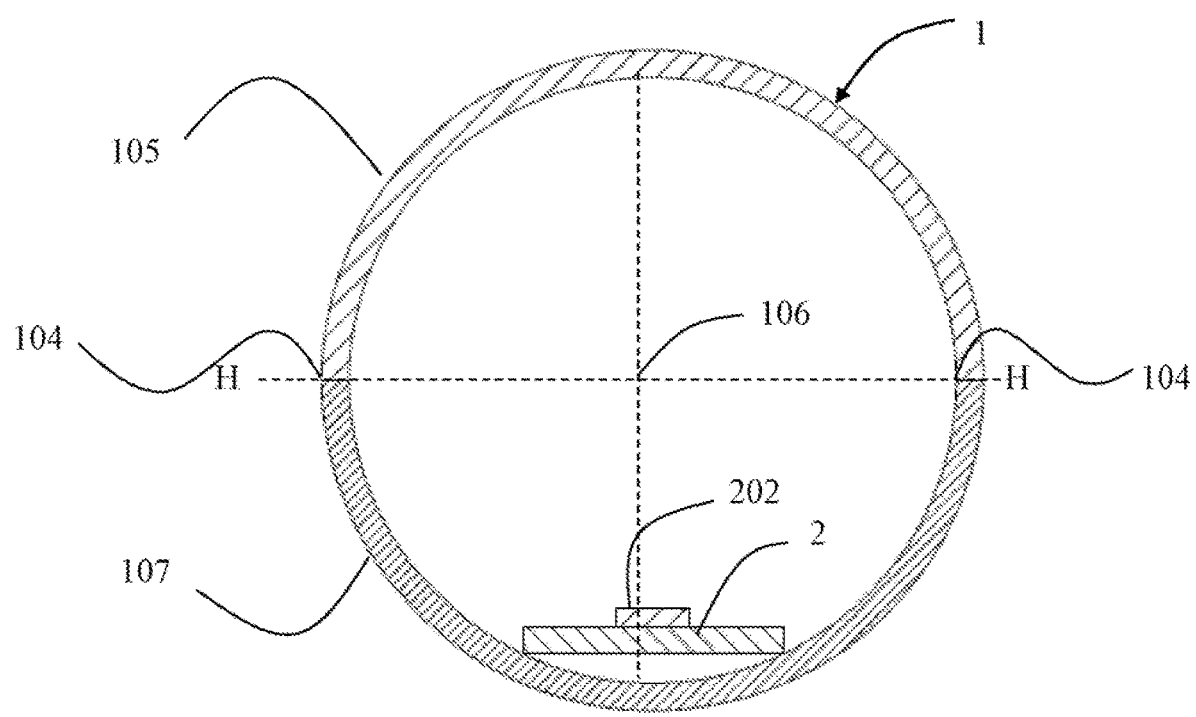
FIG. 1 is a cross-sectional view of the LED tube lamp with a light transmissive portion and a reinforcing portion in accordance with an exemplary embodiment.

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of layers and regions may be exaggerated for clarity. Like numbers refer to like elements throughout. Though different figures show variations of exemplary embodiments, these figures are not necessarily intended to be mutually exclusive from each other. Rather, as will be seen from the context of the detailed description below, certain features depicted and described in different figures can be combined with other features from other figures to result in various embodiments, when taking the figures and their description as a whole.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". As used herein, the term "and/or" includes any and all combinations of one or more of the associated listed items. Also, the term "exemplary" is intended to refer to an example or illustration.

Although the figures described herein may be referred to using language such as "one embodiment," or "certain embodiments," these figures, and their corresponding descriptions are not intended to be mutually exclusive from other figures or descriptions, unless the context so indicates. Therefore, certain aspects from certain figures may be the same as certain features in other figures, and/or certain figures may be different representations or different portions of a particular exemplary embodiment.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to, "in contact with," or "on" another element, it can be directly connected or coupled to, in contact with, or on the other element or intervening elements may be present. In contrast, when an element is referred to as being "directly connected," "directly coupled," in "direct contact with," or "directly on" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise.

Embodiments described herein will be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning.

As used herein, items described as being "electrically connected" are configured such that an electrical signal can be passed from one item to the other. Therefore, a passive electrically conductive component (e.g., a wire, pad, internal electrical line, etc.) physically connected to a passive electrically insulative component (e.g., a prepreg layer of a printed circuit board, an electrically insulative adhesive connecting two devices, an electrically insulative underfill or mold layer, etc.) is not electrically connected to that component. Moreover, items that are "directly electrically connected," to each other are electrically connected through one or more passive elements, such as, for example, wires, pads, internal electrical lines, through vias, etc. As such, directly electrically connected components do not include components electrically connected through active elements, such as transistors or diodes.

Components described as thermally connected or in thermal communication are arranged such that heat will follow a path between the components to allow the heat to transfer from the first component to the second component. Simply because two components are part of the same device or package does not make them thermally connected. In general, components which are heat-conductive and directly connected to other heat-conductive or heat-generating components (or connected to those components through intermediate heat-conductive components or in such close proximity as to permit a substantial transfer of heat) will be described as thermally connected to those components, or in thermal communication with those components. On the contrary, two components with heat-insulative materials therebetween, which materials significantly prevent heat transfer between the two components, or only allow for incidental heat transfer, are not described as thermally connected or in thermal communication with each other. The terms "heat-conductive" or "thermally-conductive" do not apply to a particular material simply because it provides incidental heat conduction, but are intended to refer to materials that are typically known as good heat conductors or known to have utility for transferring heat, or components having similar heat conducting properties as those materials.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein. In addition, unless the context indicates otherwise, steps described in a particular order need not occur in that order.

Referring to FIG. 1, in accordance with an exemplary embodiment, an LED tube lamp comprises a lamp tube 1 and an LED light assembly. The lamp tube 1 includes a light transmissive portion 105 and a reinforcing portion 107. The reinforcing portion 107 is fixedly connected to the light transmissive portion 105.

The LED light assembly is disposed inside the lamp tube 1 and includes an LED light source 202 and an LED light strip 2. The LED light source is thermally and electrically connected to the LED light strip 2, which is in turn thermally connected to the reinforcing portion 107. Though only one LED light source 202 is shown, a plurality of light sources 202 may be arranged on the LED light strip 2. For example, light sources 202 may be arranged in one or more rows extending along a length direction of the LED light strip 2, which may extend along a length direction of the lamp tube 1. In addition, a light source, as discussed herein, may refer to a single light emitting diode (LED), to a set of LEDs including a plurality of LEDs, or to one or more sets of LEDs (e.g., it may refer to the entire set of LEDs on the light strip 2). Heat generated by the LED light source 202 is first transmitted to the LED light strip 2 and then to the reinforcing portion 107 before egressing the lamp tube 1. Thermal connection is achieved with thermally conductive tapes or conventional mechanical fasteners such as screws aided by thermal grease to eliminate air gaps from interface areas.

Typically, the lamp tube 1 has a shape of an elongated cylinder, which is a straight structure. However, the lamp tube 1 can take any curved structure such as a ring or a horseshoe. The cross section of the lamp tube 1 defines, typically, a circle, or not as typically, an ellipse or a polygon. Alternatively, the cross section of the lamp tube 1 takes an irregular shape depending on the shapes of, respectively, the light transmissive portion 105 and the reinforcing portion 107 and on the manner the two portions interconnect to form the lamp tube 1.

The lamp tube 1 is a glass tube, a plastic tube or a tube made of any other suitable material or combination of materials. In some embodiments, a plastic lamp tube is made from light transmissive plastic, thermally conductive plastic or a combination of both. The light transmissive plastic may be one of translucent polymer matrices such as polymethyl methacrylate, polycarbonate, polystyrene, poly(styrene-co-methyl methacrylate) and a mixture thereof. In some embodiments, the strength and elasticity of thermally conductive plastic is enhanced by bonding a plastic matrix with glass fibers. In an embodiment, an outer shell of lamp tube includes a plurality of layers made from distinct materials. For example, the lamp tube may include a plastic tube coaxially sheathed by a glass tube.

In an embodiment, the light transmissive portion 105 is made from light transmissive plastic, and the reinforcing portion 107 is made from thermally conductive plastic. Injection molding may be used for producing the light transmissive portion 105 in a first piece and for producing the reinforcing portion 107 in a separate second piece. The first piece and the second piece may be configured to be clipped together, buckled together, glued together or otherwise fixedly interconnected to form the lamp tube 1. Alternatively, injection molding is used for producing the lamp tube 1, which includes the light transmissive portion 105 and the reinforcing portion 107, in an integral piece by feeding two types of plastic materials into a molding process. In an alternative embodiment, the reinforcing portion is made of metal having good thermal conductivity such as an aluminum alloy and copper alloy.

Respective shapes of the light transmissive portion 105 and the reinforcing portion 107, how the two portions 105, 107 interconnect to form the lamp tube 1 and, particularly, the respective proportions of the two portions 105, 107 in the lamp tube depend on a desired totality of considerations such as field angle, heat dissipation efficiency and structural strength. A wider field angle—potentially at the expense of heat dissipation capability and structural strength—is achieved when the proportion of the light transmissive portion increases 105 in relation to that of the reinforcing portion 107. By contrast, the lamp tube benefits from an increased proportion of the reinforcing portion 107 in relation to that of the light transmissive portion in such ways as better heat dissipation and rigidity but potentially loses field angle.

In some embodiments, the reinforcing portion 107 includes a plurality of protruding parts. In other embodiments, a plurality of protruding parts are disposed on the surface of the LED light strip 2 that is not covered by the LED light assembly. Like fins on a heatsink, each protruding part boosts heat dissipation by increasing the surface area of the reinforcing portion 107 and the LED light strip 2. The protruding parts are disposed equidistantly, or alternatively, not equidistantly.

Staying on FIG. 1, the lamp tube 1 has a shape of a circular cylinder. For example, across section of the lamp tube 1 defines a hypothetical circle. A line H-H cuts the circle horizontally into two equal halves along a diameter of the circle. A cross section of the light transmissive portion 105 defines an upper segment on the circle. A cross section of the reinforcing portion 107 defines a lower segment on the circle. A dividing line 104 parallel to the line H-H is shared by the two segments. In this embodiment, the dividing line 104 sits exactly on the line H-H. Consequently, the area of the upper segment is the same as that of the lower segment. In one embodiment, the cross section of the light transmissive portion 105 has a same area as that of the reinforcing portion 107.

In an alternative embodiment, the dividing line 104 is spaced apart from the line H-H. For example, when the dividing line 104 is below the line H-H, the upper segment, which encompasses the light transmissive portion, has a greater area than the lower segment, which encompasses the reinforcing portion. The lamp tube, which includes an enlarged light transmissive portion, is thus configured to achieve a field angle wider than 180 degrees; however, other things equal, the lamp tube surrenders some heat dissipation capability, structural strength or both due to a diminished reinforcing portion 107. By contrast, the lamp tube 1 may have an enlarged reinforcing portion 107 and a diminished light transmissive portion 105 if the dividing line rises above the line H-H. Other things equal, the lamp tube 1, now having an enlarged reinforcing portion 107, is configured to exhibit higher heat dissipation capability, structural strength or both; however, the field angle of the lamp tube 1 will dwindle due to diminished dimensions of the light transmissive portion 105.

According to certain embodiments, the LED tube lamp is configured to convert bright spots coming from the LED light source(s) into an evenly distributed luminous output. In an embodiment, a light diffusion layer is disposed on an inner surface of the lamp tube 1 or an outer surface of the lamp tube 1. In another embodiment, a diffusion laminate is disposed over the LED light source 202. In yet another embodiment, the lamp tube 1 has a glossy outer surface and a frosted inner surface. The inner surface is rougher than the outer surface. The roughness Ra of the inner surface may be, for example, from 0.1 to 40 µm. In some embodiments, roughness Ra of the inner surface may be from 1 to 20 µm. Controlled roughness of the surface is obtained mechanically by a cutter grinding against a workpiece, deformation on a surface of a workpiece being cut off or high frequency vibration in the manufacturing system. Alternatively, roughness is obtained chemically by etching a surface. Depending on the luminous effect the lamp tube 1 is designed to produce, a suitable combination of amplitude and frequency of a roughened surface is provided by a matching combination of workpiece and finishing technique.

In alternative embodiments, the diffusion layer is in the form of an optical diffusion coating, which is composed of any one of calcium carbonate, halogen calcium phosphate and aluminum oxide, or any combination thereof. When the optical diffusion coating is made from a calcium carbonate with suitable solution, an excellent light diffusion effect and transmittance to exceed 90% can be obtained.

In the embodiment, the composition of the diffusion layer in form of the optical diffusion coating includes calcium carbonate, strontium phosphate (e.g., CMS-5000, white powder), thickener, and a ceramic activated carbon (e.g., ceramic activated carbon SW-C, which is a colorless liquid). Specifically, such an optical diffusion coating on the inner circumferential surface of the glass tube has an average thickness ranging between about 20 to about 30 µm. A light transmittance of the diffusion layer using this optical diffusion coating is about 90%. Generally speaking, the light transmittance of the diffusion layer ranges from 85% to 96%. In addition, this diffusion layer can also provide electrical isolation for reducing risk of electric shock to a user upon breakage of the lamp tube 1. Furthermore, the diffusion layer provides an improved illumination distribution uniformity of the light outputted by the LED light sources 202 such that the light can illuminate the back of the light sources 202 and the side edges of the bendable circuit sheet so as to avoid the formation of dark regions inside the lamp tube 1 and improve the illumination comfort. In another possible embodiment, the light transmittance of the diffusion layer can be 92% to 94% while the thickness ranges from about 200 to about 300 µm.

In another embodiment, the optical diffusion coating can also be made of a mixture including calcium carbonate-based substance, some reflective substances like strontium phosphate or barium sulfate, a thickening agent, ceramic activated carbon, and deionized water. The mixture is coated on the inner circumferential surface of the glass tube and has an average thickness ranging between about 20 to about 30 µm. In view of the diffusion phenomena in microscopic terms, light is reflected by particles. The particle size of the reflective substance such as strontium phosphate or barium sulfate will be much larger than the particle size of the calcium carbonate. Therefore, adding a small amount of reflective substance in the optical diffusion coating can effectively increase the diffusion effect of light.

In other embodiments, halogen calcium phosphate or aluminum oxide can also serve as the main material for forming the diffusion layer. The particle size of the calcium carbonate is about 2 to 4 µm, while the particle size of the halogen calcium phosphate and aluminum oxide are about 4 to 6 µm and 1 to 2 µm, respectively. When the light transmittance is required to be 85% to 92%, the required average thickness for the optical diffusion coating mainly having the calcium carbonate is about 20 to about 30 µm, while the required average thickness for the optical diffusion coating mainly having the halogen calcium phosphate may be about 25 to about 35 µm, the required average thickness for the optical diffusion coating mainly having the aluminum oxide may be about 10 to about 15 µm. However, when the required light transmittance is up to 92% and even higher, the optical diffusion coating mainly having the calcium carbonate, the halogen calcium phosphate, or the aluminum oxide must be thinner.

The main material and the corresponding thickness of the optical diffusion coating can be decided according to the place for which the lamp tube 1 is used and the light transmittance required. It is to be noted that the higher the light transmittance of the diffusion layer is required, the more apparent the grainy visual of the light sources is.

In an embodiment, the LED tube lamp is configured to reduce internal reflectance by applying a layer of anti-reflection coating to an inner surface of the lamp tube 1. The coating has an upper boundary, which divides the inner surface of the lamp tube and the anti-reflection coating, and a lower boundary, which divides the anti-reflection coating and the air in the lamp tube 1. Light waves reflected by the upper and lower boundaries of the coating interfere with one another to reduce reflectance. The coating is made from a material with a refractive index of a square root of the refractive index of the light transmissive portion 105 of the lamp tube 1 by vacuum deposition. Tolerance of the coating's refractive index is ±20%. The thickness of the coating is chosen to produce destructive interference in the light reflected from the interfaces and constructive interference in the corresponding transmitted light. In an additional embodiment, reflectance is further reduced by using alternating layers of a low-index coating and a higher-index coating. The multi-layer structure is designed to, when setting parameters such as combination and permutation of layers, thickness of a layer, refractive index of the material, give low reflectivity over a broad band that covers at least 60%, or in some embodiments, 80% of the wavelength range beaming from the LED light source 202. In some embodiments, three successive layers of anti-reflection coatings are applied to an inner surface of the lamp tube 1 to obtain low reflectivity over a wide range of frequencies. The thicknesses of the coatings are chosen to give the coatings optical depths of, respectively, one half, one quarter and one half of the wavelength range coming from the LED light source 202. Dimensional tolerance for the thickness of the coating is set at ±20%.

Figure 2:
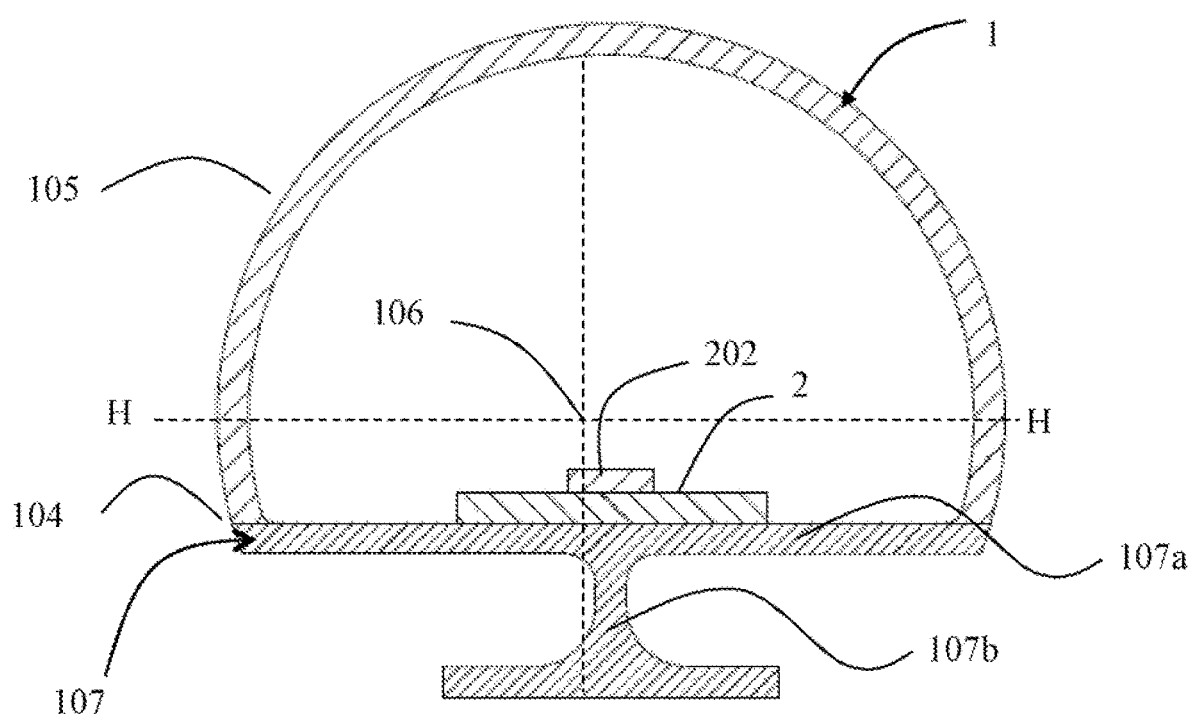
FIG. 2 is a cross-sectional view of the LED tube lamp with a bracing structure in accordance with an exemplary embodiment.

Turning to FIG. 2, in accordance with an exemplary embodiment, the cross section of the lamp tube 1, unlike that of the cylindrical lamp tube 1 in FIG. 1, approximates an arc sitting on a flange of an I-beam. The lamp tube 1 includes a light transmissive portion 105 and a reinforcing portion 107. A cross section of the light transmissive portion 105 defines an upper segment on a hypothetical circle. A line H-H cuts the circle horizontally into two equal halves along a diameter of the circle. The reinforcing portion 107 includes a platform 107a and a bracing structure 107b. The platform 107a has an upper surface and a lower surface. The LED light assembly is disposed on the upper surface of the platform 107a. The bracing structure 107b is fixedly connected to the platform 107a and holds the platform 107a in place. The bracing structure 107b includes a horizontal rib, a vertical rib, a curvilinear rib or a combination of ribs selected from the above. The dimensions of the platform 107a, the horizontal rib and the vertical rib, their quantities and the manner they interconnect depend on a desired totality of considerations such as heat dissipation efficiency and structural strength. In the embodiment, the cross section of the reinforcing portion 107 approximates that of an I-beam. The platform 107a, the vertical rib and the horizontal rib correspond to, respectively, the upper flange, the web and the bottom flange of the I-beam. In some embodiments, the bracing structure 107b may include only one vertical rib and only one horizontal rib.

A dividing line 104 parallel to the line H-H is shared by the upper segment and the upper flange. In the embodiment, the dividing line sits below the line H-H. Consequently, the upper segment constitutes the majority of the hypothetical circle. The light transmissive portion 105 may be configured to generate a field angle wider than 180 degrees. In an alternative embodiment, the dividing line sits on or above the line H-H. For example, when the dividing line rises above the line H-H, the upper segment, which encompasses the light transmissive portion, now constitutes less than half of the hypothetical circle. The lamp tube 1, which has an enlarged reinforcing portion 107, may be configured for better heat dissipation and structural strength; however, other things equal, the lamp tube 1 loses some luminous filed due to a diminished light transmissive portion 105.

In an embodiment, a surface on which the LED light assembly sits—e.g. the upper surface of the platform—is configured to further reflect the light reflected from the inner surface of the lamp tube 1. The surface on which the LED light assembly sits is coated with a reflective layer. Alternatively, the surface is finished to exhibit a reflectance of 80 to 95%, or preferably, 85 to 90%. Finishing is performed mechanically, chemically or by fluid jet. Mechanical finishing buffs a surface by removing peaks from the surface with an abrasive stick, a wool polishing wheel or a sandpaper. A surface treated this way has a roughness Ra as low as 0.008 to 1 μm. Chemical finishing works by dissolving peaks of a surface faster than troughs of the surface with a chemical agent. Fluid jet finishing uses a high-speed stream of slurry to accurately remove nanometers of material from a surface. The slurry is prepared by adding particles such as silicon carbide powder to a fluid capable of being pumped under relatively low pressure.

Figure 3:
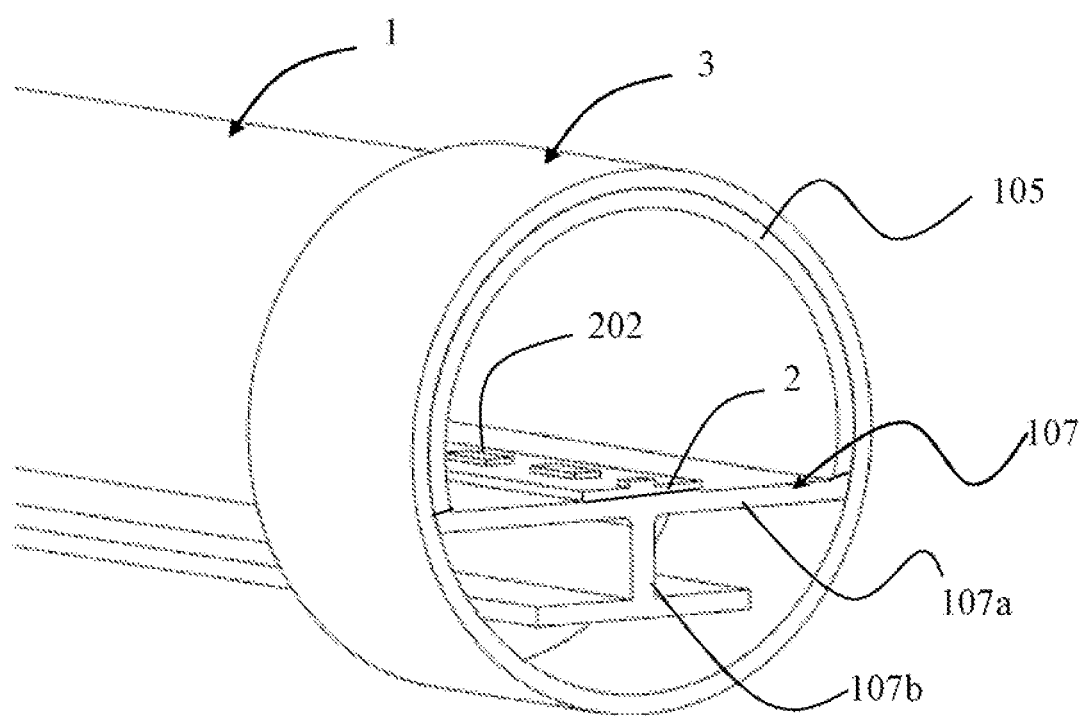
FIG. 3 is a perspective view of the LED tube lamp schematically illustrating the bracing structure shown in FIG. 2.

Turning to FIG. 3, in accordance with an exemplary embodiment, the LED tube lamp further comprises an end cap 3, which is fixedly connected to an end of the lamp tube 1. The end cap 3 is made from plastic, metal or a combination of both. The end cap 3 and the lamp tube 1 are latched together, buckled together or otherwise mechanically fastened to one another. Alternatively, the two parts are glued together with hot-melt adhesive, e.g. a silicone matrix with a thermal conductivity of at least 0.7 Wm-1K-1.

Typically, the end cap 3 has a shape of a cylinder, and the cross section of the end cap 3 may define a circle. Alternatively, the cross section of the end cap 3 takes an irregular shape depending on the shapes of, respectively, the light transmissive portion and the reinforcing portion and on the manner the two portions and the end cap 3 interconnect to form the LED tube lamp. Regardless of the shape of the end cap 3, the cross section of the end cap 3 encloses all or only a part of the cross section of the reinforcing portion 107 of the lamp tube 1. In the embodiment shown in FIG. 3, the end cap 3 defines a circular cylinder whose cross section encloses, entirely, the cross sections of, respectively, the light transmissive portion 105 and the reinforcing portion 107. The cross section of the lamp tube 1 approximates a segment, defined by the light transmissive portion 105, sitting on an upper flange of a hypothetical I-beam, defined by the reinforcing portion 107. A cross section of an inner surface of the end cap 3 defines a hypothetical circle. The hypothetical circle shares a same arc of the hypothetical segment defined by an outer surface of the light transmissive portion 105. The I-beam is enclosed, entirely, by the hypothetical circle.

Figure 4:
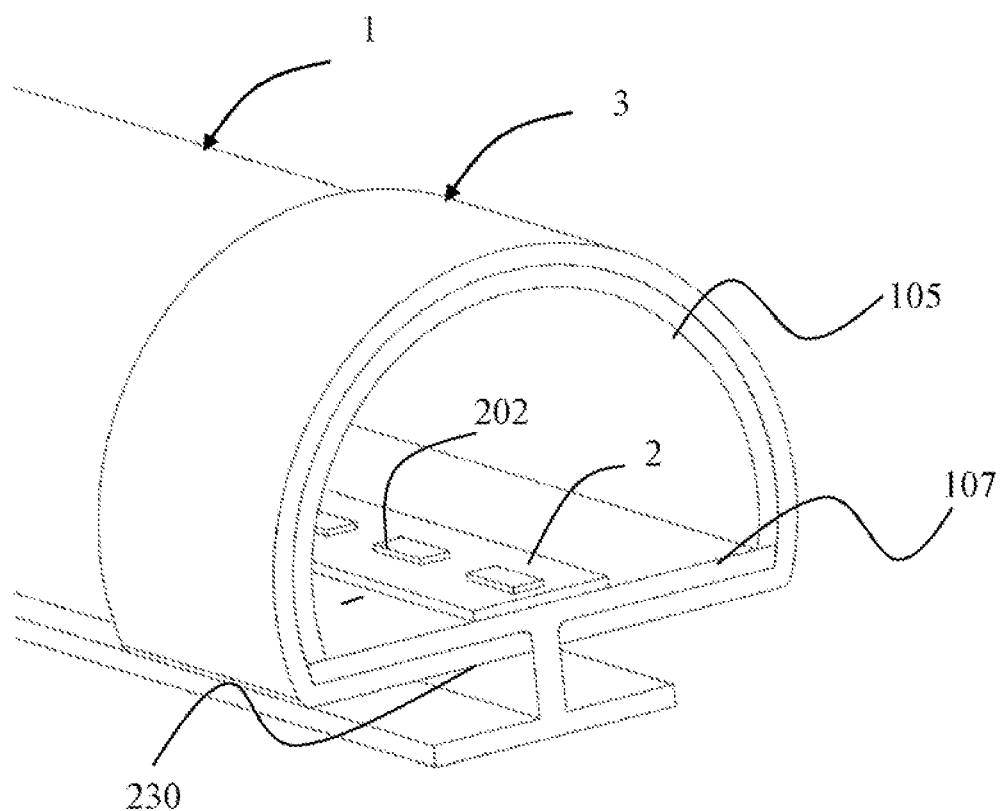
FIG. 4 is a perspective view of the LED tube lamp with a non-circular end cap in accordance with an exemplary embodiment.

In an alternative embodiment shown in FIG. 4, the cross section of the end cap 3 encloses all of the cross section of the light transmissive portion 105 but only a part of that of the reinforcing portion 107. A cross section of the inner surface of the end cap 3 defines a same hypothetical segment defined by an outer surface of the light transmissive portion 105. However, only the upper flange of the hypothetical I-beam is enclosed by the hypothetical segment, but the lower flange and the web are not.

In some embodiments, an end of the LED light assembly extends to the end cap 3 as shown in FIGS. 3 and 4. In other embodiments, an end of the LED light assembly recedes from the end cap 3.

The bracing structure 107b may be made of metal or plastic. The metal may be pure metal, metal alloy or combination of pure metal and metal alloy with different stiffness. Similarly, the plastic may include materials with various stiffness. Specifically, the plastic lamp tube may include only one bracing structure with one stiffness or two bracing structures with various stiffness.

When only one bracing structure is adopted, the material of the bracing structure may be metal, metal alloy, or plastic, and the ratio of the cross-sectional area of the bracing structure to the cross-sectional area of the lamp tube is from 1:3 to 1:30. In some embodiments, the ratio of the cross-sectional area of the bracing structure to the cross-sectional area of the lamp tube is from 1:5 to 1:10.

When more than one bracing structures with different stiffness are adopted, the bracing structure is made of one of metal, metal alloy and plastic. In one embodiment, when two bracing structures with different stiffness are adopted, the ratio of the cross-sectional area of the bracing structure with greater stiffness to the cross-sectional area of the other bracing structure is from 0.001:1 to 100:1. The ratio of the cross-sectional area of the bracing structure with greater stiffness to the cross-sectional area of the lamp tube 1 is from 1:20 to 1:300.

In view of the bracing structure made of metal, the lamp tube reveals the following combinations of materials and parts on the cross section of the lamp tube perpendicular to the longitudinal axis of the lamp tube: (1) a lamp tube made of plastic, a first bracing structure made of a metal with a first stiffness, and a second bracing structure, such as a maintaining stick, made of a metal with a second stiffness different from the first stiffness; (2) a lamp tube made of plastic and a single bracing structure made of metal and/or metal alloy; or (3) a lamp tube made of plastic, a first bracing structure made of metal, and a second bracing structure, such as a maintaining stick, made of metal alloy. Similarly, various types of plastics with different stiffness can be used to serve as the bracing structures mentioned above in some embodiments. The materials used for bracing structures have different stiffness; but the materials are not limited. For example, metal or metal alloy and plastic could serve as materials for different bracing structures without departing from the spirit of the embodiments. Additionally, the bracing structure is made from a material having a greater stiffness than the material from which the lamp tube is made.

In some embodiments, the lamp tube includes a first end cap fixedly connected to a first end of the lamp tube and a second end cap fixedly connecting to a second end of the lamp tube. The first end cap is dimensionally larger—e.g. from 20% to 70% larger—than the second end cap.

Figure 5:
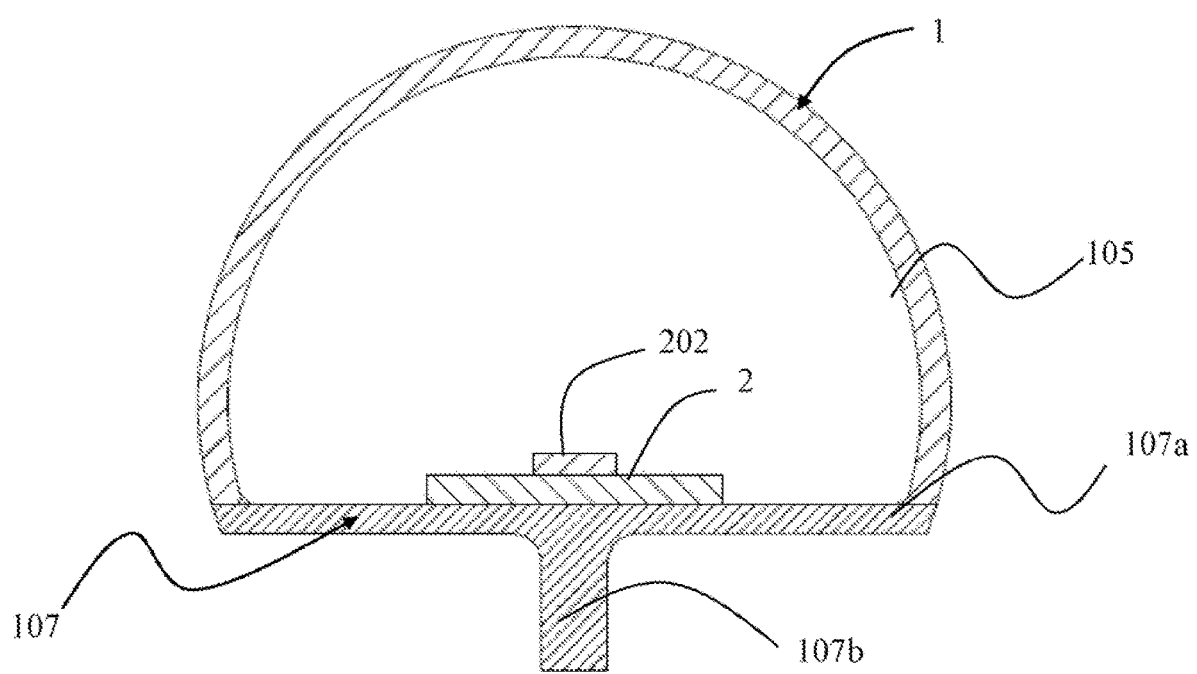
FIG. 5 is a cross-sectional view illustrating a vertical rib of the lamp tube in accordance with an exemplary embodiment.

Shifting to FIG. 5, in accordance with an exemplary embodiment, the cross section of the lamp tube 1 approximates an arc sitting on a flange of a hypothetical T-beam. The cross section of the reinforcing portion 107 approximates that of the T-beam. The platform 107a and the vertical rib correspond to, respectively, the flange and the web of the T-beam. For instance, in some embodiments, the bracing structure 107b may include only one vertical rib but no horizontal rib. When the cross section of the end cap 3 encloses, entirely, the cross sections of, respectively, the light transmissive portion 105 and the reinforcing portion 107, other things equal, the vertical rib in a T-beam structure (FIG. 5) has a greater length than the vertical rib in an I-beam structure (FIG. 3).

Figure 6:
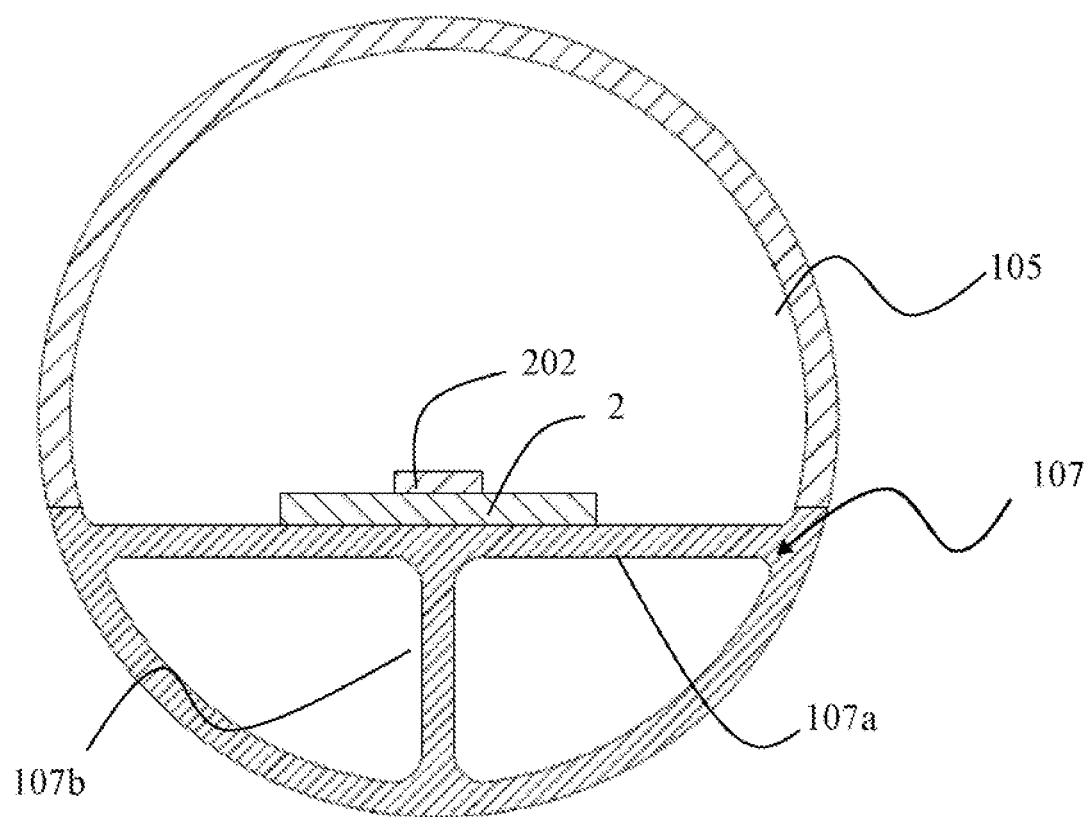
FIG. 6 is a cross-sectional view illustrating the bracing structure of the lamp tube in accordance with an exemplary embodiment.

Turning to FIG. 6, in accordance with an exemplary embodiment, the bracing structure 107b includes a vertical rib and a curvilinear rib but no horizontal rib. The cross section of the lamp tube 1 defines a hypothetical circle. A cross section of the light transmissive portion 105 defines an upper arc on the circle. A cross section of the curvilinear rib defines a lower arc on the circle. A cross section of the platform 107a and the vertical rib approximates that of a hypothetical T-beam. All three ends of the T-beam sit on the lower arc. The ratio of the length of the vertical rib to the diameter of the lamp tube 1 depends on a desired totality of considerations such as field angle, heatsinking efficiency and structural strength. The ratio of the length of the vertical rib to the diameter of the lamp tube 1 may be, for example, from 1:1.2 to 1:30. In some embodiments, the ratio of the length of the vertical rib to the diameter of the lamp tube 1 may be from 1:3 to 1:10.

Figure 7:
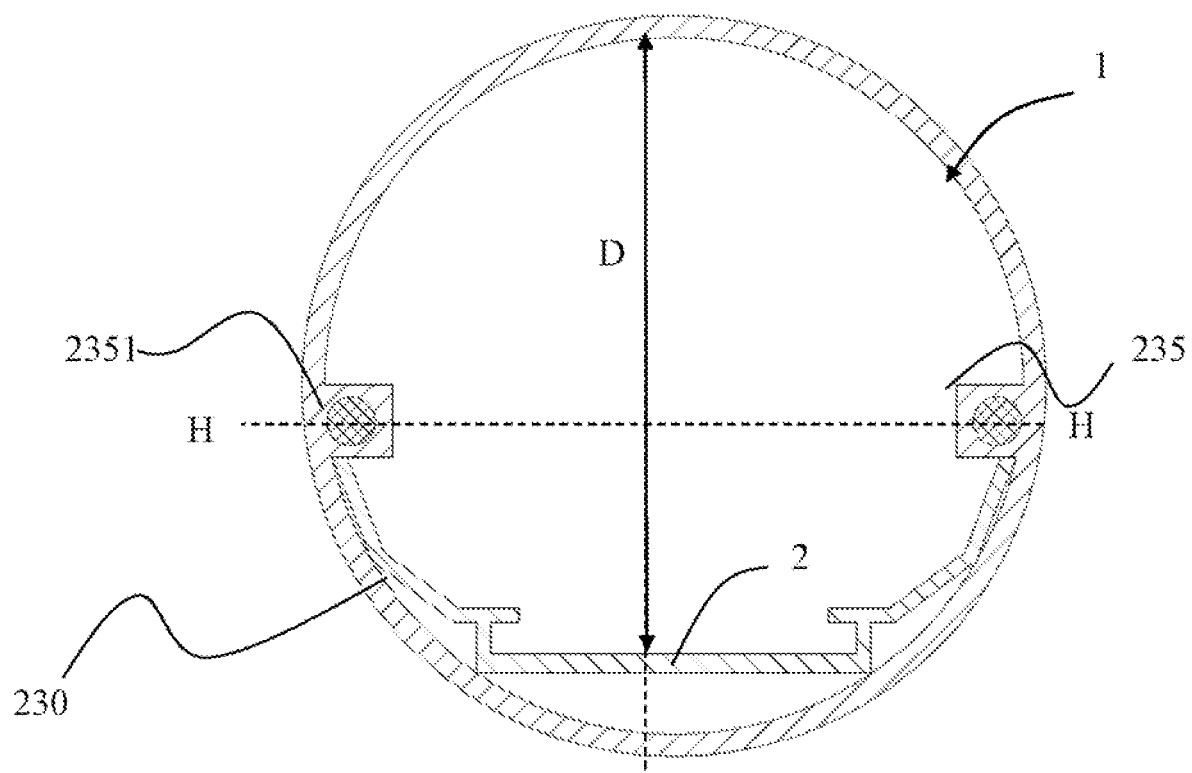
FIG. 7 is a cross-sectional view illustrating a ridge, which extends in an axial direction along an inner surface of the lamp tube, in accordance with an exemplary embodiment.

Turing to FIG. 7, in accordance with an exemplary embodiment, the lamp tube 1 further includes a ridge 235. The ridge 235 extends in an axial direction along an inner surface of the lamp tube 1. The ridge 235 is an elongated hollow structure unbroken from end to end, or alternatively, broken at intervals. Injection molding is used for producing the reinforcing portion 230 and the ridge 235 in an integral piece. The position of the ridge 235 in relation to the line H-H bisecting the hypothetical circle defined by the lamp tube 1 depends on, as elaborated earlier, a desired totality of considerations such as field angle, heatsink efficiency and structural strength.

In an embodiment, the lamp tube 1 further includes a ridge 235 and a maintaining stick 2351. The maintaining stick 2351 is, likewise, an elongated structure, which is unbroken from end to end, or alternatively, broken at intervals, and which fills up the space inside the ridge 235. The maintaining stick 2351 is made of thermally conductive plastic, or alternatively, metal. The metal is one of carbon steel, cast steel, nickel chrome steel, alloyed steel, ductile iron, grey cast iron, white cast iron, rolled manganese bronze, rolled phosphor bronze, cold-drawn bronze, rolled zinc, aluminum alloy and copper alloy. The material from which the maintaining stick 2351 is made is chosen to provide the LED tube lamp with a combination of heat dissipation capability and structural strength that is otherwise absent from other parts of the lamp tube 1. In an embodiment, the maintaining stick 2351 is made from a different material than the material from which the LED light strip 2 or the reinforcing portion 107 is made. For example, when the LED light strip 2 or the reinforcing portion 107 of the lamp tube 1 is made from a metal having superior heat dissipation capability but insufficient stiffness, e.g. aluminum panel, the maintaining stick 2351 is made from a metal stiffer than aluminum to supply more structural strength. In some embodiments, the ratio of the volume of heatsinking-oriented metal to the volume of stiffness-oriented metal in a lamp tube 1 is from 0.001:1 to 100:1. In other embodiments, the ratio is from 0.1:1 to 10:1. In some embodiments, the ratio of the cross-sectional area of the maintaining stick 2351 to that of the lamp tube 1 is from 1:20 to 1:100. In other embodiments, the ratio is from 1:50 to 1:100.

In some embodiments, the lamp tube 1 includes a light transmissive portion and a reinforcing portion. In other embodiments, a ridge is substituted for the reinforcing portion. In some exemplary embodiments, the lamp tube 1 may include a light transmissive portion and a ridge, but no reinforcing portion. In an improved embodiment, the lamp tube 1 further includes a maintaining stick that fills up the space inside the ridge.

The outer surface of the reinforcing portion forms an outer surface of the lamp tube 1, as the embodiments in FIGS. 1-6. Alternatively, the outer surface of the reinforcing portion forms none of the outer surface of the lamp tube, as the embodiments in FIGS. 7-11. Where the reinforcing portion 107 is disposed entirely inside the lamp tube 1, the reinforcing portion 107 rests on the inner surface of the lamp tube 1 along a substantially uninterrupted interface, as the embodiment in FIG. 8; or alternatively, along an interrupted interface, as the embodiments in FIGS. 7, 9-11.

Focusing on FIG. 7, in accordance with an exemplary embodiment, a first compartment is defined by the reinforcing portion 107 and the inner surface of the lamp tube 1. A second compartment is defined by the LED light strip 2 and the inner surface of the lamp tube 1. Likewise, in FIG. 8, a compartment is defined by the platform 231, the horizontal rib and the curvilinear rib. In some embodiments, a ridge is disposed inside the compartment for great structural strength. In other embodiments, a maintaining stick fills up the space inside the hollow structure of the ridge.

The length of the reinforcing portion, on which the LED light assembly is disposed, in the vertical direction in relation to the diameter of the lamp tube depends on the field angle the lamp tube is designed to produce. In the embodiment shown in FIG. 7, the ratio of the distance (D) between the LED light assembly and the dome of the lamp tube 1 to the diameter of the lamp tube 1 may be, for example, from 0.25 to 0.9. In some exemplary embodiments, the ratio of the distance (D) between the LED light assembly and the dome of the lamp tube 1 to the diameter of the lamp tube 1 may be from 0.33 to 0.75.

Figure 8:
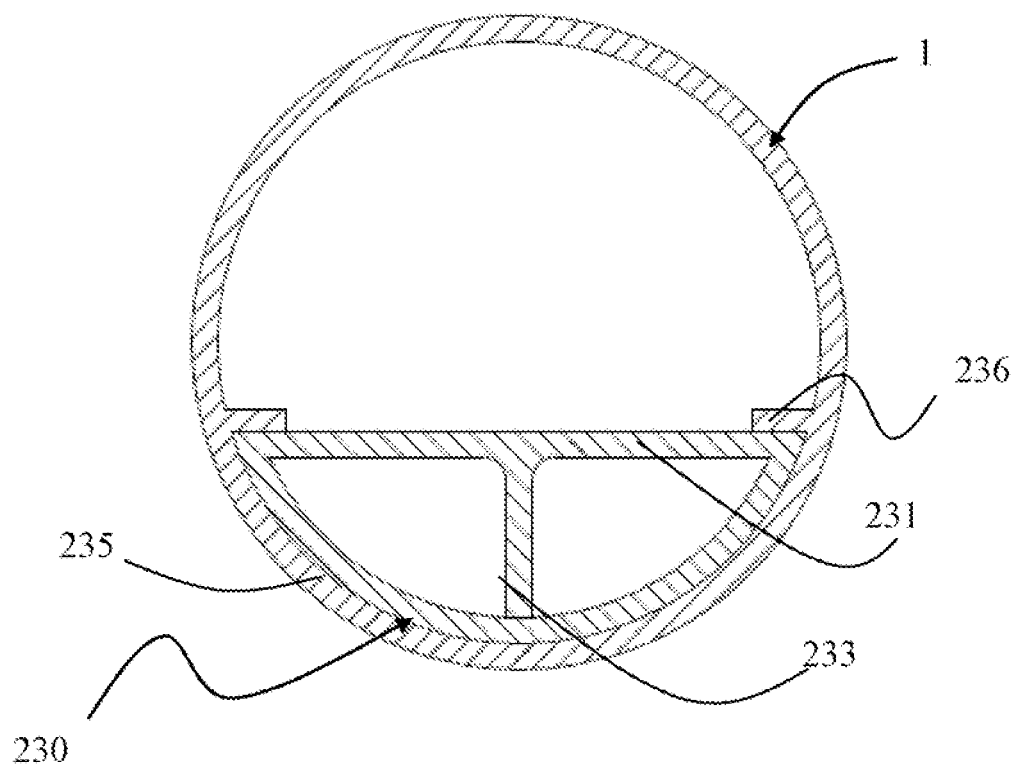
FIG. 8 is a cross-sectional view illustrating a compartment, which is defined by the bracing structure of the lamp tube, in accordance with an exemplary embodiment.

Turning to FIG. 8, in accordance with an exemplary embodiment, the lamp tube further includes a pair of protruding bars 236. The protruding bar 236 extends in an axial direction along an inner surface of the lamp tube 1 and is configured to form a guiding channel inside the lamp tube 1.

The reinforcing portion 107 is connected to the lamp tube 1 by sliding the reinforcing portion 107 into the guiding channel. In the embodiment, a cross section of an inner surface of the lamp tube 1 defines a hypothetical circle. A cross section of the curvilinear rib 230 defines a lower arc on the circle. A cross section of the platform 231 and the vertical rib 233 approximates that of a hypothetical T-beam. All three ends of the T-beam sit on the lower arc. The pair of protruding bars 236 and the inner surface of the lamp tube 1 form the guiding channel in the lamp tube 1. The cross section of the guiding channel is defined by the flange of the T-beam and the lower arc. The reinforcing portion 107 may be configured to fit snugly into the guiding channel.

Figure 9:
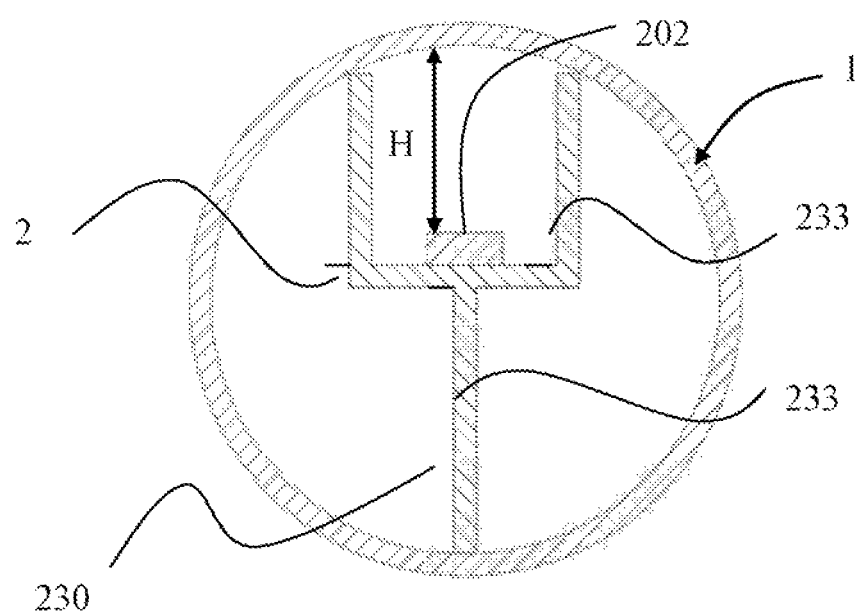
FIG. 9 is a cross-sectional view illustrating the bracing structure of the lamp tube in accordance with an exemplary embodiment.
Figure 10:
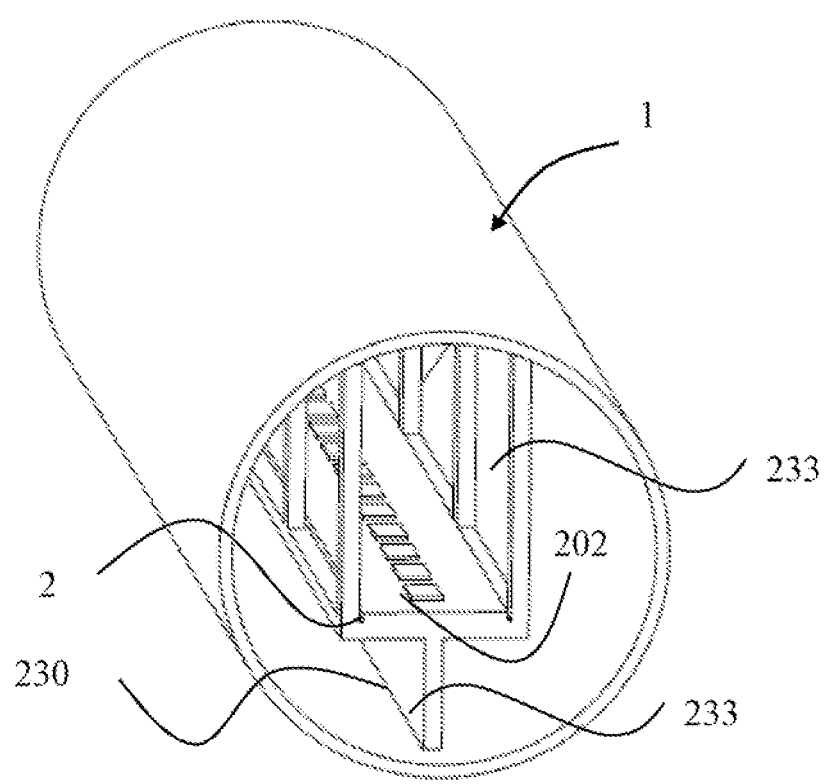
FIG. 10 is a perspective view of the lamp tube shown in FIG. 9.

Turning to FIGS. 9 and 10, in accordance with an exemplary embodiment, the reinforcing portion 230 includes a plurality of vertical ribs 233. The vertical rib 233 is fixedly connected to the inner surface of the lamp tube 1 on one end and to the LED light strip 2 on the other end. The LED light assembly may be spaced apart from the inner surface of the plastic lamp tube 1. The plastic lamp tube 1 is protected from heat generated by the LED light assembly because the heat is taken away from the lamp tube 1 by the plurality of the vertical ribs 233. A cross section of the lamp tube 1 cuts through an LED light source 202, a first vertical rib 233 connected to an upper surface of the LED light assembly, a second vertical rib 233 connected to a lower surface of the LED light assembly or any combination of the above. In some embodiments, the LED light assembly, the first vertical rib 233 and the second vertical rib 233 may be aligned with one another, or alternatively, may be staggered. In an embodiment, the second vertical rib 233 connected to the lower surface of the LED light assembly is an unbroken structure extending along the longitudinal axis of the lamp tube 1 for better heat dissipation and more structural strength. In FIG. 10, the plurality of first vertical ribs 233 are spaced apart from one another like an array of pillars. However, the second vertical rib 233 extends uninterruptedly between the lower surface of the LED light assembly and the lamp tube 1 like a wall.

Figure 11:
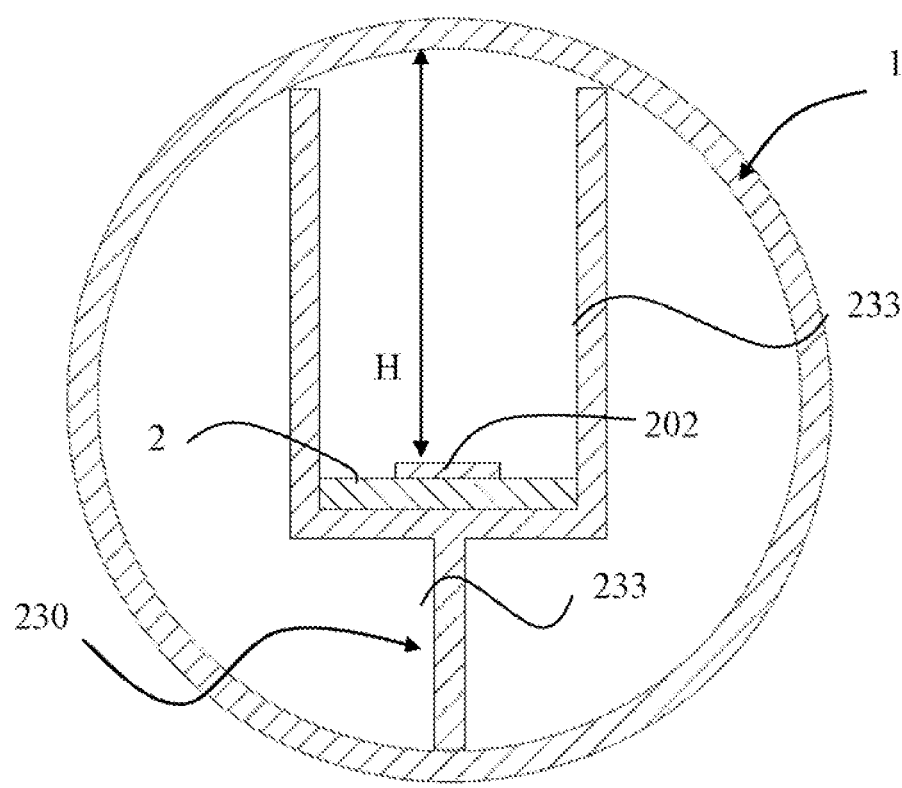
FIG. 11 is a cross-sectional view illustrating the bracing structure of the lamp tube in accordance with an exemplary embodiment.

Turning to FIG. 11, in accordance with an exemplary embodiment, the reinforcing portion 230 further includes a platform. The vertical rib 233 is fixedly connected to, instead of the LED light assembly, the platform on one end and to the inner surface on the other end. The vertical ribs 233 and the platform may be one integral structure. The LED light assembly is thermally connected to an upper surface of the platform.

The position of the LED light strip 2 inside the lamp tube 1—i.e. the length of the first vertical rib 233 and the length of the second vertical rib 233—is chosen in light of a desired totality of factors such as field angle, heat-dissipating capability and structural strength. In FIGS. 9 and 11, the ratio of the distance (H) between the LED light strip 2 and the dome of the lamp tube 1 to the diameter of the lamp tube 1 may be, for example, from 0.25 to 0.9. In some embodiments, the ratio of the distance (H) between the LED light strip 2 and the dome of the lamp tube 1 to the diameter of the lamp tube 1 may be from 0.33 to 0.75.

Figure 12:
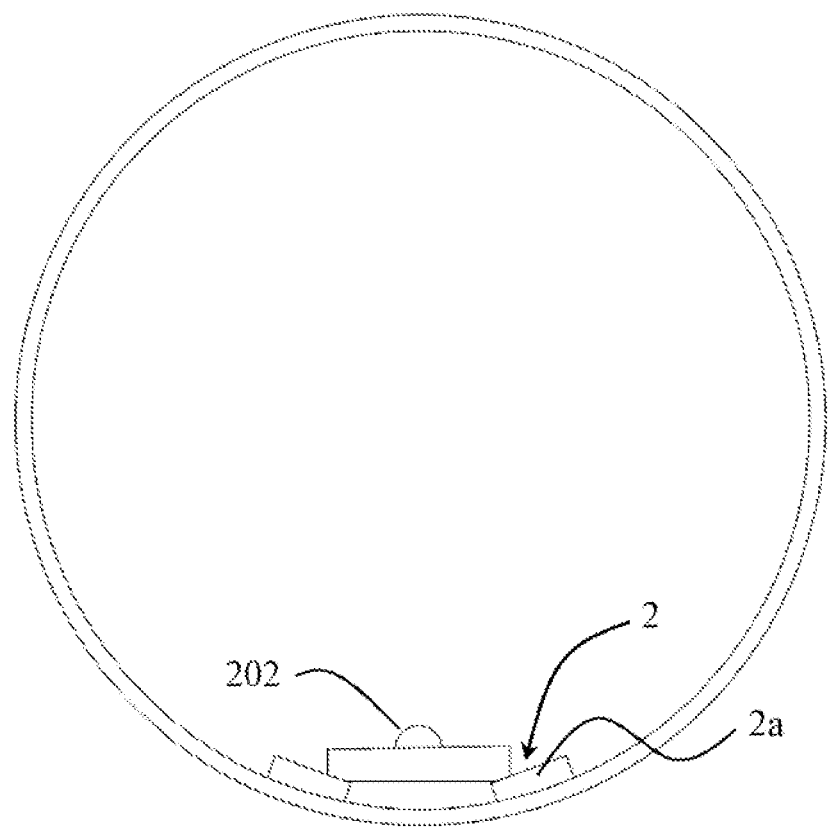
FIG. 12 is a cross-sectional view illustrating the LED light strip with a wiring layer in accordance with an exemplary embodiment.
Figure 13:
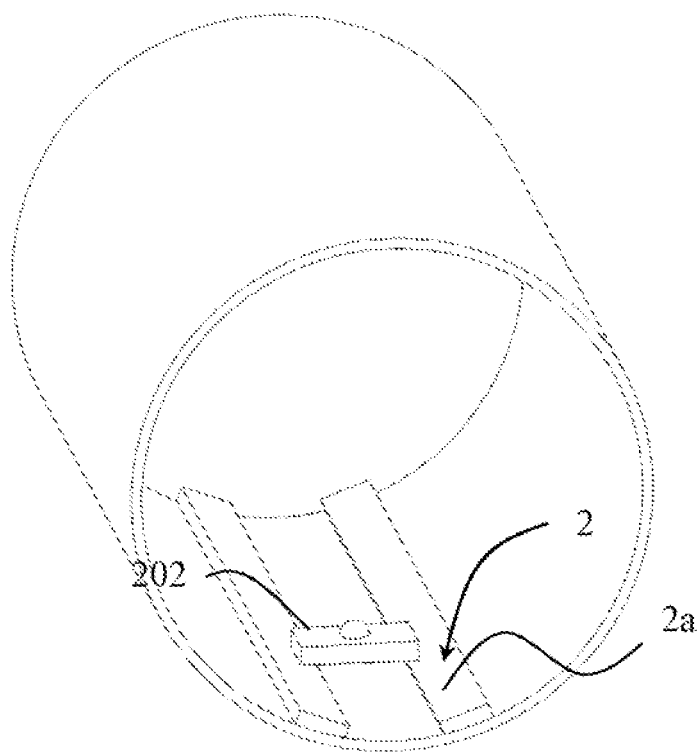
FIG. 13 is a perspective view of the lamp tube shown in FIG. 12.
Figure 16:
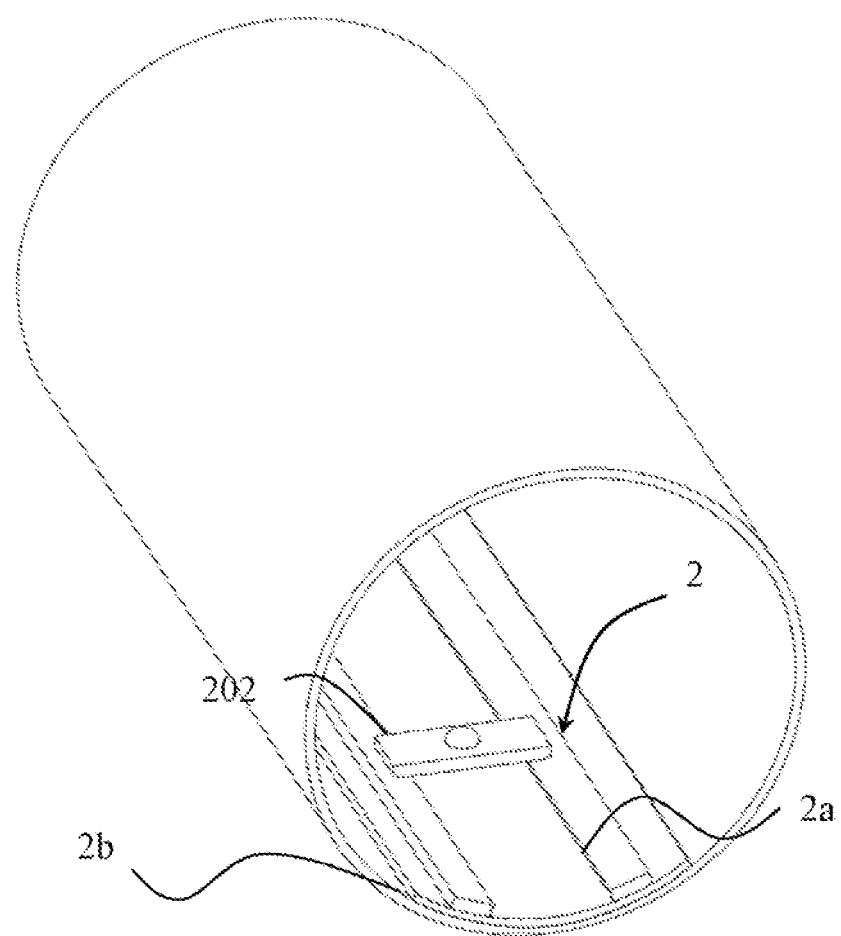
FIG. 16 is a perspective view illustrating a dielectric layer disposed on the wiring layer adjacent to the lamp tube in accordance with an exemplary embodiment.
Figure 17:
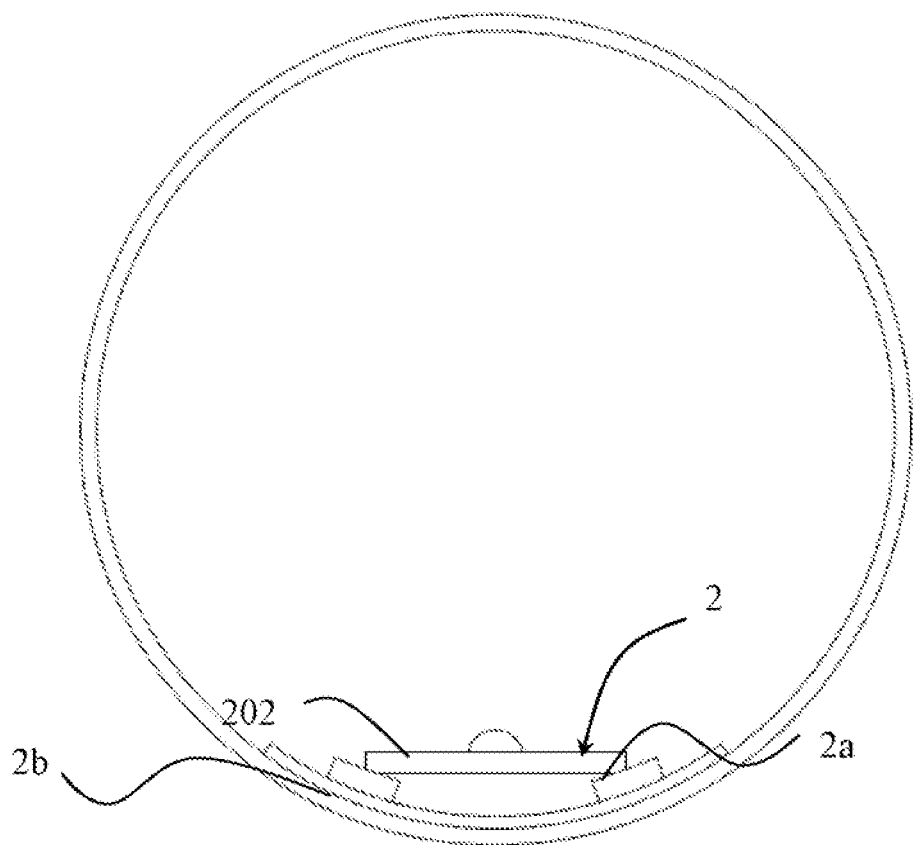
FIG. 17 is a perspective view of the lamp tube shown in FIG. 16.

In an embodiment, the LED light strip is made from flexible substrate material. Referring to FIGS. 12 and 13, in accordance with an exemplary embodiment, the flexible LED light strip 2 includes a wiring layer 2a. The wiring layer 2a is an electrically conductive layer, e.g. a metallic layer or a layer of copper wire, and is electrically connected to the power supply. The LED light source 202 is disposed on and electrically connected to a first surface of the wiring layer 2a. Turning to FIGS. 16 and 17, the LED light strip 2 further includes a dielectric layer 2b. A dielectric layer 2b is disposed on a second surface of the wiring layer 2a. The dielectric layer 2b has a different surface area from the wiring layer 2a. The LED light source 202 is disposed on a surface of the wiring layer 2a which is opposite to the other surface of the wiring layer 2a which is adjacent to the dielectric layer 2b. The wiring layer 2a can be a metal layer or a layer having wires such as copper wires.

In an embodiment, the LED light strip 2 further includes a protection layer over the wiring layer 2a and the dielectric layer 2b. The protection layer is made from one of solder resists such as liquid photoimageable.

Figure 14:
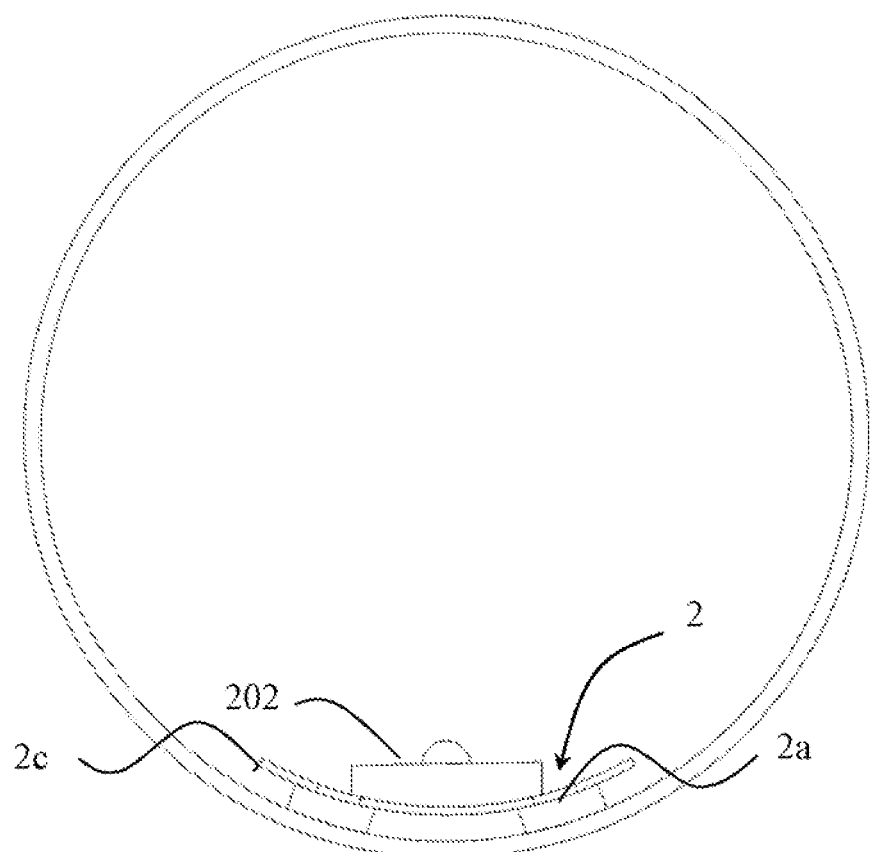
FIG. 14 is cross-sectional view illustrating a protection layer disposed on the wiring layer in accordance with an exemplary embodiment.
Figure 15:
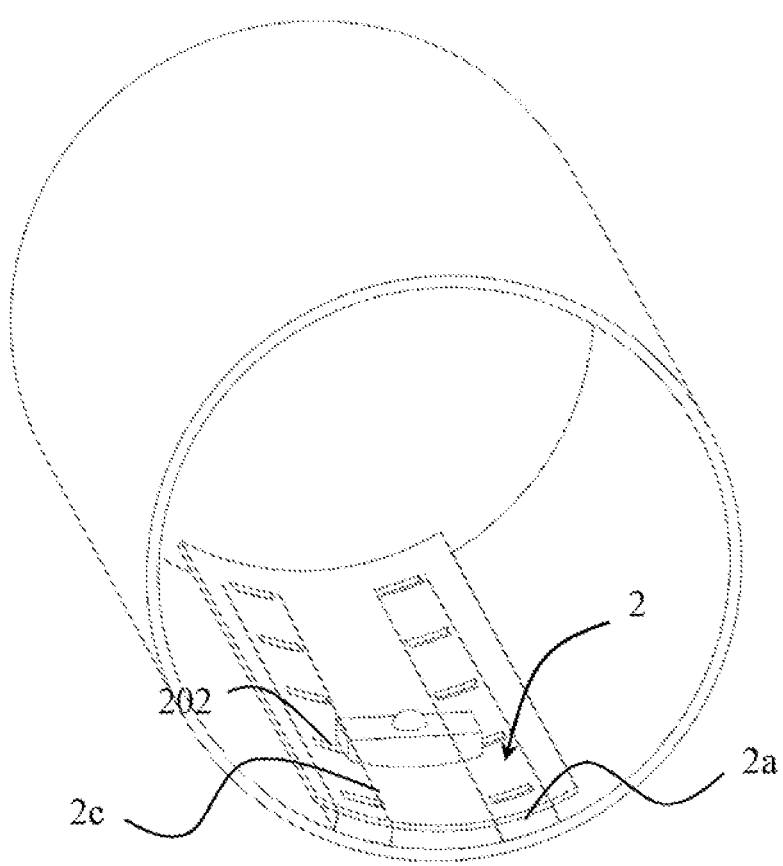
FIG. 15 is a perspective view of the lamp tube shown in FIG. 14.

In another embodiment, as shown in FIGS. 14 and 15, the outer surface of the wiring layer 2a or the dielectric layer 2b (i.e. the two-layered structure) may be covered with a circuit protective layer 2c made of ink for resisting soldering and increasing reflectivity. Alternatively, the dielectric layer 2b is omitted and the wiring layer 2a is directly bonded to the inner circumferential surface of the lamp tube (i.e. the one-layered structure), and the outer surface of the wiring layer 2a is coated with the circuit protective layer 2c. As shown in FIGS. 14 and 15, the circuit protective layer 2c has openings such that the LED light sources 202 are electrically connected to the wiring layer 2a. Whether the one-layered or the two-layered structure is used, the circuit protective layer 2c can be adopted. The bendable circuit sheet is a one-layered structure including just one wiring layer 2a, or a two-layered structure including one wiring layer 2a and one dielectric layer 2b, and may be more bendable or flexible to curl when compared with conventional three-layered flexible substrates (one dielectric layer sandwiched by two wiring layers). Consequently, the bendable circuit sheet of the LED light strip 2 can be installed in a lamp tube with a customized shape or non-tubular shape, and fitly mounted to the inner surface of the lamp tube. In some embodiments, the bendable circuit sheet may be closely mounted to the inner surface of the lamp tube. In addition, using fewer layers of the bendable circuit sheet improves heat dissipation and lowers costs for materials.

Figure 18:
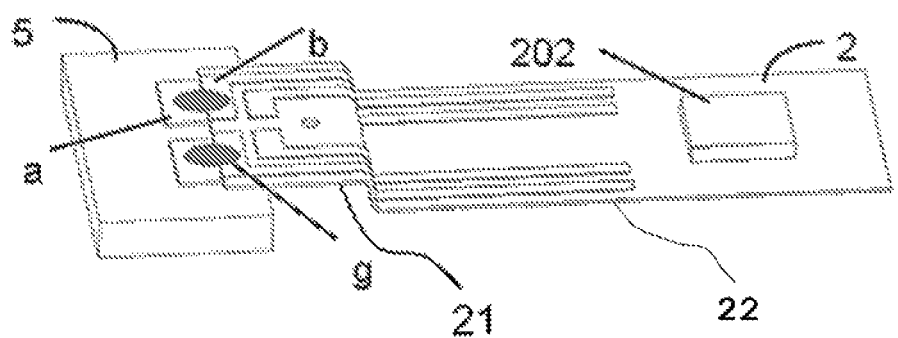
FIG. 18 is a perspective view illustrating a soldering pad on the bendable circuit sheet of the LED light strip to be joined together with the printed circuit board of the power supply in accordance with an exemplary embodiment.

In some embodiments, any type of power supply 5 can be electrically connected to the LED light strip 2 by means of traditional wire bonding technique, in which a metal wire has an end connected to the power supply 5 while having the other end connected to the LED light strip 2. Furthermore, the metal wire is wrapped with an electrically insulating tube to protect a user from being electrically shocked. However, the bonded wires tend to be easily broken during transportation and can therefore cause quality issues. A portion of a power supply 5 is depicted in FIG. 18, for example, and certain other figures. The power supply and a power supply module will be discussed in greater detail below.

In still another embodiment, the connection between the power supply 5 and the LED light strip is accomplished via soldering (e.g., using tin), rivet bonding, or welding. One way to secure the LED light strip 2 is to provide the adhesive sheet at one side thereof and attach the LED light strip 2 to the inner surface of the lamp tube 1 via the adhesive sheet. Two ends of the LED light strip 2 are either fixed to or detached from the inner surface of the lamp tube 1.

In case where two ends of the LED light strip 2 are fixed to the inner surface of the lamp tube 1, a bendable circuit sheet of the LED light strip 2 may be provided with a female plug and the power supply is provided with a male plug to accomplish the connection between the LED light strip 2 and the power supply 5. In this case, the male plug of the power supply is inserted into the female plug to establish electrical connection.

In a case where two ends of the LED light strip 2 are not attached from the inner surface of the lamp tube and that the LED light strip 2 is connected to the power supply 5 via wire-bonding, any movement in subsequent transportation is likely to cause the bonded wires to break. Therefore, in some embodiments, the connection between the light strip 2 and the power supply 5 could be accomplished via direct soldering. For example, the ends of the LED light strip 2 including the bendable circuit sheet can be arranged to pass over the strengthened transition region and be directly solder bonded to an output terminal of the power supply 5 such that the product quality is improved without using wires. In this way, the female plug and the male plug respectively provided for the LED light strip 2 and the power supply 5 are no longer needed.

Figure 24:
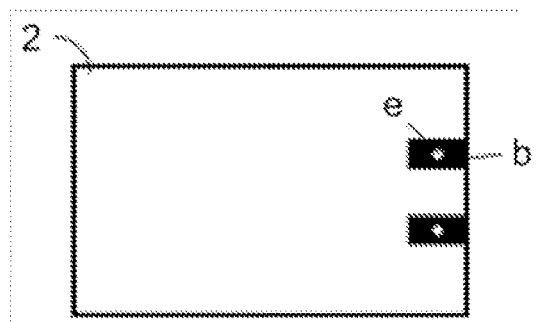
FIG. 24 is a planar view illustrating through holes formed on the soldering pads in accordance with an exemplary embodiment.

Referring to FIG. 18, an output terminal of the printed circuit board of the power supply 5 may have soldering pads "a" provided with an amount of tin solder with a thickness sufficient to later form a solder joint. Correspondingly, the ends of the LED light strip 2 may have soldering pads "b". The soldering pads "a" on the output terminal of the printed circuit board of the power supply 5 are soldered to the soldering pads "b" on the LED light strip 2 via the tin solder on the soldering pads "a". The soldering pads "a" and the soldering pads "b" may be face to face during soldering such that the connection between the LED light strip 2 and the printed circuit board of the power supply 5 is the most firm. However, this kind of soldering may involve a thermo-compression head pressing on the rear surface of the LED light strip 2 and heating the solder, e.g., the LED light strip 2 intervenes between the thermo-compression head and the solder. This may cause reliability problems. Referring to FIG. 24, a through hole is formed in each of the soldering pads "b" on the LED light strip 2 to allow the soldering pads "b" to overlay the soldering pads "b" without being face-to-face. In this case, the thermo-compression head directly presses solder on the soldering pads "a" on a surface of the printed circuit board of the power supply 5 when the soldering pads "a" and the soldering pads "b" are vertically aligned.

Referring again to FIG. 18, the LED light strip 2 includes a fixed portion 22 and a freely extending portion 21, which has a first end and a second end. The fixed portion 22 is, from end to end, attached to the inner surface of the lamp tube 1 and is thus immovable in relation to the lamp tube 1. The freely extending portion 21 is not attached to anything except at the ends. For example, two ends of the LED light strip 2 detached from the inner surface of the lamp tube 1 are formed as freely extending portions 21, while most of the LED light strip 2 is attached and secured to the inner surface of the lamp tube 1. The first end of the freely extending portion 21, which includes the soldering pad "b" described above, is fixedly and electrically connected to the printed circuit board of the power supply 5. The second end of the freely extending portion 21 is fixedly and electrically connected to (and may be integrally formed with) a near end of the fixed portion 22. In some embodiments, the length of the curved segment defined by the freely extending portion 21 is substantially the same as the linear distance between the ends of the freely extending portion 21. In other embodiments, the length of the curved segment defined by the freely extending portion 21 is longer than the linear distance between the ends of the freely extending portion 21, allowing the freely extending portion 21 to adaptively deform in response to the actual distance from the first end of the freely extending portion 21 to the second end of the freely extending portion 21. The effect of errors during assembly or manufacturing is thus mitigated.

In this embodiment, during the connection of the LED light strip 2 and the power supply 5, the soldering pads "b" and the soldering pads "a" and the LED light sources 202 are on surfaces facing toward the same direction and the soldering pads "b" on the LED light strip 2 are each formed with a through hole "e" as shown in FIG. 24 such that the soldering pads "b" and the soldering pads "a" communicate with each other via the through holes "e." When the freely extending portions 21 are deformed due to contraction or curling up, the soldered connection of the printed circuit board of the power supply 5 and the LED light strip 2 exerts a lateral tension on the power supply 5. Furthermore, the soldered connection of the printed circuit board of the power supply 5 and the LED light strip 2 also exerts a downward tension on the power supply 5 when compared with the situation where the soldering pads "a" of the power supply 5 and the soldering pads "b" of the LED light strip 2 are face to face. This downward tension on the power supply 5 comes from the tin solders inside the through holes "e" and forms a stronger and more secure electrical connection between the LED light strip 2 and the power supply 5.

Figure 19:
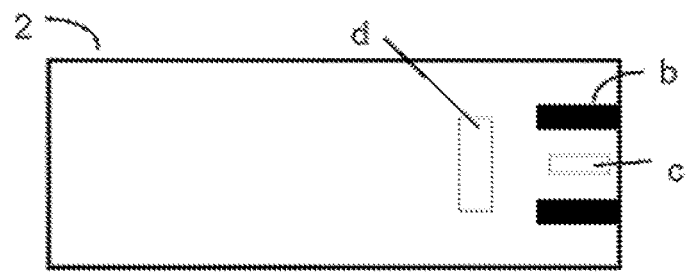
FIG. 19 is a planar view illustrating an arrangement of the soldering pads on the bendable circuit sheet of the LED light strip in accordance with an exemplary embodiment.
Figure 20:
FIG. 20 is a planar view illustrating three soldering pads in a row on the bendable circuit sheet of the LED light strip in accordance with an exemplary embodiment.
Figure 21:
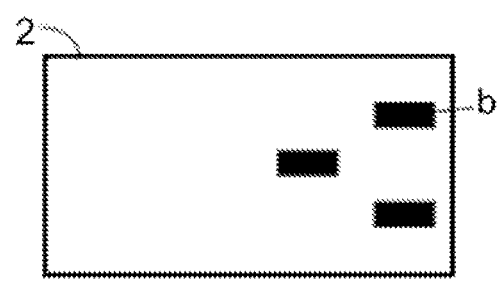
FIG. 21 is a planar view illustrating soldering pads sitting in two rows on the bendable circuit sheet of the LED light strip in accordance with an exemplary embodiment.
Figure 22:
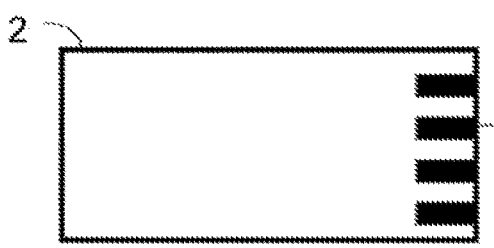
FIG. 22 is a planar view illustrating four soldering pads sitting in a row on the bendable circuit sheet of the LED light strip in accordance with an exemplary embodiment.
Figure 23:
FIG. 23 is a planar view illustrating soldering pads sitting in a two by two matrix on the bendable circuit sheet of the LED light strip in accordance with an exemplary embodiment.

Referring to FIG. 19, in one embodiment, the soldering pads "b" of the LED light strip 2 are two separate pads to electrically connect the positive and negative electrodes of the bendable circuit sheet of the LED light strip 2, respectively. The size of the soldering pads "b" may be, for example, about 3.5×2 mm2. The printed circuit board of the power supply 5 is correspondingly provided with soldering pads "a" having reserved solders (e.g., tin solders) and the height of the tin solders suitable for subsequent automatic soldering bonding process may be generally, for example, about 0.1 to 0.7 mm, in some embodiments 0.3 to 0.5 mm. In some exemplary embodiments, the height of the tin solders suitable for a subsequent automatic solder bonding process is about 0.4 mm. An electrically insulating through hole "c" is formed between the two soldering pads "b" to isolate and prevent the two soldering pads from electrically shorting during soldering. Furthermore, an extra positioning opening "d" may also be provided behind the electrically insulating through hole "c" to allow an automatic soldering machine to quickly locate the soldering pads "b".

There is at least one soldering pad "b" for separately connecting to the positive and negative electrodes of the LED light sources 202. To achieve scalability and compatibility, the amount of the soldering pads "b" on each end of the LED light strip 2 may be more than one such as two, three, four, or more than four. When there is only one soldering pad "b" provided at each end of the LED light strip 2, the two ends of the LED light strip 2 are electrically connected to the power supply 5 to form a loop, and various electrical components can be used. For example, a capacitator may be replaced by an inductor to perform current regulation. Referring to FIGS. 20 to 23, when each end of the LED light strip 2 has three soldering pads, the third soldering pad can be pad is grounded; when each end of the LED light strip 2 has four soldering pads, the fourth soldering pad can be used as a signal input terminal. Correspondingly, the power supply 5 should have a same number of soldering pads "a" as that of the soldering pads "b" on the LED light strip 2. As long as electrical short between the soldering pads "b" can be prevented, the soldering pads "b" should be arranged according to the dimension of the actual area for disposition, for example, three soldering pads can be arranged in a row or two rows. In other embodiments, the number of the soldering pads "b" on the bendable circuit sheet of the LED light strip 2 may be reduced by rearranging the circuits on the bendable circuit sheet of the LED light strip 2. The less the number of the soldering pads, the easier the fabrication process becomes. On the other hand, a greater number of soldering pads may improve and secure the electrical connection between the LED light strip 2 and the output terminal of the power supply 5.

Referring to FIG. 24, in another embodiment, each soldering pads "b" is formed with a through hole "e" having a diameter generally of about 1 to 2 mm. In some embodiments of about 1.2 to 1.8 mm. In yet some embodiments of about 1.5 mm. The through hole "e" communicates the soldering pad "a" with the soldering pad "b" so that the tin solder on the soldering pads "a" passes through the through holes "e" and finally reach the soldering pads "b." A smaller through holes "e" would make it difficult for the tin solder to pass. The tin solder accumulates around the through holes "e" upon exiting the through holes "e" and condense to form a solder ball "g" with a larger diameter than that of the through holes "e" upon condensing. Such a solder ball "g" functions as a rivet to further increase the stability of the electrical connection between the soldering pads "a" on the power supply 5 and the soldering pads "b" on the LED light strip 2.

Figure 25:
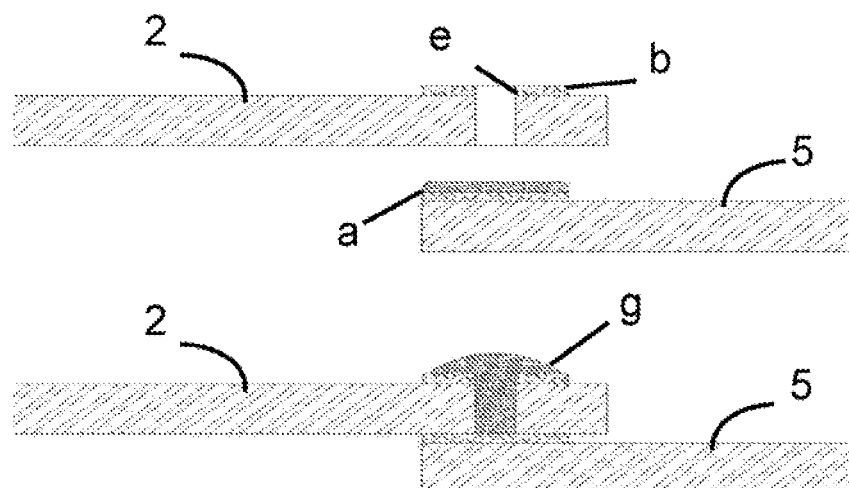
FIG. 25 is a cross-sectional view illustrating the soldering bonding process, which utilizes the soldering pads of the bendable circuit sheet of the LED light strip shown in FIG. 24 taken from side view and the printed circuit board of the power supply, in accordance with an exemplary embodiment.
Figure 26:
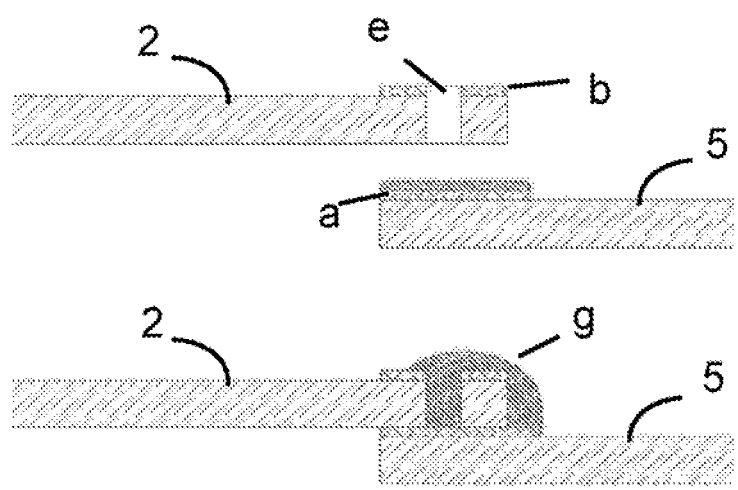
FIG. 26 is across-sectional view illustrating the soldering bonding process, which utilizes the soldering pads of the bendable circuit sheet of the LED light strip shown in FIG. 24, wherein the through hole of the soldering pads is near the edge of the bendable circuit sheet, in accordance with an exemplary embodiment.
Figure 27:
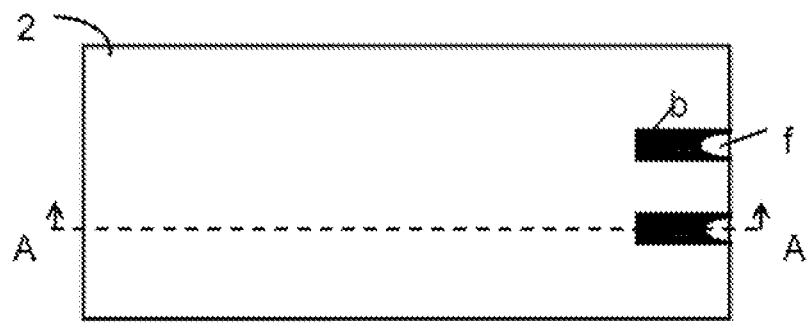
FIG. 27 is a planar view illustrating notches formed on the soldering pads in accordance with an exemplary embodiment.
Figure 28:
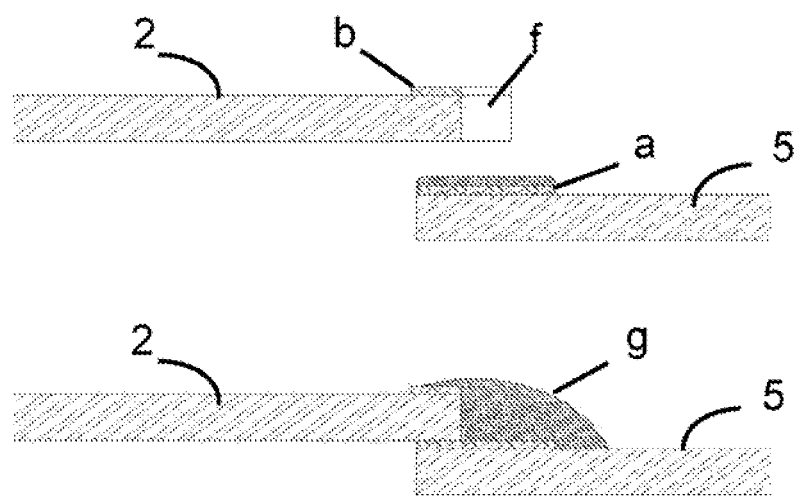
FIG. 28 is a cross-sectional view of the LED light strip shown in FIG. 27 along the line A-A.

Referring to FIGS. 25 to 26, in other embodiments, when a distance from the through hole "e" to the side edge of the LED light strip 2 is less than 1 mm, the tin solder may pass through the through hole "e" to accumulate on the periphery of the through hole "e", and extra tin solder may spill over the soldering pads "b" to reflow along the side edge of the LED light strip 2 and join the tin solder on the soldering pads "a" of the power supply 5. The tin solder then condenses to form a structure like a rivet to firmly secure the LED light strip 2 onto the printed circuit board of the power supply 5 such that reliable electric connection is achieved. Referring to FIG. 27 and FIG. 28, in another embodiment, the through hole "e" is replaced by a notch "f" formed at the side edge of the soldering pads "b" for the tin solder to easily pass through the notch "f" and accumulate on the periphery of the notch "f" and to form a solder ball with a larger diameter than that of the notch "e" upon condensing. Such a solder ball may be formed like a C-shape rivet to enhance the secure capability of the electrically connecting structure.

The abovementioned through hole "e" or notch "f" might be formed in advance of soldering or formed by direct punching with a thermo-compression head during soldering. The portion of the thermo-compression head for touching the tin solder may be flat, concave, or convex, or any combination thereof. The portion of the thermo-compression head for restraining the object to be soldered such as the LED light strip 2 may be strip-like or grid-like. The portion of the thermo-compression head for touching the tin solder does not completely cover the through hole "e" or the notch "f" to make sure that the tin solder passes through the through hole "e" or the notch "f". The portion of the thermo-compression head being concave may function as a compartment to receive the solder ball.

The power supply 5, which may include a power supply module, includes a set of electronic components operatively interconnected to drive the LED light source. The electronic components are disposed on the LED light strip, on the end cap, on the reinforcing portion, or on any combination of the above. For example, the power supply module may include all electronic components of the LED tube lamp for supplying power to the LEDs that form the LED light source, such as all electronic components of a rectifying circuit, a filtering circuit, a driving circuit (if any), and an over voltage protection circuit (if any). As discussed herein a power supply or electronic components described as being "on the end cap" may be on a circuit board fixedly attached to an end cap. In this case, some of all of this power supply or these components may be disposed in the end cap. The distribution of the set of power supply module electronic components in a lamp tube depends on a desired totality of such considerations as heat dissipation, circuit design, easy assembly and form factor of the lamp tube. In one embodiment, the entire set of the electronic components is disposed on exactly one of the LED light strip, the reinforcing portion, and the end cap. When the entire set of electronic components is lumped together on exactly one part of the lamp tube, the assembly of the tube lamp is made easier and the design of circuit simplified. When the entire set of electronic components is disposed on the LED light strip (e.g., fixedly attached to a surface of the LED light strip, and/or embedded as part of the LED light strip), a dedicated dielectric layer—which would be otherwise necessary if an electronic component is disposed on a metallic object (e.g. the reinforcing portion made of aluminum alloy)—is no longer needed because the LED light strip is built on a non-conductive substrate. When the entire set of electronic components is disposed on the reinforcing portion (e.g., fixedly attached to a surface of the reinforcing portion), heat coming from the power supply module is taken away faster because the reinforcing portion is close by to drain the energy. When the entire set of electronic components is disposed on the end cap, (e.g., on a rigid circuit board fixedly attached to the end cap (e.g., to be supported by the end cap), and which electronic components may be in the end cap, heat coming from the power supply module is less likely to impact the LED light source because the power supply module is kept spaced apart from the LED light source.

In another embodiment, the entire set of electronic components for the power supply module is disposed on exactly two of the LED light strip, the reinforcing portion and the end cap. For example, when the entire set of electronic components is distributed to the reinforcing portion and the end cap but nowhere else, the LED light strip is amenable to a replaceable design without entangling the rest of the lamp tube. When the entire set of electronic components is distributed to the LED light strip and the reinforcing portion but nowhere else, the end cap is detachable without entangling the rest of the lamp tube. When the entire set of electronic components is distributed to the LED light strip and the end cap but nowhere else, the reinforcing portion is amenable to a minimal design—without having to carry the power supply module—to drop the weight of the lamp tube and cut cost.

When the set of electronic components is disposed on the end cap and on at least one of the LED light strip and the reinforcing portion, the space inside the lamp tube is optimally used if components with a bigger dimension—e.g. the inductor and the electrolytic capacitor—are disposed in the end cap. In an embodiment, any one of the electronic components disposed in the end cap is bigger than an electronic component disposed elsewhere in the lamp tube. For example, at least one of an inductor and an electrolytic capacitor is disposed in the end cap but the rest of smaller electronic components are disposed elsewhere.

In yet another embodiment, the entire set of electronic components for the power supply module is distributed to each one of the LED light strip, the reinforcing portion and the end cap. For example, the components that generate the most heat may sit on the reinforcing portion for quick heatsinking. The bigger components may be lodged in the end cap to save space. The rest of the components may stay on the LED light strip.

When a set of electronic components is disposed on an object, the set of electronic components may be disposed on a same side of the object (e.g., same surface of the object). Alternatively, the set of electronic components may be disposed on both sides of the object (e.g., opposite surfaces of the object). Assembly can be made easier when all components sit on a same side of the object than when on both sides of the object because the latter entails extra structures such as through holes and connection wiring. However, having components on both sides potentially increases the space for circuit layouts on the LED light strip otherwise available when all components are laid out on a same side. For example, in one embodiment, when a set of electronic components is disposed on the LED light strip, the set of electronic components is disposed on a same side of the LED light strip. Alternatively, the set of electronic components is disposed on both sides of the LED light strip. The LED light strip includes a top surface facing the light transmissive portion and a bottom surface facing the reinforcing portion. In an embodiment, the entire set of electronic components is disposed on the top surface of the LED light strip. In another embodiment, the entire set of electronic components is disposed on the bottom surface of the LED light strip. In yet another embodiment, an electronic component is disposed on the top surface of the LED light strip and an electronic component is disposed on the bottom surface of the LED light strip. Likewise, in one embodiment, when a set of electronic components is disposed on the reinforcing portion, the set of electronic components is disposed on a same side of the reinforcing portion. Alternatively, the set of electronic components may be disposed on both sides of the reinforcing portion. The reinforcing portion includes a top surface facing the light transmissive portion and a bottom surface facing away the light transmissive portion. In an embodiment, the entire set of electronic components is disposed on the top surface of the reinforcing portion. In another embodiment, the entire set of electronic components is disposed on the bottom surface of the reinforcing portion. In yet another embodiment, an electronic component is disposed on the top surface of the reinforcing portion and an electronic component is disposed on the bottom surface of the reinforcing portion.

The electronic components for the power supply module discussed herein include components that affect (e.g., change, generate, transform, store, or regulate) voltage, current, or signals, and do not refer to simple wires for transmitting a signal. If a total of N power supply electronic components are used in an LED tube lamp, different amounts (e.g., from zero to N) of the electronic components can be disposed on different ones of the LED light strip, the reinforcing portion, and the end cap. These different values may be referred to herein as X, Y, and Z.

In certain embodiments, to mitigate the impact of heat generated by the power supply module on the LED light source, the LED light source (e.g., the entire set of LEDs included in the LED light strip, or a first LED or set of LEDs nearest the power supply) is spaced as far apart from the power supply module as possible. For example, if the lamp tube has a predetermined length ($L1$), the LED light source take up a length of $L12$ (e.g., the LEDs are arranged in a line have a length $L2$ from the first to last LED), the power supply components are disposed at one end of the lamp tube at a distance $L3$ from the end of the lamp tube, and the other end of the lamp tube requires at least a distance of $L4$ for any wiring and/or electronic components, then the predetermined length $L1$ of the lamp tube may be said to have a length of $L2+L3+L4+L5$, where $L5$ is the remaining free space in the lamp tube. So in one embodiment, the LED light source (e.g., set of LEDs on the light strip) is disposed the entire distance $L5$ away from the nearest power supply components. In some embodiments, the power supply module is disposed as close to the end cap as possible. For example, it may be disposed in the end cap, or on the light strip with only a minimal amount of space between the power supply module and the end cap. In other embodiments, the power supply module is disposed in the end cap, at an end of the LED light strip or both.

In an embodiment, the power supply module is disposed in the end cap. In another embodiment, the power supply module is disposed on the junction between the light strip and the end cap. In yet another embodiment, the power supply module is disposed on the light strip and adjacent to the end cap without a gap between the end of the end cap adjacent the light tube and the power supply module. In still another embodiment, the power supply module is disposed on the light strip with a small gap between the end of the end cap adjacent the light tube and the power supply module (e.g., in the longitudinal direction of the LED tube lamp). For example, the small gap may be a small percentage of the length of the power supply module (e.g., less than 10%).

The power supply module 5 is electrically coupled to the LED light strip 2 and certain features and applications of the related power supply assembly are described below. It is noticeable that the circuits and the assemblies mentioned below may be all disposed on the reinforcing portion in the lamp tube to increase the heat dissipating area and efficiency, simplify the circuit design in the end cap, and provide an easier control for the length of the lamp tube in manufacturing. Or, some of them are kept in the end cap (e.g. resistors, or capacitors, or the components with smaller volume or smaller power consumption, the components generating less heat or having better heat resistant) and the others are disposed on the reinforcing portion (e.g. chips, inductors, transistors, or the components with bigger volume, the components generating much heat or having poor heat resistant) so as to increase the heat dissipating area and efficiency and simplify the circuit design in the end cap. The invention is not limited to the disclosed embodiments.

In some embodiments, for example, the circuits and the assemblies disposed on the reinforcing portion in the lamp tube may be implemented by surface mount components. Some of the circuits and the assemblies may be disposed on the LED light strip and then electrically connected to the circuit(s) kept in the end cap via male-female plug or wire with insulating coating/layer for achieving the isolation effect. Or, the circuits and the assemblies related to the power supply may all be disposed on the LED light strip to reduce the reserved length of the LED light strip, which is used for connecting to other circuit board(s), and also to reduce the allowable error length and omit the process for electrically connecting two or more circuit boards, so that the lengths of the lamp tube and the LED light strip could be controlled more precisely. The circuits and the assemblies and the LEDs may be disposed on the same or different side of the reinforcing portion. In some embodiments, the circuits and the assemblies and the LEDs may be disposed on the same side to reduce the process of making through hole(s) on the reinforcing portion for electrically connection. The invention is not limited to the disclosed embodiments.

Next, examples of the circuit design and using of the power supply module are described below.

Figure 29A:
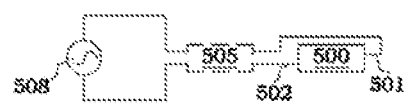
FIG. 29A is a block diagram of an exemplary power supply module in an LED tube lamp according to some embodiments.

FIG. 29A is a block diagram of a power supply system for an LED tube lamp according to an embodiment. Referring to FIG. 29A, an AC power supply 508 is used to supply an AC supply signal, and may be an AC powerline with a voltage rating, for example, from 100 to 277 volts and a frequency rating, for example, of 50 or 60 Hz. A lamp driving circuit 505 receives and then converts the AC supply signal into an AC driving signal as an external driving signal. Lamp driving circuit 505 may be for example an electronic ballast used to convert the AC powerline into a high-frequency high-voltage AC driving signal. Common types of electronic ballast include instant-start ballast, program-start or rapid-start ballast, etc., which may all be applicable to the LED tube lamp. The voltage of the AC driving signal is likely to be higher than 300 volts, and is in some embodiments in the range of from 400 to 700 volts. The frequency of the AC driving signal may be higher than 10 k Hz. In some embodiments, the frequency of the AC driving signal may be in the range of from 20 k to 50 k Hz. The LED tube lamp 500 receives an external driving signal and is thus driven to emit light. In one embodiment, the external driving signal comprises the AC driving signal from lamp driving circuit 505. In one embodiment, LED tube lamp 500 is in a driving environment in which it is power-supplied at its one end cap having two conductive pins 501, 502, which are coupled to lamp driving circuit 505 to receive the AC driving signal. The two conductive pins 501 and 502 may be electrically connected to, either directly or indirectly, the lamp driving circuit 505.

It is worth noting that lamp driving circuit 505 may be omitted and is therefore depicted by a dotted line. In one embodiment, if lamp driving circuit 505 is omitted, AC power supply 508 is directly connected to pins 501 and 502, which then receive the AC supply signal as an external driving signal.

In addition to the above use with a single-end power supply, LED tube lamp 500 may instead be used with a dual-end power supply to one pin at each of the two ends of an LED lamp tube.

Figure 29B:
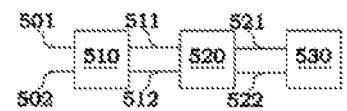
FIG. 29B is a block diagram of an exemplary LED lamp according to some embodiments.

FIG. 29B is a block diagram of an LED lamp according to one embodiment. Referring to FIG. 29B, the power supply module of the LED lamp includes a rectifying circuit 510 and a filtering circuit 520, and may also include some components of an LED lighting module 530. Rectifying circuit 510 is coupled to pins 501 and 502 to receive and then rectify an external driving signal, so as to output a rectified signal at output terminals 511 and 512. The external driving signal may be the AC driving signal or the AC supply signal described with reference to FIG. 29A, or may even be a DC signal. The nature of the external driving signal will not impact on the way the LED lamp is otherwise implemented. Filtering circuit 520 is coupled to the first rectifying circuit for filtering the rectified signal to produce a filtered signal. For instance, filtering circuit 520 is coupled to terminals 511 and 512 to receive and then filter the rectified signal, so as to output a filtered signal at output terminals 521 and 522. LED lighting module 530 is coupled to filtering circuit 520, to receive the filtered signal for emitting light. For instance, LED lighting module 530 may be a circuit coupled to terminals 521 and 522 to receive the filtered signal and thereby to drive an LED light source (not shown) in LED lighting module 530 to emit light. Details of these operations are described in below descriptions of certain embodiments.

It is worth noting that although there are two output terminals 511 and 512 and two output terminals 521 and 522 in embodiments of these FIGS., in practice the number of ports or terminals for coupling between rectifying circuit 510, filtering circuit 520, and LED lighting module 530 may be one or more depending on the signal transmission between the circuits or devices.

In addition, the power supply module of the LED lamp described in FIG. 29B, and embodiments of the power supply module of an LED lamp described below, may each be used in the LED tube lamp 500 in FIG. 29A, and may instead be used in any other type of LED lighting structure having two conductive pins used to conduct power, such as LED light bulbs, personal area lights (PAL), plug-in LED lamps with different types of bases (such as types of PL-S, PL-D, PL-T, PL-L, etc.).

Figure 29C:
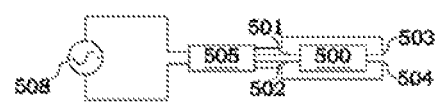
FIG. 29C is a block diagram of an exemplary power supply module in an LED tube lamp according to some embodiments.

FIG. 29C is a block diagram of a power supply system for an LED tube lamp according to an embodiment. Referring to FIG. 29C, an AC power supply 508 is used to supply an AC supply signal. A lamp driving circuit 505 receives and then converts the AC supply signal into an AC driving signal. An LED tube lamp 500 receives an AC driving signal from lamp driving circuit 505 and is thus driven to emit light. In this embodiment, LED tube lamp 500 is power-supplied at its both end caps respectively having two pins 501 and 502 and two pins 503 and 504, which are coupled to lamp driving circuit 505 to concurrently receive the AC driving signal to drive an LED light source (not shown) in LED tube lamp 500 to emit light. AC power supply 508 may be the AC powerline, and lamp driving circuit 505 may be a stabilizer or an electronic ballast.

Figure 29D:
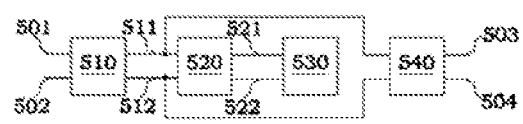
FIG. 29D is a block diagram of an LED lamp according to some embodiments.

FIG. 29D is a block diagram of an LED lamp according to an embodiment. Referring to FIG. 29D, the power supply module of the LED lamp includes a rectifying circuit 510, a filtering circuit 520, and a rectifying circuit 540, and may also include some components of an LED lighting module 530. Rectifying circuit 510 is coupled to pins 501 and 502 to receive and then rectify an external driving signal conducted by pins 501 and 502. Rectifying circuit 540 is coupled to pins 503 and 504 to receive and then rectify an external driving signal conducted by pins 503 and 504. Therefore, the power supply module of the LED lamp may include two rectifying circuits 510 and 540 configured to output a rectified signal at output terminals 511 and 512. Filtering circuit 520 is coupled to terminals 511 and 512 to receive and then filter the rectified signal, so as to generate a filtered signal at output terminals 521 and 522. LED lighting module 530 is coupled to terminals 521 and 522 to receive the filtered signal and thereby to drive an LED light source (not shown) in LED lighting module 530 to emit light.

The power supply module of the LED lamp in this embodiment of FIG. 29D may be used in LED tube lamp 500 with a dual-end power supply in FIG. 29C. It is worth noting that since the power supply module of the LED lamp comprises rectifying circuits 510 and 540, the power supply module of the LED lamp may be used in LED tube lamp 500 with a single-end power supply in FIG. 29A, to receive an external driving signal (such as the AC supply signal or the AC driving signal described above). The power supply module of an LED lamp in this embodiment and other embodiments herein may also be used with a DC driving signal.

Figure 30A:
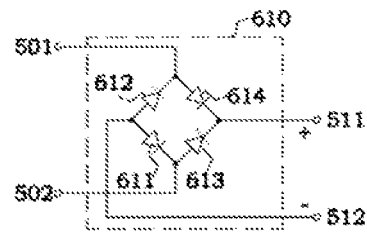
FIG. 30A is a schematic diagram of a rectifying circuit according to some embodiments.

FIG. 30A is a schematic diagram of a rectifying circuit according to an embodiment. Referring to FIG. 30A, rectifying circuit 610 includes rectifying diodes 611, 612, 613, and 614, configured to full-wave rectify a received signal. Diode 611 has an anode connected to output terminal 512, and a cathode connected to pin 502. Diode 612 has an anode connected to output terminal 512, and a cathode connected to pin 501. Diode 613 has an anode connected to pin 502, and a cathode connected to output terminal 511. Diode 614 has an anode connected to pin 501, and a cathode connected to output terminal 511.

When pins 501 and 502 receive an AC signal, rectifying circuit 610 operates as follows. During the connected AC signal's positive half cycle, the AC signal is received from pin 501, diode 614, and output terminal 511 in sequence, and later output through output terminal 512, diode 611, and pin 502 in sequence. During the connected AC signal's negative half cycle, the AC signal is received from pin 502, diode 613, and output terminal 511 in sequence, and later output through output terminal 512, diode 612, and pin 501 in sequence. Therefore, during the connected AC signal's full cycle, the positive pole of the rectified signal produced by rectifying circuit 610 remains at output terminal 511, and the negative pole of the rectified signal remains at output terminal 512. Accordingly, the rectified signal produced or output by rectifying circuit 610 is a full-wave rectified signal.

When pins 501 and 502 are coupled to a DC power supply to receive a DC signal, rectifying circuit 610 operates as follows. When pin 501 is coupled to the anode of the DC supply and pin 502 to the cathode of the DC supply, the DC signal is input through pin 501, diode 614, and output terminal 511 in sequence, and later output through output terminal 512, diode 611, and pin 502 in sequence. When pin 501 is coupled to the cathode of the DC supply and pin 502 to the anode of the DC supply, the DC signal is input through pin 502, diode 613, and output terminal 511 in sequence, and later output through output terminal 512, diode 612, and pin 501 in sequence. Therefore, no matter what the electrical polarity of the DC signal is between pins 501 and 502, the positive pole of the rectified signal produced by rectifying circuit 610 remains at output terminal 511, and the negative pole of the rectified signal remains at output terminal 512.

Therefore, rectifying circuit 610 in this embodiment can output or produce a proper rectified signal regardless of whether the received input signal is an AC or DC signal.

Figure 30B:
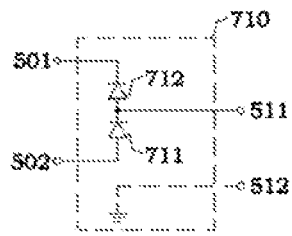
FIG. 30B is a schematic diagram of a rectifying circuit according to some embodiments.

FIG. 30B is a schematic diagram of a rectifying circuit according to an embodiment. Referring to FIG. 30B, rectifying circuit 710 includes rectifying diodes 711 and 712, configured to half-wave rectify a received signal. Diode 711 has an anode connected to pin 502, and a cathode connected to output terminal 511. Diode 712 has an anode connected to output terminal 511, and a cathode connected to pin 501. Output terminal 512 may be omitted or grounded depending on actual applications.

Next, exemplary operation(s) of rectifying circuit 710 is described as follows.

In one embodiment, during a received AC signal's positive half cycle, the electrical potential at pin 501 is higher than that at pin 502, so diodes 711 and 712 are both in a cutoff state as being reverse-biased, making rectifying circuit 710 not outputting a rectified signal. During a received AC signal's negative half cycle, the electrical potential at pin 501 is lower than that at pin 502, so diodes 711 and 712 are both in a conducting state as being forward-biased, allowing the AC signal to be input through diode 711 and output terminal 511, and later output through output terminal 512, a ground terminal, or another end of the LED tube lamp not directly connected to rectifying circuit 710. Accordingly, the rectified signal produced or output by rectifying circuit 710 is a half-wave rectified signal.

Figure 30C:
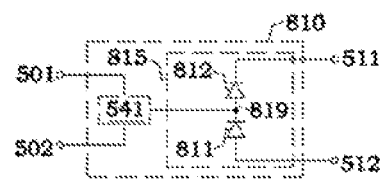
FIG. 30C is a schematic diagram of a rectifying circuit according to some embodiments.

FIG. 30C is a schematic diagram of a rectifying circuit according to an embodiment. Referring to FIG. 30C, rectifying circuit 810 includes a rectifying unit 815 and a terminal adapter circuit 541. In this embodiment, rectifying unit 815 comprises a half-wave rectifier circuit including diodes 811 and 812 and configured to half-wave rectify. Diode 811 has an anode connected to an output terminal 512, and a cathode connected to a half-wave node 819. Diode 812 has an anode connected to half-wave node 819, and a cathode connected to an output terminal 511. Terminal adapter circuit 541 is coupled to half-wave node 819 and pins 501 and 502, to transmit a signal received at pin 501 and/or pin 502 to half-wave node 819. By means of the terminal adapting function of terminal adapter circuit 541, rectifying circuit 810 allows of two input terminals (connected to pins 501 and 502) and two output terminals 511 and 512.

Next, in certain embodiments, rectifying circuit 810 operates as follows.

During a received AC signal's positive half cycle, the AC signal may be input through pin 501 or 502, terminal adapter circuit 541, half-wave node 819, diode 812, and output terminal 511 in sequence, and later output through another end or circuit of the LED tube lamp. During a received AC signal's negative half cycle, the AC signal may be input through another end or circuit of the LED tube lamp, and later output through output terminal 512, diode 811, half-wave node 819, terminal adapter circuit 541, and pin 501 or 502 in sequence.

It's worth noting that terminal adapter circuit 541 may comprise a resistor, a capacitor, an inductor, or any combination thereof, for voltage/current regulation or limiting, types of protection, current/voltage regulation, etc. These functions are described below.

Figure 30D:
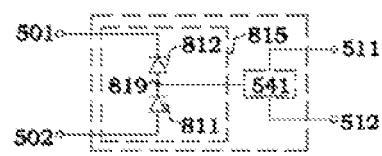
FIG. 30D is a schematic diagram of a rectifying circuit according to some embodiments.

In practice, rectifying unit 815 and terminal adapter circuit 541 are interchangeable in position (as shown in FIG. 30D), without altering the function of half-wave rectification. FIG. 30D is a schematic diagram of a rectifying circuit according to an embodiment. Referring to FIG. 30D, diode 811 has an anode connected to pin 502 and diode 812 has a cathode connected to pin 501. A cathode of diode 811 and an anode of diode 812 are connected to half-wave node 819. Terminal adapter circuit 541 is coupled to half-wave node 819 and output terminals 511 and 512. During a received AC signal's positive half cycle, the AC signal may be input through another end or circuit of the LED tube lamp, and later output through output terminal 512 or 512, terminal adapter circuit 541, half-wave node 819, diode 812, and pin 501 in sequence. During a received AC signal's negative half cycle, the AC signal may be input through pin 502, diode 811, half-wave node 819, terminal adapter circuit 541, and output node 511 or 512 in sequence, and later output through another end or circuit of the LED tube lamp.

It is worth noting that terminal adapter circuit 541 in embodiments shown in FIGS. 30C and 30D may be omitted and is therefore depicted by a dotted line. If terminal adapter circuit 541 of FIG. 30C is omitted, pins 501 and 502 will be coupled to half-wave node 819. If terminal adapter circuit 541 of FIG. 30D is omitted, output terminals 511 and 512 will be coupled to half-wave node 819.

Rectifying circuit 510 as shown and explained in FIGS. 30A-D can be the rectifying circuit 540 shown in FIG. 29D, as having pins 503 and 504 for conducting instead of pins 501 and 502.

Next, an explanation follows as to choosing embodiments and their combinations of rectifying circuits 510 and 540, with reference to FIGS. 29B and 29D.

Rectifying circuit 510 in embodiments shown in FIG. 29B may comprise the rectifying circuit 610 in FIG. 30A.

Rectifying circuits 510 and 540 in embodiments shown in FIG. 29D may each comprise any one of the rectifying circuits in FIGS. 30A-D, and terminal adapter circuit 541 in FIGS. 30C-D may be omitted without altering the rectification function used in an LED tube lamp. When rectifying circuits 510 and 540 each comprise a half-wave rectifier circuit described in FIGS. 30B-D, during a received AC signal's positive or negative half cycle, the AC signal may receive from one of rectifying circuits 510 and 540, and later output from the other rectifying circuit 510 or 540. Further, when rectifying circuits 510 and 540 each comprise the rectifying circuit described in FIG. 30C or 30D, or when they comprise the rectifying circuits in FIGS. 30C and 30D respectively, there may be only one terminal adapter circuit 541 for functions of voltage/current regulation or limiting, types of protection, current/voltage regulation, etc. within rectifying circuits 510 and 540, omitting another terminal adapter circuit 541 within rectifying circuit 510 or 540.

Figure 31A:
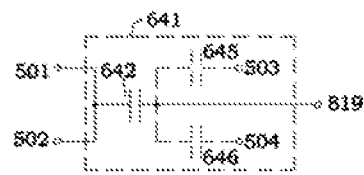
FIG. 31A is a schematic diagram of a terminal adapter circuit according to some embodiments.

FIG. 31A is a schematic diagram of the terminal adapter circuit according to an embodiment. Referring to FIG. 31A, terminal adapter circuit 641 comprises a capacitor 642 having an end connected to pins 501 and 502, and another end connected to half-wave node 819. Capacitor 642 has an equivalent impedance to an AC signal, which impedance increases as the frequency of the AC signal decreases, and decreases as the frequency increases. Therefore, capacitor 642 in terminal adapter circuit 641 in this embodiment works as a high-pass filter. Further, terminal adapter circuit 641 is connected in series to an LED light source in the LED tube lamp, producing an equivalent impedance of terminal adapter circuit 641 to perform a current/voltage limiting function on the LED light source, thereby preventing damaging of the LED light source by an excessive voltage across and/or current in the LED light source. In addition, choosing the value of capacitor 642 according to the frequency of the AC signal can further enhance voltage/current regulation.

It's worth noting that terminal adapter circuit 641 may further include a capacitor 645 and/or capacitor 646. Capacitor 645 has an end connected to half-wave node 819, and another end connected to pin 503. Capacitor 646 has an end connected to half-wave node 819, and another end connected to pin 504. For example, half-wave node 819 may be a common connective node between capacitors 645 and 646. And capacitor 642 acting as a current regulating capacitor is coupled to the common connective node and pins 501 and 502. In such a structure, serially connected capacitors 642 and 645 exist between one of pins 501 and 502 and pin 503, and/or serially connected capacitors 642 and 646 exist between one of pins 501 and 502 and pin 504. Through equivalent impedances of serially connected capacitors, voltages from the AC signal are divided. Referring to FIGS. 29D and 31A, according to ratios between equivalent impedances of the serially connected capacitors, the voltages respectively across capacitor 642 in rectifying circuit 510, filtering circuit 520, and LED lighting module 530 can be controlled, making the current flowing through an LED module in LED lighting module 530 being limited within a current rating, and then protecting/preventing filtering circuit 520 and LED lighting module 530 from being damaged by excessive voltages.

Figure 31B:
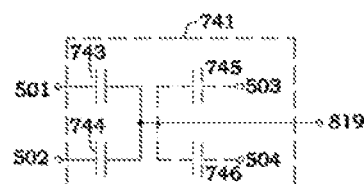
FIG. 31B is a schematic diagram of a terminal adapter circuit according to some embodiments.

FIG. 31B is a schematic diagram of the terminal adapter circuit according to an embodiment. Referring to FIG. 31B, terminal adapter circuit 741 comprises capacitors 743 and 744. Capacitor 743 has an end connected to pin 501, and another end connected to half-wave node 819. Capacitor 744 has an end connected to pin 502, and another end connected to half-wave node 819. Compared to terminal adapter circuit 641 in FIG. 31A, terminal adapter circuit 741 has capacitors 743 and 744 in place of capacitor 642. Capacitance values of capacitors 743 and 744 may be the same as each other, or may differ from each other depending on the magnitudes of signals to be received at pins 501 and 502.

Similarly, terminal adapter circuit 741 may further comprise a capacitor 745 and/or a capacitor 746, respectively connected to pins 503 and 504. For example, each of pins 501 and 502 and each of pins 503 and 504 may be connected in series to a capacitor, to achieve the functions of voltage division and other protections.

Figure 31C:
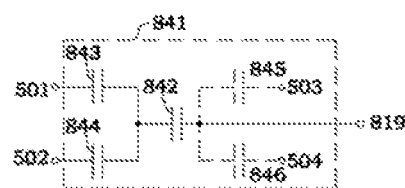
FIG. 31C is a schematic diagram of a terminal adapter circuit according to some embodiments.

FIG. 31C is a schematic diagram of the terminal adapter circuit according to an embodiment. Referring to FIG. 31C, terminal adapter circuit 841 comprises capacitors 842, 843, and 844. Capacitors 842 and 843 are connected in series between pin 501 and half-wave node 819. Capacitors 842 and 844 are connected in series between pin 502 and half-wave node 819. In such a circuit structure, if any one of capacitors 842, 843, and 844 is shorted, there is still at least one capacitor (of the other two capacitors) between pin 501 and half-wave node 819 and between pin 502 and half-wave node 819, which performs a current-limiting function. Therefore, when a user accidentally gets an electric shock, this circuit structure will prevent an excessive current flowing through and then seriously hurting the body of the user.

Similarly, terminal adapter circuit 841 may further comprise a capacitor 845 and/or a capacitor 846, respectively connected to pins 503 and 504. For example, each of pins 501 and 502 and each of pins 503 and 504 may be connected in series to a capacitor, to achieve the functions of voltage division and other protections.

Figure 31D:
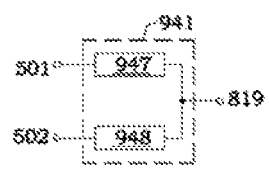
FIG. 31D is a schematic diagram of a terminal adapter circuit according to some embodiments.

FIG. 31D is a schematic diagram of the terminal adapter circuit according to an embodiment. Referring to FIG. 31D, terminal adapter circuit 941 comprises fuses 947 and 948. Fuse 947 has an end connected to pin 501, and another end connected to half-wave node 819. Fuse 948 has an end connected to pin 502, and another end connected to half-wave node 819. With the fuses 947 and 948, when the current through each of pins 501 and 502 exceeds a current rating of a corresponding connected fuse 947 or 948, the corresponding fuse 947 or 948 will accordingly melt and then break the circuit to achieve overcurrent protection.

Each of the embodiments of the terminal adapter circuits as in rectifying circuits 510 and 810 coupled to pins 501 and 502 and shown and explained above can be used or included in the rectifying circuit 540 shown in FIG. 29D, as when conductive pins 503 and 504 and conductive pins 501 and 502 are interchanged in position.

Capacitance values of the capacitors in the embodiments of the terminal adapter circuits shown and described above are in some embodiments in the range, for example, of from 100 pF to 100 nF. Also, a capacitor used in embodiments may be equivalently replaced by two or more capacitors connected in series or parallel. For example, each of capacitors 642 and 842 may be replaced by two serially connected capacitors, one having a capacitance value chosen from the range, for example of from 1.0 nF to 2.5 nF (such as, for example, about 1.5 nF), and the other having a capacitance value chosen from the range, for example of about 1.5 nF to about 3.0 nF (such as, for example, about 2.2 nF).

Figure 32A:
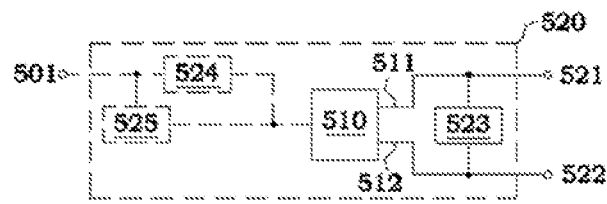
FIG. 32A is a block diagram of a filtering circuit according to some embodiments.

FIG. 32A is a block diagram of the filtering circuit according to an embodiment. Rectifying circuit 510 is shown in FIG. 32A for illustrating its connection with other components, without intending filtering circuit 520 to include rectifying circuit 510. Referring to FIG. 32A, filtering circuit 520 includes a filtering unit 523 coupled to rectifying output terminals 511 and 512 to receive, and to filter out ripples of, a rectified signal from rectifying circuit 510, thereby outputting a filtered signal whose waveform is smoother than the rectified signal. Filtering circuit 520 may further comprise another filtering unit 524 coupled between a rectifying circuit and a pin, which are for example rectifying circuit 510 and pin 501, rectifying circuit 510 and pin 502, rectifying circuit 540 and pin 503, or rectifying circuit 540 and pin 504. Filtering unit 524 is configured to filter out a specific frequency component of an external driving signal. In this embodiment of FIG. 32A, filtering unit 524 is coupled between rectifying circuit 510 and pin 501. Filtering circuit 520 may further comprise another filtering unit 525 coupled between one of pins 501 and 502 and a diode of rectifying circuit 510, or between one of pins 503 and 504 and a diode of rectifying circuit 540, for reducing or filtering out electromagnetic interference (EMI). In this embodiment, filtering unit 525 is coupled between pin 501 and a diode (not shown in FIG. 32A) of rectifying circuit 510. Since filtering units 524 and 525 may be present or omitted depending on actual circumstances of their uses, they are depicted by a dotted line in FIG. 32A.

Figure 32B:
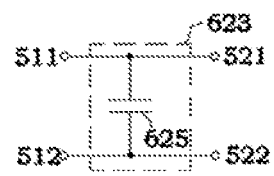
FIG. 32B is a schematic diagram of a filtering unit according to some embodiments.

FIG. 32B is a schematic diagram of the filtering unit according to an embodiment. Referring to FIG. 32B, the filtering unit 623 includes a capacitor 625 having an end coupled to output terminal 511 and a filtering output terminal 521 and another end coupled to output terminal 512 and a filtering output terminal 522. The filtering unit 623 is configured to low-pass filter a rectified signal from output terminals 511 and 512. Also, the filtering unit 623 filters out high-frequency components of the rectified signal and thereby output a filtered signal at output terminals 521 and 522.

Figure 32C:
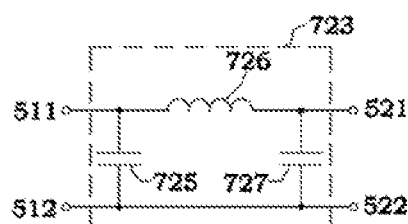
FIG. 32C is a schematic diagram of a filtering unit according to some embodiments.

FIG. 32C is a schematic diagram of the filtering unit according to an embodiment. Referring to FIG. 32C, filtering unit 723 comprises a pi filter circuit including a capacitor 725, an inductor 726, and a capacitor 727. As is well known, a pi filter circuit looks like the symbol n in its shape or structure. Capacitor 725 has an end connected to output terminal 511 and coupled to output terminal 521 through inductor 726, and has another end connected to output terminals 512 and 522. Inductor 726 is coupled between output terminals 511 and 521. Capacitor 727 has an end connected to output terminal 521 and coupled to output terminal 511 through inductor 726, and has another end connected to output terminals 512 and 522.

As seen between output terminals 511 and 512 and output terminals 521 and 522, filtering unit 723 compared to filtering unit 623 in FIG. 32B additionally has inductor 726 and capacitor 727, which are like capacitor 725 in performing low-pass filtering. Therefore, filtering unit 723 in this embodiment compared to filtering unit 623 in FIG. 32B has a better ability to filter out high-frequency components to output a filtered signal with a smoother waveform.

Inductance values of inductor 726 in the embodiment described above are chosen in some embodiments in the range of about 10 nH to about 10 mH. And capacitance values of capacitors 625, 725, and 727 in the embodiments described above are chosen in some embodiments in the range, for example, of about 100 pF to about 1 uF.

Figure 32D:
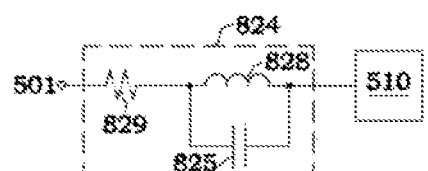
FIG. 32D is a schematic diagram of a filtering unit according to some embodiments.

FIG. 32D is a schematic diagram of the filtering unit according to an embodiment. Referring to FIG. 32D, filtering unit 824 includes a capacitor 825 and an inductor 828 connected in parallel. The capacitor 825 has an end coupled to pin 501, and another end coupled to rectifying output terminal 511. The capacitor 825 is configured to high-pass filter an external driving signal input at pin 501. Also, the capacitor 825 filters out low-frequency components of the external driving signal. The inductor 828 has an end coupled to pin 501 and another end coupled to rectifying output terminal 511. The inductor 828 is configured to low-pass filter an external driving signal input at pin 501. Also, the inductor 828 filters out high-frequency components of the external driving signal. Therefore, the combination of capacitor 825 and inductor 828 works to present high impedance to an external driving signal at one or more specific frequencies. In some embodiments, the parallel-connected capacitor and inductor work to present a peak equivalent impedance to the external driving signal at a specific frequency.

Through appropriately choosing a capacitance value of capacitor 825 and an inductance value of inductor 828, a center frequency f on the high-impedance band may be set at a specific value given by $$f = \frac{1}{2\pi\sqrt{LC}},$$

where L denotes inductance of inductor 828 and C denotes capacitance of capacitor 825. The center frequency may be in the range of, for example, from 20 to 30 kHz. In some embodiments, the center frequency may be about 25 kHz. An LED lamp with filtering unit 824 will be certified under safety standards, for a specific center frequency, as provided by Underwriters Laboratories (UL).

In an embodiment, the filtering unit 824 further comprises a resistor 829, coupled between pin 501 and filtering output terminal 511. In FIG. 32D, resistor 829 is connected in series to the parallel-connected capacitor 825 and inductor 828. For example, resistor 829 may be coupled between pin 501 and parallel-connected capacitor 825 and inductor 828, or may be coupled between filtering output terminal 511 and parallel-connected capacitor 825 and inductor 828. In this embodiment, resistor 829 is coupled between pin 501 and parallel-connected capacitor 825 and inductor 828. Further, resistor 829 is configured for adjusting the quality factor (Q) of the LC circuit comprising capacitor 825 and inductor 828, to better adapt filtering unit 824 to application environments with different quality factor requirements. Since resistor 829 is an optional component, it is depicted in a dotted line in FIG. 32D.

Capacitance values of capacitor 825 may be, for example, in the range of about 10 nF-2 uF. Inductance values of inductor 828 may be smaller than 2 mH. In some embodiments, inductance values of inductor 828 may be smaller than 1 mH. Resistance values of resistor 829 may be larger than 50 ohms. In some embodiments, resistance values of resistor 829 may be larger than 500 ohms.

Besides the filtering circuits shown and described in the above embodiments, traditional low-pass or band-pass filters can be used as the filtering unit in the filtering circuit.

Figure 32E:
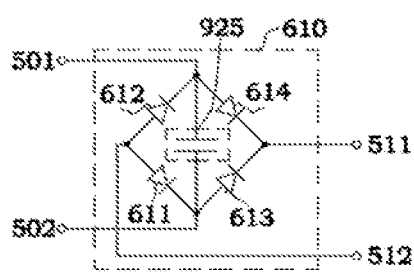
FIG. 32E is a schematic diagram of a filtering unit according to some embodiments.

FIG. 32E is a schematic diagram of the filtering unit according to an embodiment. Referring to FIG. 32E, in this embodiment filtering unit 925 is disposed in rectifying circuit 610 as shown in FIG. 30A, and is configured for reducing the EMI (Electromagnetic interference) caused by rectifying circuit 610 and/or other circuits. In this embodiment, filtering unit 925 includes an EMI-reducing capacitor coupled between pin 501 and the anode of rectifying diode 613, and between pin 502 and the anode of rectifying diode 614, to reduce the EMI associated with the positive half cycle of the AC driving signal received at pins 501 and 502. The EMI-reducing capacitor of filtering unit 925 is also coupled between pin 501 and the cathode of rectifying diode 611, and between pin 502 and the cathode of rectifying diode 612, to reduce the EMI associated with the negative half cycle of the AC driving signal received at pins 501 and 502. In some embodiments, rectifying circuit 610 comprises a full-wave bridge rectifier circuit including four rectifying diodes 611, 612, 613, and 614. The full-wave bridge rectifier circuit has a first filtering node connecting an anode and a cathode respectively of two diodes 613 and 611 of the four rectifying diodes 611, 612, 613, and 614, and a second filtering node connecting an anode and a cathode respectively of the other two diodes 614 and 612 of the four rectifying diodes 611, 612, 613, and 614. And the EMI-reducing capacitor of the filtering unit 925 is coupled between the first filtering node and the second filtering node.

Similarly, with reference to FIGS. 30C, and 31A-31C, any capacitor in each of the circuits in FIGS. 31A-31C is coupled between pins 501 and 502 (or pins 503 and 504) and any diode in FIG. 30C, so any or each capacitor in FIGS. 31A-31C can work as an EMI-reducing capacitor to achieve the function of reducing EMI. For example, rectifying circuit 510 in FIGS. 29B and 29D may comprise a half-wave rectifier circuit including two rectifying diodes and having a half-wave node connecting an anode and a cathode respectively of the two rectifying diodes, and any or each capacitor in FIGS. 31A-31C may be coupled between the half-wave node and at least one of the first pin and the second pin. And rectifying circuit 540 in FIG. 29D may comprise a half-wave rectifier circuit including two rectifying diodes and having a half-wave node connecting an anode and a cathode respectively of the two rectifying diodes, and any or each capacitor in FIGS. 31A-31C may be coupled between the half-wave node and at least one of the third pin and the fourth pin.

It's worth noting that the EMI-reducing capacitor in the embodiment of FIG. 32E may also act as capacitor 825 in filtering unit 824, so that in combination with inductor 828 the capacitor 825 performs the functions of reducing EMI and presenting high impedance to an external driving signal at specific frequencies. For example, when the rectifying circuit comprises a full-wave bridge rectifier circuit, capacitor 825 of filtering unit 824 may be coupled between the first filtering node and the second filtering node of the full-wave bridge rectifier circuit. When the rectifying circuit comprises a half-wave rectifier circuit, capacitor 825 of filtering unit 824 may be coupled between the half-wave node of the half-wave rectifier circuit and at least one of the first pin and the second pin.

Figure 33A:
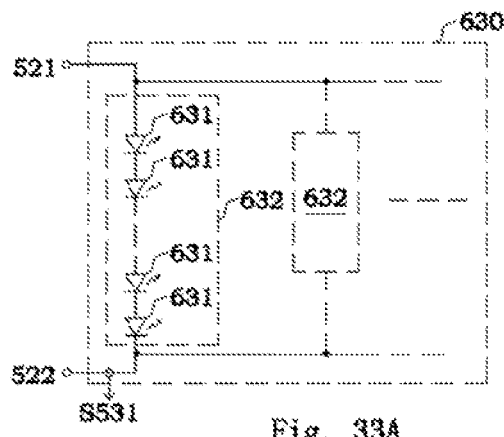
FIG. 33A is a schematic diagram of an LED module according to some embodiments.

FIG. 33A is a schematic diagram of an LED module according to an embodiment. Referring to FIG. 33A, LED module 630 has an anode connected to the filtering output terminal 521, has a cathode connected to the filtering output terminal 522, and comprises at least one LED light source 632. When two or more LED light sources are included, they are connected in parallel. The anode of each LED light source 632 is connected to the anode of LED module 630 and thus output terminal 521, and the cathode of each LED light source 632 is connected to the cathode of LED module 630 and thus output terminal 522. Each LED light source 632 includes at least one LED 631. When multiple LEDs 631 are included in an LED light source 632, they are connected in series, with the anode of the first LED 631 connected to the anode of this LED light source 632, and the cathode of the first LED 631 connected to the next or second LED 631. And the anode of the last LED 631 in this LED light source 632 is connected to the cathode of a previous LED 631, with the cathode of the last LED 631 connected to the cathode of this LED light source 632.

It's worth noting that LED module 630 may produce a current detection signal S531 reflecting a magnitude of current through LED module 630 and used for controlling or detecting on the LED module 630.

Figure 33B:
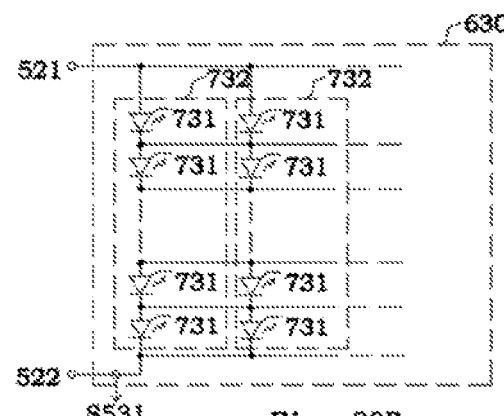
FIG. 33B is a schematic diagram of an LED module according to some embodiments.

FIG. 33B is a schematic diagram of an LED module according to an embodiment. Referring to FIG. 33B, LED module 630 has an anode connected to the filtering output terminal 521, has a cathode connected to the filtering output terminal 522, and comprises at least two LED light sources 732, with the anode of each LED light source 732 connected to the anode of LED module 630, and the cathode of each LED light source 732 connected to the cathode of LED module 630. Each LED light source 732 includes at least two LEDs 731 connected in the same way as described in FIG. 33A. For example, the anode of the first LED 731 in an LED light source 732 is connected to the anode of this LED light source 732, the cathode of the first LED 731 is connected to the anode of the next or second LED 731, and the cathode of the last LED 731 is connected to the cathode of this LED light source 732. Further, LED light sources 732 in an LED module 630 are connected to each other in this embodiment. All of the n-th LEDs 731 respectively of the LED light sources 732 are connected by every anode of every n-th LED 731 in the LED light sources 732, and by every cathode of every n-th LED 731, where n is a positive integer. In this way, the LEDs in LED module 630 in this embodiment are connected in the form of a mesh.

Compared to the embodiments of FIGS. 34A-34G, LED lighting module 530 of the above embodiments includes LED module 630, but doesn't include a driving circuit for the LED module 630.

Similarly, LED module 630 in this embodiment may produce a current detection signal S531 reflecting a magnitude of current through LED module 630 and used for controlling or detecting on the LED module 630.

The number of LEDs 731 included in an LED light source 732 may be in the range of from 15 to 25. In some embodiments, the number of LEDs 731 may be in the range of from 18 to 22.

Figure 33C:
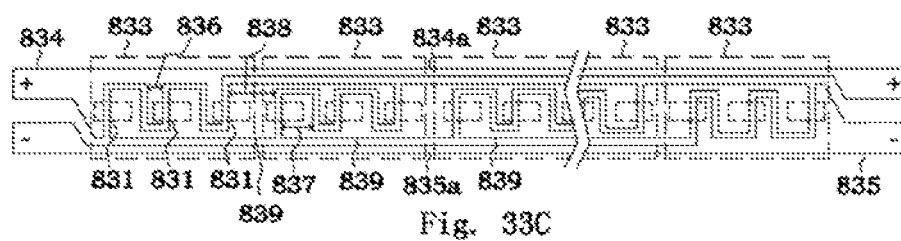
FIG. 33C is a plan view of a circuit layout of the LED module according to some embodiments.

FIG. 33C is a planar view of a circuit layout of the LED module according to an embodiment. Referring to FIG. 33C, in this embodiment LEDs 831 are connected in the same way as described in FIG. 33B, and three LED light sources are assumed in LED module 630 and described as follows for illustration. A positive conductive line 834 and a negative conductive line 835 are to receive a driving signal, for supplying power to the LEDs 831. For example, positive conductive line 834 may be coupled to the filtering output terminal 521 of the filtering circuit 520 described above, and negative conductive line 835 coupled to the filtering output terminal 522 of the filtering circuit 520, to receive a filtered signal. For the convenience of illustration, all three of the n-th LEDs 831 respectively of the three LED light sources are grouped as an LED set 833 in FIG. 33C.

Positive conductive line 834 connects the three first LEDs 831 respectively of the leftmost three LED light sources, at the anodes on the left sides of the three first LEDs 831 as shown in the leftmost LED set 833 of FIG. 33C. Negative conductive line 835 connects the three last LEDs 831 respectively of the leftmost three LED light sources, at the cathodes on the right sides of the three last LEDs 831 as shown in the rightmost LED set 833 of FIG. 33C. And of the three LED light sources, the cathodes of the three first LEDs 831, the anodes of the three last LEDs 831, and the anodes and cathodes of all the remaining LEDs 831 are connected by conductive lines or parts 839.

For example, the anodes of the three LEDs 831 in the leftmost LED set 833 may be connected by positive conductive line 834, and their cathodes may be connected by a leftmost conductive part 839. The anodes of the three LEDs 831 in the second leftmost LED set 833 are also connected by the leftmost conductive part 839, whereas their cathodes are connected by a second leftmost conductive part 839. Since the cathodes of the three LEDs 831 in the leftmost LED set 833 and the anodes of the three LEDs 831 in the second leftmost LED set 833 are connected by the same leftmost conductive part 839, in each of the three LED light sources the cathode of the first LED 831 is connected to the anode of the next or second LED 831, with the remaining LEDs 831 also being connected in the same way. Accordingly, all the LEDs 831 of the three LED light sources are connected to form the mesh as shown in FIG. 33B.

It's worth noting that in this embodiment the length 836 of a portion of each conductive part 839 that immediately connects to the anode of an LED 831 is smaller than the length 837 of another portion of each conductive part 839 that immediately connects to the cathode of an LED 831, making the area of the latter portion immediately connecting to the cathode larger than that of the former portion immediately connecting to the anode. The length 837 may be smaller than a length 838 of a portion of each conductive part 839 that immediately connects the cathode of an LED 831 and the anode of the next LED 831, making the area of the portion of each conductive part 839 that immediately connects a cathode and an anode larger than the area of any other portion of each conductive part 839 that immediately connects to only a cathode or an anode of an LED 831. Due to the length differences and area differences, this layout structure improves heat dissipation of the LEDs 831.

In some embodiments, positive conductive line 834 includes a lengthwise portion 834a, and negative conductive line 835 includes a lengthwise portion 835a, which are conducive to making the LED module have a positive "+" connective portion and a negative "−" connective portion at each of the two ends of the LED module, as shown in FIG. 33C. Such a layout structure allows for coupling any of other circuits of the power supply module of the LED lamp, including e.g. filtering circuit 520 and rectifying circuits 510 and 540, to the LED module through the positive connective portion and/or the negative connective portion at each or both ends of the LED lamp. In some embodiments, the layout structure increases the flexibility in arranging actual circuits in the LED lamp.

Figure 33D:
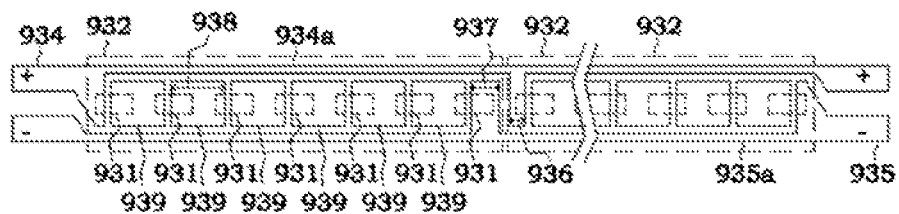
FIG. 33D is a plan view of a circuit layout of the LED module according to some embodiments.

FIG. 33D is a planar view of a circuit layout of the LED module according to another embodiment. Referring to FIG. 33D, in this embodiment LEDs 931 are connected in the same way as described in FIG. 33A, and three LED light sources each including 7 LEDs 931 are assumed in LED module 630 and described as follows for illustration. A positive conductive line 934 and a negative conductive line 935 are to receive a driving signal, for supplying power to the LEDs 931. For example, positive conductive line 934 may be coupled to the filtering output terminal 521 of the filtering circuit 520 described above, and negative conductive line 935 coupled to the filtering output terminal 522 of the filtering circuit 520, to receive a filtered signal. For the convenience of illustration, all seven LEDs 931 of each of the three LED light sources are grouped as an LED set 932 in FIG. 33D. For example, there are three LED sets 932 corresponding to the three LED light sources.

Positive conductive line 934 connects to the anode on the left side of the first or leftmost LED 931 of each of the three LED sets 932. Negative conductive line 935 connects to the cathode on the right side of the last or rightmost LED 931 of each of the three LED sets 932. In each LED set 932, of two consecutive LEDs 931 the LED 931 on the left has a cathode connected by a conductive part 939 to an anode of the LED 931 on the right. By such a layout, the LEDs 931 of each LED set 932 are connected in series.

It's also worth noting that a conductive part 939 may be used to connect an anode and a cathode respectively of two consecutive LEDs 931. Negative conductive line 935 connects to the cathode of the last or rightmost LED 931 of each of the three LED sets 932. Positive conductive line 934 connects to the anode of the first or leftmost LED 931 of each of the three LED sets 932. Therefore, as shown in FIG. 33D, the length (and thus area) of the conductive part 939 is larger than that of the portion of negative conductive line 935 immediately connecting to a cathode, which length (and thus area) is then larger than that of the portion of positive conductive line 934 immediately connecting to an anode. For example, the length 938 of the conductive part 939 may be larger than the length 937 of the portion of negative conductive line 935 immediately connecting to a cathode of an LED 931, which length 937 is then larger than the length 936 of the portion of positive conductive line 934 immediately connecting to an anode of an LED 931. Such a layout structure improves heat dissipation of the LEDs 931 in LED module 630.

Positive conductive line 934 may include a lengthwise portion 934a, and negative conductive line 935 may include a lengthwise portion 935a, which are conducive to making the LED module have a positive "+" connective portion and a negative "−" connective portion at each of the two ends of the LED module, as shown in FIG. 33D. Such a layout structure allows for coupling any of other circuits of the power supply module of the LED lamp, including e.g. filtering circuit 520 and rectifying circuits 510 and 540, to the LED module through the positive connective portion 934a and/or the negative connective portion 935a at each or both ends of the LED lamp. In some embodiments, the layout structure increases the flexibility in arranging actual circuits in the LED lamp.

Further, the circuit layouts as shown in FIGS. 33C and 33D may be implemented with a bendable circuit sheet or substrate, which may even be called flexible circuit board depending on its specific definition used. For example, the bendable circuit sheet comprises one conductive layer where positive conductive line 834, positive lengthwise portion 834a, negative conductive line 835, negative lengthwise portion 835a, and conductive parts 839 shown in FIG. 33C, and positive conductive line 934, positive lengthwise portion 934a, negative conductive line 935, negative lengthwise portion 935a, and conductive parts 939 shown in FIG. 33D are formed by the method of etching.

Figure 33E:
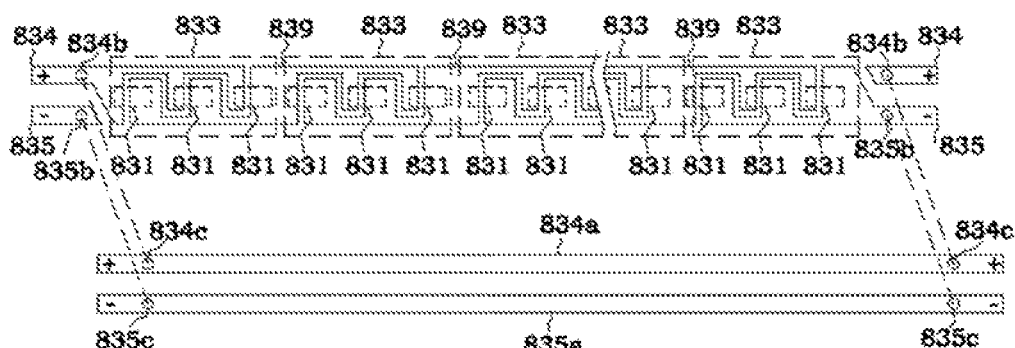
FIG. 33E is a plan view of a circuit layout of the LED module according to some embodiments.

FIG. 33E is a planar view of a circuit layout of the LED module according to another embodiment. The layout structures of the LED module in FIGS. 33E and 33C each correspond to the same way of connecting LEDs 831 as that shown in FIG. 33B, but the layout structure in FIG. 33E comprises two conductive layers, instead of only one conductive layer for forming the circuit layout as shown in FIG. 33C. Referring to FIG. 33E, the main difference from the layout in FIG. 33C is that positive conductive line 834 and negative conductive line 835 have a lengthwise portion 834a and a lengthwise portion 835a, respectively, that are formed in a second conductive layer instead. The difference is elaborated as follows.

Referring to FIG. 33E, the bendable circuit sheet of the LED module comprises a first conductive layer 2a and a second conductive layer 2c electrically insulated from each other by a dielectric layer 2b (not shown). Of the two conductive layers, positive conductive line 834, negative conductive line 835, and conductive parts 839 in FIG. 33E are formed in first conductive layer 2a by the method of etching for electrically connecting the plurality of LED components 831 e.g. in a form of a mesh, whereas positive lengthwise portion 834a and negative lengthwise portion 835a are formed in second conductive layer 2c by etching for electrically connecting to (the filtering output terminal of) the filtering circuit. Further, positive conductive line 834 and negative conductive line 835 in first conductive layer 2a have via points 834b and via points 835b, respectively, for connecting to second conductive layer 2c. Positive lengthwise portion 834a and negative lengthwise portion 835a in second conductive layer 2c have via points 834c and via points 835c, respectively. Via points 834b are positioned corresponding to via points 834c, for connecting positive conductive line 834 and positive lengthwise portion 834a. Via points 835b are positioned corresponding to via points 835c, for connecting negative conductive line 835 and negative lengthwise portion 835a. In some embodiments, the two conductive layers may be connected by forming a hole connecting each via point 834b and a corresponding via point 834c, and to form a hole connecting each via point 835b and a corresponding via point 835c, with the holes extending through the two conductive layers and the dielectric layer in-between. Positive conductive line 834 and positive lengthwise portion 834a can be electrically connected by welding metallic part(s) through the connecting hole(s), and negative conductive line 835 and negative lengthwise portion 835a can be electrically connected by welding metallic part(s) through the connecting hole(s).

Similarly, the layout structure of the LED module in FIG. 33D may alternatively have positive lengthwise portion 934a and negative lengthwise portion 935a disposed in a second conductive layer, to constitute a two-layer layout structure.

It's worth noting that the thickness of the second conductive layer of a two-layer bendable circuit sheet is in some embodiments larger than that of the first conductive layer, in order to reduce the voltage drop or loss along each of the positive lengthwise portion and the negative lengthwise portion disposed in the second conductive layer. Compared to a one-layer bendable circuit sheet, since a positive lengthwise portion and a negative lengthwise portion are disposed in a second conductive layer in a two-layer bendable circuit sheet, the width (between two lengthwise sides) of the two-layer bendable circuit sheet is or can be reduced. On the same fixture or plate in a production process, the number of bendable circuit sheets each with a shorter width that can be laid together at most is larger than the number of bendable circuit sheets each with a longer width that can be laid together at most. In some embodiments, adopting a bendable circuit sheet with a smaller width can increase the efficiency of production of the LED module. And reliability in the production process, such as the accuracy of welding position when welding (materials on) the LED components, can also be improved, because a two-layer bendable circuit sheet can better maintain its shape.

As a variant of the above embodiments, a type of LED tube lamp is provided which has at least some of the electronic components of its power supply module disposed on a light strip of the LED tube lamp. For example, the technique of printed electronic circuit (PEC) can be used to print, insert, or embed at least some of the electronic components onto the light strip.

In one embodiment, all electronic components of the power supply module are disposed on the light strip. The production process may include or proceed with the following steps: preparation of the circuit substrate (e.g. preparation of a flexible printed circuit board); ink jet printing of metallic nano-ink; ink jet printing of active and passive components (as of the power supply module); drying/sintering; ink jet printing of interlayer bumps; spraying of insulating ink; ink jet printing of metallic nano-ink; ink jet printing of active and passive components (to sequentially form the included layers); spraying of surface bond pad(s); and spraying of solder resist against LED components.

In certain embodiments, if all electronic components of the power supply module are disposed on the light strip, electrical connection between terminal pins of the LED tube lamp and the light strip may be achieved by connecting the pins to conductive lines which are welded with ends of the light strip. In this case, another substrate for supporting the power supply module is not required, thereby allowing of an improved design or arrangement in the end cap(s) of the LED tube lamp. In some embodiments, components of the power supply module are disposed toward the ends of the light strip, in order to significantly reduce the impact of heat generated from the power supply module's operations on the LED components. Since no substrate other than the light strip is used to support the power supply module in this case, the total amount of welding or soldering can be significantly reduced, improving the general reliability of the power supply module.

Another case is that some of electronic components of the power supply module, such as some resistors and/or smaller size capacitors, are printed onto the light strip, and some components with bigger size, such as some inductors and/or electrolytic capacitors, are disposed in the end cap. The production process of the light strip in this case may be the same as that described above. And in this case disposing some of all electronic components on the light strip is conducive to achieving a reasonable layout of the power supply module in the LED tube lamp, which may allow of an improved design in the end cap(s).

As a variant embodiment of the above, electronic components of the power supply module are disposed on the light strip by a method of embedding or inserting, e.g. by embedding the components onto a bendable or flexible light strip. In some embodiments, embedding is realized by a method using copper-clad laminates (CCL) for forming a resistor or capacitor; a method using ink related to silkscreen printing; or a method of ink jet printing to embed passive components, wherein an ink jet printer is used to directly print inks to constitute passive components and related functionalities to intended positions on the light strip. Then through treatment by ultraviolet (UV) light or drying/sintering, the light strip is formed where passive components are embedded. The electronic components embedded onto the light strip include for example resistors, capacitors, and inductors. In other embodiments, active components also may be embedded. Through embedding some components onto the light strip, a reasonable layout of the power supply module can be achieved to allow of an improved design in the end cap(s), because the surface area on a printed circuit board used for carrying components of the power supply module is reduced or smaller. Thus, the size, weight, and thickness of the resulting printed circuit board for carrying components of the power supply module is also smaller or reduced. Also in this situation since welding points on the printed circuit board for welding resistors and/or capacitors if they were not to be disposed on the light strip are no longer used, the reliability of the power supply module is improved because these welding points are most liable to (cause or incur) faults, malfunctions, or failures. Further, the length of conductive lines used for connecting components on the printed circuit board is therefore also reduced, which allows of a more compact layout of components on the printed circuit board and thus improving the functionalities of these components.

Next, methods to produce embedded capacitors and resistors are explained as follows.

Usually, methods for manufacturing embedded capacitors employ or involve a concept called distributed or planar capacitance. The manufacturing process may include the following step(s). On a substrate of a copper layer a thin insulation layer is applied or pressed, which is then generally disposed between a pair of layers including a power conductive layer and a ground layer. The thin insulation layer makes the distance between the power conductive layer and the ground layer very short. A capacitance resulting from this structure can also be realized by a conventional technique of a plated-through hole. Basically, this step is used to create this structure comprising a big parallel-plate capacitor on a circuit substrate.

For products of high electrical capacity, certain types of products employ distributed capacitances, and other types of products employ separate embedded capacitances. Through putting or adding a high dielectric-constant material such as barium titanate into the insulation layer, the high electrical capacity is achieved.

A usual method for manufacturing embedded resistors employ conductive or resistive adhesive. This includes, for example, a resin to which conductive carbon or graphite is added, which may be used as an additive or filler. The additive resin is silkscreen printed to an object location, and is then after treatment laminated inside the circuit board. The resulting resistor is connected to other electronic components through plated-through holes or microvias. Another method is called Ohmega-Ply, by which a metallic two-layered structure of a copper layer and a thin nickel alloy layer constitutes a layer resistor relative to a substrate. Then through etching the copper layer and nickel alloy layer, different types of nickel alloy resistors with copper terminals can be formed. These types of resistor are each laminated inside the circuit board.

In an embodiment, conductive wires/lines are directly printed in a linear layout on an inner surface of the LED glass lamp tube, with LED components directly attached on the inner surface and electrically connected by the conductive wires. In some embodiments, the LED components in the form of chips are directly attached over the conductive wires on the inner surface, and connective points are at terminals of the wires for connecting the LED components and the power supply module. After being attached, the LED chips may have fluorescent powder applied or dropped thereon, for producing white light or light of other color by the operating LED tube lamp.

Luminous efficacy of the LED or LED component may be 80 lm/W or above. In some embodiments, luminous efficiency of the LED or LED component may be 120 lm/W or above. Certain optimal embodiments includes a luminous efficacy of the LED or LED component of 160 lm/W or above. White light emitted by an LED component, such as those in the disclosed embodiments, may be produced by mixing fluorescent powder with the monochromatic light emitted by a monochromatic LED chip. The white light in its spectrum has major wavelength ranges of 430-460 nm and 550-560 nm, or major wavelength ranges of 430-460 nm, 540-560 nm, and 620-640 nm.

Figure 34A:
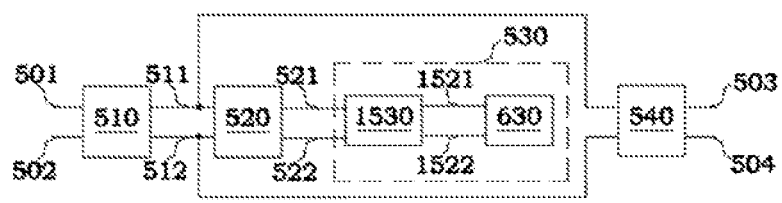
FIG. 34A is a block diagram of an LED lamp according to some embodiments.

FIG. 34A is a block diagram of an LED lamp according to an embodiment. As shown in FIG. 34A, the power supply module of the LED lamp includes rectifying circuits 510 and 540, a filtering circuit 520, and a driving circuit 1530, and an LED lighting module 530 comprises the driving circuit 1530 and an LED module 630. LED lighting module 530 in this embodiment comprises a driving circuit 1530 and an LED module 630. According to the above description in FIG. 29D, driving circuit 1530 in FIG. 34A comprises a DC-to-DC converter circuit, and is coupled to filtering output terminals 521 and 522 to receive a filtered signal and then perform power conversion for converting the filtered signal into a driving signal at driving output terminals 1521 and 1522. The LED module 630 is coupled to driving output terminals 1521 and 1522 to receive the driving signal for emitting light. In some embodiments, the current of LED module 630 is stabilized at an objective current value. Descriptions of this LED module 630 are the same as those provided above with reference to FIGS. 33A-33D.

It's worth noting that rectifying circuit 540 is an optional element and therefore can be omitted, so it is depicted in a dotted line in FIG. 34A. Accordingly, LED lighting module 530 in embodiments of FIGS. 34A, 34C, and 34E may comprise a driving circuit 1530 and an LED module 630. Therefore, the power supply module of the LED lamp in this embodiment can be used with a single-end power supply coupled to one end of the LED lamp, and can be used with a dual-end power supply coupled to two ends of the LED lamp. With a single-end power supply, examples of the LED lamp include an LED light bulb, a personal area light (PAL), etc.

Figure 34B:
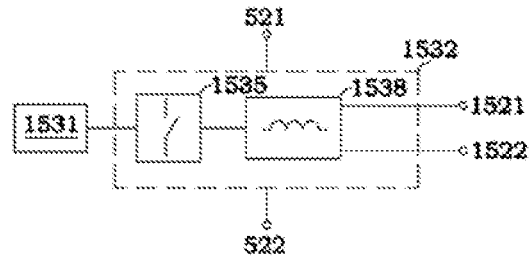
FIG. 34B is a block diagram of a driving circuit according to some embodiments.

FIG. 34B is a block diagram of the driving circuit according to an embodiment. Referring to FIG. 34B, the driving circuit includes a controller 1531, and a conversion circuit 1532 for power conversion based on a current source, for driving the LED module to emit light. Conversion circuit 1532 includes a switching circuit 1535 and an energy storage circuit 1538. And conversion circuit 1532 is coupled to filtering output terminals 521 and 522 to receive and then convert a filtered signal, under the control by controller 1531, into a driving signal at driving output terminals 1521 and 1522 for driving the LED module. Under the control by controller 1531, the driving signal output by conversion circuit 1532 comprises a steady current, making the LED module emitting steady light.

Figure 34C:
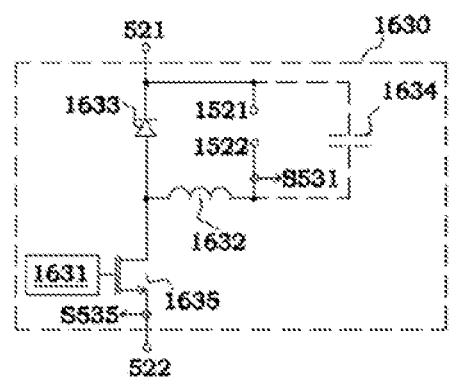
FIG. 34C is a schematic diagram of a driving circuit according to some embodiments.

FIG. 34C is a schematic diagram of the driving circuit according to an embodiment. Referring to FIG. 34C, a driving circuit 1630 in this embodiment comprises a buck DC-to-DC converter circuit having a controller 1631 and a converter circuit. The converter circuit includes an inductor 1632, a diode 1633 for "freewheeling" of current, a capacitor 1634, and a switch 1635. Driving circuit 1630 is coupled to filtering output terminals 521 and 522 to receive and then convert a filtered signal into a driving signal for driving an LED module connected between driving output terminals 1521 and 1522.

In this embodiment, switch 1635 comprises a metal-oxide-semiconductor field-effect transistor (MOSFET) and has a first terminal coupled to the anode of freewheeling diode 1633, a second terminal coupled to filtering output terminal 522, and a control terminal coupled to controller 1631 used for controlling current conduction or cutoff between the first and second terminals of switch 1635. Driving output terminal 1521 is connected to filtering output terminal 521, and driving output terminal 1522 is connected to an end of inductor 1632, which has another end connected to the first terminal of switch 1635. Capacitor 1634 is coupled between driving output terminals 1521 and 1522, to stabilize the voltage between driving output terminals 1521 and 1522. Freewheeling diode 1633 has a cathode connected to driving output terminal 1521.

Next, a description follows as to an exemplary operation of driving circuit 1630.

Controller 1631 is configured for determining when to turn switch 1635 on (in a conducting state) or off (in a cutoff state), according to a current detection signal S535 and/or a current detection signal S531. For example, in some embodiments, controller 1631 is configured to control the duty cycle of switch 1635 being on and switch 1635 being off, in order to adjust the size or magnitude of the driving signal. Current detection signal S535 represents the magnitude of current through switch 1635. Current detection signal S531 represents the magnitude of current through the LED module coupled between driving output terminals 1521 and 1522. According to any of current detection signal S535 and current detection signal S531, controller 1631 can obtain information on the magnitude of power converted by the converter circuit. When switch 1635 is switched on, a current of a filtered signal is input through filtering output terminal 521, and then flows through capacitor 1634, driving output terminal 1521, the LED module, inductor 1632, and switch 1635, and then flows out from filtering output terminal 522. During this flowing of current, capacitor 1634 and inductor 1632 are performing storing of energy. On the other hand, when switch 1635 is switched off, capacitor 1634 and inductor 1632 perform releasing of stored energy by a current flowing from freewheeling capacitor 1633 to driving output terminal 1521 to make the LED module continuing to emit light.

It's worth noting that capacitor 1634 is an optional element, so it can be omitted and is thus depicted in a dotted line in FIG. 34C. In some application environments, the natural characteristic of an inductor to oppose instantaneous change in electric current passing through the inductor may be used to achieve the effect of stabilizing the current through the LED module, thus omitting capacitor 1634.

Figure 34D:
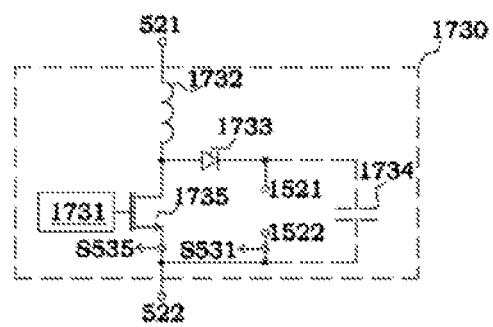
FIG. 34D is a schematic diagram of a driving circuit according to some embodiments.

FIG. 34D is a schematic diagram of the driving circuit according to an embodiment. Referring to FIG. 34D, a driving circuit 1730 in this embodiment comprises a boost DC-to-DC converter circuit having a controller 1731 and a converter circuit. The converter circuit includes an inductor 1732, a diode 1733 for "freewheeling" of current, a capacitor 1734, and a switch 1735. Driving circuit 1730 is configured to receive and then convert a filtered signal from filtering output terminals 521 and 522 into a driving signal for driving an LED module coupled between driving output terminals 1521 and 1522.

Inductor 1732 has an end connected to filtering output terminal 521, and another end connected to the anode of freewheeling diode 1733 and a first terminal of switch 1735, which has a second terminal connected to filtering output terminal 522 and driving output terminal 1522. Freewheeling diode 1733 has a cathode connected to driving output terminal 1521. And capacitor 1734 is coupled between driving output terminals 1521 and 1522.

Controller 1731 is coupled to a control terminal of switch 1735, and is configured for determining when to turn switch 1735 on (in a conducting state) or off (in a cutoff state), according to a current detection signal S535 and/or a current detection signal S531. When switch 1735 is switched on, a current of a filtered signal is input through filtering output terminal 521, and then flows through inductor 1732 and switch 1735, and then flows out from filtering output terminal 522. During this flowing of current, the current through inductor 1732 increases with time, with inductor 1732 being in a state of storing energy, while capacitor 1734 enters a state of releasing energy, making the LED module continuing to emit light. On the other hand, when switch 1735 is switched off, inductor 1732 enters a state of releasing energy as the current through inductor 1732 decreases with time. In this state, the current through inductor 1732 then flows through freewheeling diode 1733, capacitor 1734, and the LED module, while capacitor 1734 enters a state of storing energy.

It's worth noting that capacitor 1734 is an optional element, so it can be omitted, as is depicted by the dotted line in FIG. 34D. When capacitor 1734 is omitted and switch 1735 is switched on, the current of inductor 1732 does not flow through the LED module, making the LED module not emit light; but when switch 1735 is switched off, the current of inductor 1732 flows through freewheeling diode 1733 to reach the LED module, making the LED module emit light. Therefore, by controlling the time that the LED module emits light, and the magnitude of current through the LED module, the average luminance of the LED module can be stabilized to be above a defined value, thus also achieving the effect of emitting a steady light.

Figure 34E:
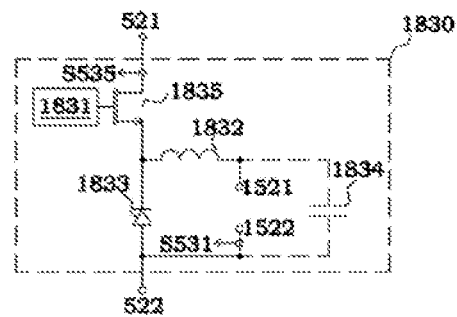
FIG. 34E is a schematic diagram of a driving circuit according to some embodiments.

FIG. 34E is a schematic diagram of the driving circuit according to an embodiment. Referring to FIG. 34E, a driving circuit 1830 in this embodiment comprises a buck DC-to-DC converter circuit having a controller 1831 and a converter circuit. The converter circuit includes an inductor 1832, a diode 1833 for "freewheeling" of current, a capacitor 1834, and a switch 1835. Driving circuit 1830 is coupled to filtering output terminals 521 and 522 to receive and then convert a filtered signal into a driving signal for driving an LED module connected between driving output terminals 1521 and 1522.

Switch 1835 has a first terminal coupled to filtering output terminal 521, a second terminal coupled to the cathode of freewheeling diode 1833, and a control terminal coupled to controller 1831 to receive a control signal from controller 1831 for controlling current conduction or cutoff between the first and second terminals of switch 1835. The anode of freewheeling diode 1833 is connected to filtering output terminal 522 and driving output terminal 1522. Inductor 1832 has an end connected to the second terminal of switch 1835, and another end connected to driving output terminal 1521. Capacitor 1834 is coupled between driving output terminals 1521 and 1522, to stabilize the voltage between driving output terminals 1521 and 1522.

Controller 1831 is configured for controlling when to turn switch 1835 on (in a conducting state) or off (in a cutoff state), according to a current detection signal S535 and/or a current detection signal S531. When switch 1835 is switched on, a current of a filtered signal is input through filtering output terminal 521, and then flows through switch 1835, inductor 1832, and driving output terminals 1521 and 1522, and then flows out from filtering output terminal 522. During this flowing of current, the current through inductor 1832 and the voltage of capacitor 1834 both increase with time, so inductor 1832 and capacitor 1834 are in a state of storing energy. On the other hand, when switch 1835 is switched off, inductor 1832 is in a state of releasing energy and thus the current through it decreases with time. In this case, the current through inductor 1832 circulates through driving output terminals 1521 and 1522, freewheeling diode 1833, and back to inductor 1832.

It's worth noting that capacitor 1834 is an optional element, so it can be omitted and is thus depicted in a dotted line in FIG. 34E. When capacitor 1834 is omitted, no matter whether switch 1835 is turned on or off, the current through inductor 1832 will flow through driving output terminals 1521 and 1522 to drive the LED module to continue emitting light.

Figure 34F:
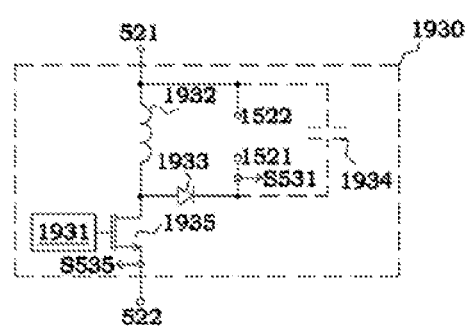
FIG. 34F is a schematic diagram of a driving circuit according to some embodiments.

FIG. 34F is a schematic diagram of the driving circuit according to an embodiment. Referring to FIG. 34F, a driving circuit 1930 in this embodiment comprises a buck DC-to-DC converter circuit having a controller 1931 and a converter circuit. The converter circuit includes an inductor 1932, a diode 1933 for "freewheeling" of current, a capacitor 1934, and a switch 1935. Driving circuit 1930 is coupled to filtering output terminals 521 and 522 to receive and then convert a filtered signal into a driving signal for driving an LED module connected between driving output terminals 1521 and 1522.

Inductor 1932 has an end connected to filtering output terminal 521 and driving output terminal 1522, and another end connected to a first end of switch 1935. Switch 1935 has a second end connected to filtering output terminal 522, and a control terminal connected to controller 1931 to receive a control signal from controller 1931 for controlling current conduction or cutoff of switch 1935. Freewheeling diode 1933 has an anode coupled to a node connecting inductor 1932 and switch 1935, and a cathode coupled to driving output terminal 1521. Capacitor 1934 is coupled to driving output terminals 1521 and 1522, to stabilize the driving of the LED module coupled between driving output terminals 1521 and 1522.

Controller 1931 is configured for controlling when to turn switch 1935 on (in a conducting state) or off (in a cutoff state), according to a current detection signal S531 and/or a current detection signal S535. When switch 1935 is turned on, a current is input through filtering output terminal 521, and then flows through inductor 1932 and switch 1935, and then flows out from filtering output terminal 522. During this flowing of current, the current through inductor 1932 increases with time, so inductor 1932 is in a state of storing energy; but the voltage of capacitor 1934 decreases with time, so capacitor 1934 is in a state of releasing energy to keep the LED module continuing to emit light. On the other hand, when switch 1935 is turned off, inductor 1932 is in a state of releasing energy and its current decreases with time. In this case, the current through inductor 1932 circulates through freewheeling diode 1933, driving output terminals 1521 and 1522, and back to inductor 1932. During this circulation, capacitor 1934 is in a state of storing energy and its voltage increases with time.

It's worth noting that capacitor 1934 is an optional element, so it can be omitted, as is depicted by the dotted line in FIG. 34F. When capacitor 1934 is omitted and switch 1935 is turned on, the current through inductor 1932 doesn't flow through driving output terminals 1521 and 1522, thereby making the LED module not emit light. On the other hand, when switch 1935 is turned off, the current through inductor 1932 flows through freewheeling diode 1933 and then the LED module to make the LED module emit light. Therefore, by controlling the time that the LED module emits light, and the magnitude of current through the LED module, the average luminance of the LED module can be stabilized to be above a defined value, achieving the effect of emitting a steady light.

Figure 34G:
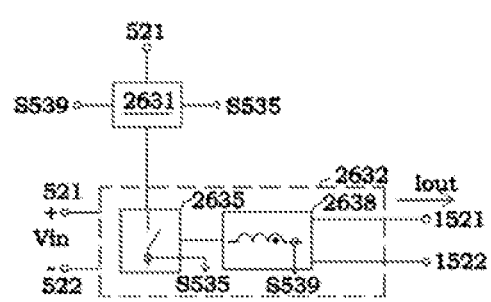
FIG. 34G is a block diagram of a driving circuit according to some embodiments.

FIG. 34G is a block diagram of the driving circuit according to an embodiment. Referring to FIG. 34G, the driving circuit includes a controller 2631, and a conversion circuit 2632 for power conversion based on an adjustable current source, for driving the LED module to emit light. Conversion circuit 2632 includes a switching circuit 2635 and an energy storage circuit 2638. And conversion circuit 2632 is coupled to filtering output terminals 521 and 522 to receive and then convert a filtered signal, under the control by controller 2631, into a driving signal at driving output terminals 1521 and 1522 for driving the LED module. Controller 2631 is configured to receive a current detection signal S535 and/or a current detection signal S539, for controlling or stabilizing the driving signal output by conversion circuit 2632 to be above an objective current value. Current detection signal S535 represents the magnitude of current through switching circuit 2635. Current detection signal S539 represents the magnitude of current through energy storage circuit 2638, which current may be e.g. an inductor current in energy storage circuit 2638 or a current output at driving output terminal 1521. Any of current detection signal S535 and current detection signal S539 can represent the magnitude of current Tout provided by the driving circuit from driving output terminals 1521 and 1522 to the LED module. Controller 2631 is coupled to filtering output terminal 521 for setting the objective current value according to the voltage Vin at filtering output terminal 521. Therefore, the current Tout provided by the driving circuit or the objective current value can be adjusted corresponding to the magnitude of the voltage Vin of a filtered signal output by a filtering circuit.

It's worth noting that current detection signals S535 and S539 can be generated by measuring current through a resistor or induced by an inductor. For example, a current can be measured according to a voltage drop across a resistor in conversion circuit 2632 the current flows through, or which arises from a mutual induction between an inductor in conversion circuit 2632 and another inductor in its energy storage circuit 2638.

The above driving circuit structures are especially suitable for an application environment in which the external driving circuit for the LED tube lamp includes electronic ballast. An electronic ballast is equivalent to a current source whose output power is not constant. In an internal driving circuit as shown in each of FIGS. 34C-34F, power consumed by the internal driving circuit relates to or depends on the number of LEDs in the LED module, and could be regarded as constant. When the output power of the electronic ballast is higher than power consumed by the LED module driven by the driving circuit, the output voltage of the ballast will increase continually, causing the level of an AC driving signal received by the power supply module of the LED lamp to continually increase, potentially damaging the ballast and/or components of the power supply module due to their voltage ratings being exceeded. On the other hand, when the output power of the electronic ballast is lower than power consumed by the LED module driven by the driving circuit, the output voltage of the ballast and the level of the AC driving signal will decrease continually so that the LED tube lamp fail to normally operate.

The power needed for an LED lamp to work is already lower than that needed for a fluorescent lamp to work. If a conventional control mechanism of e.g. using a backlight module to control the LED luminance is used with a conventional driving system of e.g. a ballast, a problem will probably arise of mismatch or incompatibility between the output power of the external driving system and the power needed by the LED lamp. This problem may even cause damaging of the driving system and/or the LED lamp. To prevent this problem, using e.g. the power/current adjustment method described above in FIG. 34G enables the LED (tube) lamp to be better compatible with traditional fluorescent lighting system.

Figure 34H:
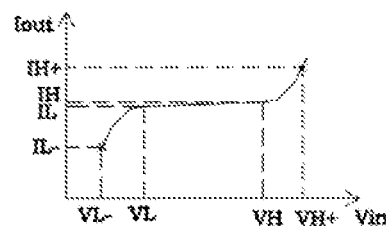
FIG. 34H is a graph illustrating the relationship between the voltage Vin and the objective current Iout according to certain embodiments.

FIG. 34H is a graph illustrating the relationship between the voltage Vin and the objective current value Tout according to an embodiment. In FIG. 34H, the variable Vin is on the horizontal axis, and the variable Tout is on the vertical axis. In some cases, when the level of the voltage Vin of a filtered signal is between the upper voltage limit VH and the lower voltage limit VL, the objective current value Tout will be about an initial objective current value. The upper voltage limit VH is higher than the lower voltage limit VL. When the voltage Vin increases to be higher than the upper voltage limit VH, the objective current value Tout will increase with the increasing of the voltage Vin. During this stage, in certain embodiments, the slope of the relationship curve increases with the increasing of the voltage Vin. When the voltage Vin of a filtered signal decreases to be below the lower voltage limit VL, the objective current value Tout will decrease with the decreasing of the voltage Vin. During this stage, in certain embodiments, the slope of the relationship curve decreases with the decreasing of the voltage Vin. For example, during the stage when the voltage Vin is higher than the upper voltage limit VH or lower than the lower voltage limit VL, the objective current value Tout is in some embodiments a function of the voltage Vin to the power of 2 or above, in order to make the rate of increase/decrease of the consumed power higher than the rate of increase/decrease of the output power of the external driving system. In some embodiments, adjustment of the objective current value Tout is a function of the filtered voltage Vin to the power of 2 or above.

In another case, when the voltage Vin of a filtered signal is between the upper voltage limit VH and the lower voltage limit VL, the objective current value Tout of the LED lamp will vary, increase or decrease, linearly with the voltage Vin. During this stage, when the voltage Vin is at the upper voltage limit VH, the objective current value Tout will be at the upper current limit IH. When the voltage Vin is at the lower voltage limit VL, the objective current value Tout will be at the lower current limit IL. The upper current limit IH is larger than the lower current limit IL. And when the voltage Vin is between the upper voltage limit VH and the lower voltage limit VL, the objective current value Tout will be a function of the voltage Vin to the power of 1.

With the designed relationship in FIG. 34H, when the output power of the ballast is higher than the power consumed by the LED module driven by the driving circuit, the voltage Vin will increase with time to exceed the upper voltage limit VH. When the voltage Vin is higher than the upper voltage limit VH, the rate of increase of the consumed power of the LED module is higher than that of the output power of the electronic ballast, and the output power and the consumed power will be balanced or equal when the voltage Vin is at a high balance voltage value VH+ and the current Tout is at a high balance current value IH+. In this case, the high balance voltage value VH+ is larger than the upper voltage limit VH, and the high balance current value IH+ is larger than the upper current limit IH. On the other hand, when the output power of the ballast is lower than the power consumed by the LED module driven by the driving circuit, the voltage Vin will decrease to be below the lower voltage limit VL. When the voltage Vin is lower than the lower voltage limit VL, the rate of decrease of the consumed power of the LED module is higher than that of the output power of the electronic ballast, and the output power and the consumed power will be balanced or equal when the voltage Vin is at a low balance voltage value VL− and the objective current value Tout is at a low balance current value IL−. In this case, the low balance voltage value VL− is smaller than the lower voltage limit VL, and the low balance current value IL− is smaller than the lower current limit IL.

In some embodiments, the lower voltage limit VL is defined to be around 90% of the lowest output power of the electronic ballast, and the upper voltage limit VH is defined to be around 110% of its highest output power. Taking a common AC powerline with a voltage range of 100-277 volts and a frequency of 60 Hz as an example, the lower voltage limit VL may be set at 90 volts (=100*90%), and the upper voltage limit VH may be set at 305 volts (=277*110%).

As to a short circuit board in at least one of the two end caps, it may include a first short circuit substrate and a second short circuit substrate respectively connected to two terminal portions of a long circuit sheet disposed in the lamp tube, and electronic components of the power supply module may be respectively disposed on the first short circuit substrate and the second short circuit substrate. The first short circuit substrate and the second short circuit substrate may have roughly the same length, or different lengths. Each may also be referred to generally as a circuit board, and each may be a rigid circuit board. In general, a first short circuit substrate has a length that is about 30%-80% of the length of a second short circuit substrate. In some embodiments, the length of the first short circuit substrate is about ⅓ ~⅔ of the length of the second short circuit substrate. For example, in one embodiment, the length of the first short circuit substrate may be about half the length of the second short circuit substrate. The length of the second short circuit substrate may be, for example in the range of about 15 mm to about 65 mm, depending on actual application occasions. In certain embodiments, the first short circuit substrate is disposed in an end cap at an end of the LED tube lamp, and the second short circuit substrate is disposed in another end cap at the opposite end of the LED tube lamp.

The short circuit board may have a length generally of about 15 mm to about 40 mm, while the long circuit sheet may have a length generally of about 800 mm to about 2800 mm. In some embodiments, the short circuit board may have a length of about 19 mm to about 36 mm, and the long circuit sheet may have a length of about 1200 mm to about 2400 mm. In some embodiments, a ratio of the length of the short circuit board to the length of the long circuit sheet ranges from about 1:20 to about 1:200.

For example, capacitors of the driving circuit, such as capacitors 1634, 1734, 1834, and 1934 in FIGS. 34C~34F, in practical use may include two or more capacitors connected in parallel. Some or all capacitors of the driving circuit in the power supply module may be arranged on the first short circuit substrate of short circuit board, while other components such as the rectifying circuit, filtering circuit, inductor(s) of the driving circuit, controller(s), switch(es), diodes, etc. are arranged on the second short circuit substrate of short circuit board. Since inductors, controllers, switches, etc. are electronic components with higher temperature, arranging some or all capacitors on a circuit substrate separate or away from the circuit substrate(s) of high-temperature components helps prevent the working life of capacitors (especially electrolytic capacitors) from being negatively affected by the high-temperature components, thereby improving the reliability of the capacitors. Further, the physical separation between the capacitors and both the rectifying circuit and filtering circuit also contributes to reducing the problem of EMI.

In some embodiments, the driving circuit has power conversion efficiency of 80% or above. In some embodiments, the driving circuit may have a power conversion efficiency of 90% or above (such as, for example, 92% or above). Therefore, without the driving circuit, luminous efficacy of the LED lamp may be 120 lm/W or above. In some embodiments, without the driving circuit, luminous efficacy of the LED lamp may be 160 lm/W or above. On the other hand, with the driving circuit in combination with the LED component(s), luminous efficacy of the LED lamp may be 120 lm/W*90% (i.e., 108 lm/W) or above. In some embodiments, with the driving circuit in combination with the LED component(s), luminous efficacy of the LED lamp may be 160 lm/W*92% (i.e., 147.2 lm/W) or above.

Because the diffusion film or layer in an LED tube lamp has light transmittance of 85% or above, luminous efficacy of the LED tube lamp is in some embodiments 108 lm/W*85%=91.8 lm/W or above, and may be, in some more effective embodiments, 147.2 lm/W*85%=125.12 lm/W.

Figure 35A:
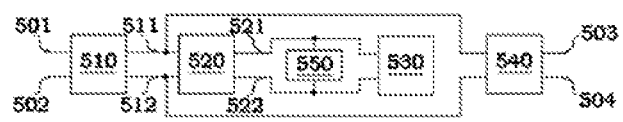
FIG. 35A is a block diagram of an LED lamp according to some embodiments.

FIG. 35A is a block diagram of an LED lamp according to an embodiment. Compared to FIG. 34A, the embodiment of FIG. 35A includes rectifying circuits 510 and 540, and a filtering circuit 520, and further includes an anti-flickering circuit 550; wherein the power supply module further includes some components of an LED lighting module 530. The anti-flickering circuit 550 is coupled between filtering circuit 520 and LED lighting module 530. It's noted that rectifying circuit 540 may be omitted, as is depicted by the dotted line in FIG. 35A.

Anti-flickering circuit 550 is coupled to filtering output terminals 521 and 522, to receive a filtered signal, and under specific circumstances to consume partial energy of the filtered signal for reducing (the incidence of) ripples of the filtered signal disrupting or interrupting the light emission of the LED lighting module 530. In general, filtering circuit 520 has such filtering components as resistor(s) and/or inductor(s), and/or parasitic capacitors and inductors, which may form resonant circuits. Upon breakoff or stop of an AC power signal, as when the power supply of the LED lamp is turned off by a user, the amplitude(s) of resonant signals in the resonant circuits will decrease with time. But LEDs in the LED module of the LED lamp are unidirectional conduction devices and require a minimum conduction voltage for the LED module. When a resonant signal's trough value is lower than the minimum conduction voltage of the LED module, but its peak value is still higher than the minimum conduction voltage, the flickering phenomenon will occur in light emission of the LED module. In this case, anti-flickering circuit 550 works by allowing a current matching a defined flickering current value of the LED component to flow through, consuming partial energy of the filtered signal higher than the energy difference of the resonant signal between its peak and trough values for reducing the flickering phenomenon. In certain embodiments, the anti-flickering circuit 550 is operable when the filtered signal's voltage approaches (and is still higher than) the minimum conduction voltage.

It's worth noting that anti-flickering circuit 550 may be more suitable for the situation in which LED lighting module 530 doesn't include driving circuit 1530, for example, when LED module 630 of LED lighting module 530 is (directly) driven to emit light by a filtered signal from a filtering circuit. In this case, the light emission of LED module 630 will directly reflect variation in the filtered signal due to its ripples. In this situation, the introduction of anti-flickering circuit 550 will prevent the flickering phenomenon from occurring in the LED lamp upon the breakoff of power supply to the LED lamp.

Figure 35B:
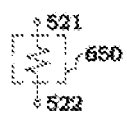
FIG. 35B is a schematic diagram of an anti-flickering circuit according to some embodiments.

FIG. 35B is a schematic diagram of the anti-flickering circuit according to an embodiment. Referring to FIG. 35B, anti-flickering circuit 650 includes at least a resistor, such as two resistors connected in series between filtering output terminals 521 and 522. In this embodiment, anti-flickering circuit 650 is used for consuming partial energy of a filtered signal continually. When in normal operation of the LED lamp, this partial energy is far lower than the energy consumed by LED lighting module 530. But upon an outage of the power supply, when the voltage level of the filtered signal decreases to approach the minimum conduction voltage of LED module 630, this partial energy is still consumed by anti-flickering circuit 650 to offset the impact of the resonant signals which may cause the flickering of light emission of LED module 630. In some embodiments, a current equal to or larger than an anti-flickering current level may be set to flow through anti-flickering circuit 650 when LED module 630 is supplied by the minimum conduction voltage, and then an equivalent anti-flickering resistance of anti-flickering circuit 650 can be determined based on the set current.

Figure 36A:
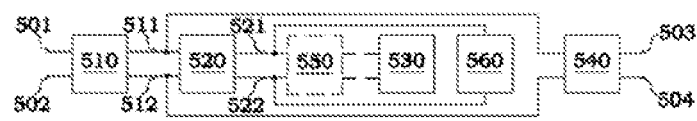
FIG. 36A is a block diagram of an LED lamp according to some embodiments.

FIG. 36A is a block diagram of an LED lamp according to an embodiment. Compared to FIG. 35A, the embodiment of FIG. 36A includes rectifying circuits 510 and 540, a filtering circuit 520, an LED lighting module 530, and an anti-flickering circuit 550, and further includes a protection circuit 560; wherein the power supply module may also include some components of an LED lighting module 530. Protection circuit 560 is coupled to filtering output terminals 521 and 522, to detect the filtered signal from filtering circuit 520 for determining whether to enter a protection state. Upon entering a protection state, protection circuit 560 works to limit, restrain, or clamp down on the level of the filtered signal, preventing damaging of components in LED lighting module 530. And rectifying circuit 540 and anti-flickering circuit 550 may be omitted, as depicted by the dotted line in FIG. 36A.

Figure 36B:
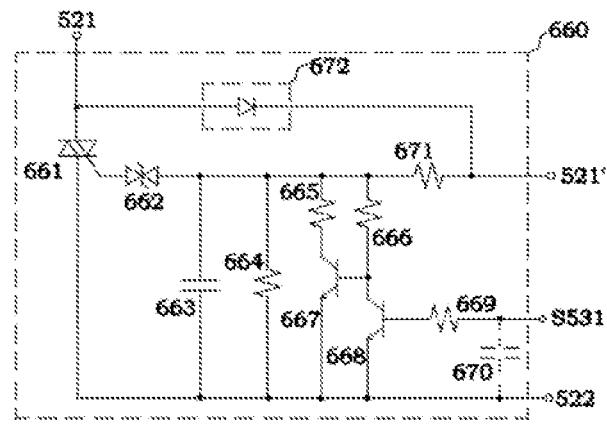
FIG. 36B is a schematic diagram of a protection circuit according to some embodiments.

FIG. 36B is a schematic diagram of the protection circuit according to an embodiment. Referring to FIG. 36B, a protection circuit 660 includes a voltage clamping circuit, a voltage division circuit, capacitors 663 and 670, resistor 669, and a diode 672, for entering a protection state when a current and/or voltage of the LED module is/are or might be excessively high, thereby preventing damaging of the LED module. The voltage clamping circuit includes a bidirectional triode thyristor (TRIAC) 661 and a DIAC or symmetrical trigger diode 662. The voltage division circuit includes bipolar junction transistors (BJT) 667 and 668 and resistors 664, 665, 666, and 671.

Bidirectional triode thyristor 661 has a first terminal connected to filtering output terminal 521, a second terminal connected to filtering output terminal 522, and a control terminal connected to a first terminal of symmetrical trigger diode 662, which has a second terminal connected to an end of capacitor 663, which has another end connected to filtering output terminal 522. Resistor 664 is in parallel to capacitor 663, and has an end connected to the second terminal of symmetrical trigger diode 662 and another end connected to filtering output terminal 522. Resistor 665 has an end connected to the second terminal of symmetrical trigger diode 662 and another end connected to the collector terminal of BJT 667, whose emitter terminal is connected to filtering output terminal 522. Resistor 666 has an end connected to the second terminal of symmetrical trigger diode 662 and another end connected to the collector terminal of BJT 668 and the base terminal of BJT 667. The emitter terminal of BJT 668 is connected to filtering output terminal 522. Resistor 669 has an end connected to the base terminal of BJT 668 and another end connected to an end of capacitor 670, which has another end connected to filtering output terminal 522. Resistor 671 has an end connected to the second terminal of symmetrical trigger diode 662 and another end connected to the cathode of diode 672, whose anode is connected to filtering output terminal 521.

It's worth noting that according to some embodiments, the resistance of resistor 665 should be smaller than that of resistor 666.

Next, an exemplary operation of protection circuit 660 in overcurrent protection is described as follows.

The node connecting resistor 669 and capacitor 670 is to receive a current detection signal S531, which represents the magnitude of current through the LED module. The other end of resistor 671 is a voltage terminal 521'. In this embodiment concerning overcurrent protection, voltage terminal 521' may be coupled to a biasing voltage source, or be connected through diode 672 to filtering output terminal 521, as shown in FIG. 36B, to take a filtered signal as a biasing voltage source. If voltage terminal 521' is coupled to an external biasing voltage source, diode 672 may be omitted, so it is depicted in a dotted line in FIG. 36B. The combination of resistor 669 and capacitor 670 can work to filter out high frequency components of the current detection signal S531, and then input the filtered current detection signal S531 to the base terminal of BJT 668 for controlling current conduction and cutoff of BJT 668. The filtering function of resistor 669 and capacitor 670 can prevent malfunction of BJT 668 due to noises. In practical use, resistor 669 and capacitor 670 may be omitted, so they are each depicted in a dotted line in FIG. 36B. When they are omitted, current detection signal S531 is input directly to the base terminal of BJT 668.

When the LED lamp is operating normally and the current of the LED module is within a normal range, BJT 668 is in a cutoff state, and resistor 66 works to pull up the base voltage of BJT 667, which therefore enters a conducting state. In this state, the electric potential at the second terminal of symmetrical trigger diode 662 is determined based on the voltage at voltage terminal 521' of the biasing voltage source and voltage division ratios between resistor 671 and parallel-connected resistors 664 and 665. Since the resistance of resistor 665 is relatively small, voltage share for resistor 665 is smaller and the electric potential at the second terminal of symmetrical trigger diode 662 is therefore pulled down. Then, the electric potential at the control terminal of bidirectional triode thyristor 661 is in turn pulled down by symmetrical trigger diode 662, causing bidirectional triode thyristor 661 to enter a cutoff state, which cutoff state makes protection circuit 660 not being in a protection state.

When the current of the LED module exceeds an overcurrent value, the level of current detection signal S531 will increase significantly to cause BJT 668 to enter a conducting state and then pull down the base voltage of BJT 667, which thereby enters a cutoff state. In this case, the electric potential at the second terminal of symmetrical trigger diode 662 is determined based on the voltage at voltage terminal 521' of the biasing voltage source and voltage division ratios between resistor 671 and parallel-connected resistors 664 and 666. Since the resistance of resistor 666 is relatively high, voltage share for resistor 666 is larger and the electric potential at the second terminal of symmetrical trigger diode 662 is therefore higher. Then the electric potential at the control terminal of bidirectional triode thyristor 661 is in turn pulled up by symmetrical trigger diode 662, causing bidirectional triode thyristor 661 to enter a conducting state, which conducting state works to restrain or clamp down on the voltage between filtering output terminals 521 and 522 and thus makes protection circuit 660 being in a protection state.

In this embodiment, the voltage at voltage terminal 521' of the biasing voltage source is determined based on the trigger voltage of bidirectional triode thyristor 661, and voltage division ratio between resistor 671 and parallel-connected resistors 664 and 665, or voltage division ratio between resistor 671 and parallel-connected resistors 664 and 666. Through voltage division between resistor 671 and parallel-connected resistors 664 and 665, the voltage from voltage terminal 521' at symmetrical trigger diode 662 will be lower than the trigger voltage of bidirectional triode thyristor 661. Otherwise, through voltage division between resistor 671 and parallel-connected resistors 664 and 666, the voltage from voltage terminal 521' at symmetrical trigger diode 662 will be higher than the trigger voltage of bidirectional triode thyristor 661. For example, in some embodiments, when the current of the LED module exceeds an overcurrent value, the voltage division circuit is adjusted to the voltage division ratio between resistor 671 and parallel-connected resistors 664 and 666, causing a higher portion of the voltage at voltage terminal 521' to result at symmetrical trigger diode 662, achieving a hysteresis function. Specifically, BJTs 667 and 668 as switches are respectively connected in series to resistors 665 and 666 which determine the voltage division ratios. The voltage division circuit is configured to control turning on which one of BJTs 667 and 668 and leaving the other off for determining the relevant voltage division ratio, according to whether the current of the LED module exceeds an overcurrent value. And the clamping circuit determines whether to restrain or clamp down on the voltage of the LED module according to the applying voltage division ratio.

Next, an exemplary operation of protection circuit 660 in overvoltage protection is described as follows.

The node connecting resistor 669 and capacitor 670 is to receive a current detection signal S531, which represents the magnitude of current through the LED module. As described above, protection circuit 660 still works to provide overcurrent protection. The other end of resistor 671 is a voltage terminal 521'. In this embodiment concerning overvoltage protection, voltage terminal 521' is coupled to the positive terminal of the LED module to detect the voltage of the LED module. Taking previously described embodiments for example, in embodiments of FIGS. 33A and 33B, LED lighting module 530 doesn't include driving circuit 1530, and the voltage terminal 521' would be coupled to filtering output terminal 521. Whereas in embodiments of FIGS. 34A-34G, LED lighting module 530 includes driving circuit 1530, and the voltage terminal 521' would be coupled to driving output terminal 1521. In this embodiment, voltage division ratios between resistor 671 and parallel-connected resistors 664 and 665, and voltage division ratios between resistor 671 and parallel-connected resistors 664 and 666 will be adjusted according to the voltage at voltage terminal 521', for example, the voltage at driving output terminal 1521 or filtering output terminal 521. Therefore, normal overcurrent protection can still be provided by protection circuit 660.

In some embodiments, when the LED lamp is operating normally, assuming overcurrent condition doesn't occur, the electric potential at the second terminal of symmetrical trigger diode 662 is determined based on the voltage at voltage terminal 521' and voltage division ratios between resistor 671 and parallel-connected resistors 664 and 665, and is insufficient to trigger bidirectional triode thyristor

661. Then bidirectional triode thyristor 661 is in a cutoff state, making protection circuit 660 not being in a protection state. On the other hand, when the LED module is operating abnormally with the voltage at the positive terminal of the LED module exceeding an overvoltage value, the electric potential at the second terminal of symmetrical trigger diode 662 is sufficiently high to trigger bidirectional triode thyristor 661 when the voltage at the first terminal of symmetrical trigger diode 662 is larger than the trigger voltage of bidirectional triode thyristor 661. Then bidirectional triode thyristor 661 enters a conducting state, making protection circuit 660 being in a protection state to restrain or clamp down on the level of the filtered signal.

As described above, protection circuit 660 provides one or two of the functions of overcurrent protection and overvoltage protection.

In some embodiments, protection circuit 660 may further include a Zener diode connected to resistor 664 in parallel, which Zener diode is used to limit or restrain the voltage across resistor 664. The breakdown voltage of the Zener diode may be in the range of about 25-50 volts. In some embodiments, the breakdown voltage of the Zener diode may be about 36 volts.

Further, a silicon controlled rectifier may be substituted for bidirectional triode thyristor 661, without negatively affecting the protection functions. Using a silicon controlled rectifier instead of a bidirectional triode thyristor 661 has a lower voltage drop across itself in conduction than that across bidirectional triode thyristor 661 in conduction.

In one embodiment, values of the parameters of protection circuit 660 may be set as follows. Resistance of resistor 669 may be about 10 ohms. Capacitance of capacitor 670 may be about 1 nF. Capacitance of capacitor 633 may be about 10 nF. The (breakover) voltage of symmetrical trigger diode 662 may be in the range of about 26~36 volts. Resistance of resistor 671 may be in the range of about 300 k~600 k ohms. In some embodiments, resistance of resistor 671 may be about 540 k ohms. Resistance of resistor 666 may be in the range of about 100 k~300 k ohms. In some embodiments, resistance of resistor 666 may be about 220 k ohms. Resistance of resistor 665 may be in the range of about 30 k~100 k ohms. In some embodiments, resistance of resistor 665 may be about 40 k ohms. Resistance of resistor 664 is in some embodiments in the range of about 100 k~300 k ohms, and may preferably be, in some embodiments about 220 k ohms.

Figure 37A:
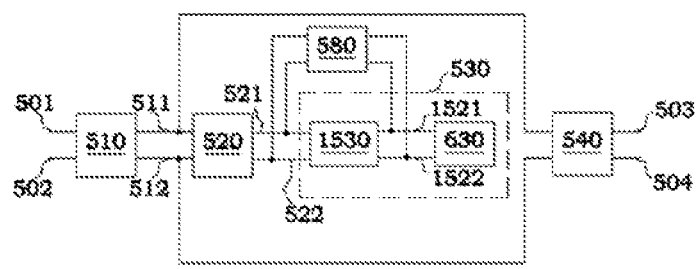
FIG. 37A is a block diagram of an LED lamp according to some embodiments.

FIG. 37A is a block diagram of an LED lamp according to an embodiment. Compared to FIG. 34A, the embodiment of FIG. 37A includes rectifying circuits 510 and 540, a filtering circuit 520, and a driving circuit 1530, and further includes a mode switching circuit 580; wherein an LED lighting module 530 is composed of driving circuit 1530 and an LED module 630. Mode switching circuit 580 is coupled to at least one of filtering output terminals 521 and 522 and at least one of driving output terminals 1521 and 1522, for determining whether to perform a first driving mode or a second driving mode, as according to a frequency of the external driving signal. In the first driving mode, a filtered signal from filtering circuit 520 is input into driving circuit 1530, while in the second driving mode the filtered signal bypasses at least a component of driving circuit 1530, making driving circuit 1530 stop working in conducting the filtered signal, allowing the filtered signal to (directly) reach and drive LED module 630. The bypassed component(s) of driving circuit 1530 may include an inductor or a switch, which when bypassed makes driving circuit 1530 unable to transfer and/or convert power, and then stop working in conducting the filtered signal. If driving circuit 1530 includes a capacitor, the capacitor can still be used to filter out ripples of the filtered signal in order to stabilize the voltage across the LED module. When mode switching circuit 580 determines to perform the first driving mode, allowing the filtered signal to be input to driving circuit 1530, driving circuit 1530 then transforms the filtered signal into a driving signal for driving LED module 630 to emit light. On the other hand, when mode switching circuit 580 determines to perform the second driving mode, allowing the filtered signal to bypass driving circuit 1530 to reach LED module 630, filtering circuit 520 then becomes in effect a driving circuit for LED module 630. Then filtering circuit 520 provides the filtered signal as a driving signal for the LED module for driving the LED module to emit light.

It's worth noting that mode switching circuit 580 can determine whether to perform the first driving mode or the second driving mode based on a user's instruction or a detected signal received by the LED lamp through pins 501, 502, 503, and 504. With the mode switching circuit, the power supply module of the LED lamp can adapt to or perform one of appropriate driving modes corresponding to different application environments or driving systems, thus improving the compatibility of the LED lamp. In some embodiments, rectifying circuit 540 may be omitted, as is depicted by the dotted line in FIG. 37A.

Figure 37B:
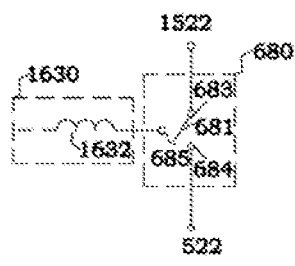
FIG. 37B is a schematic diagram of a mode switching circuit in an LED lamp according to some embodiments.

FIG. 37B is a schematic diagram of the mode switching circuit in an LED lamp according to an embodiment. Referring to FIG. 37B, a mode switching circuit 680 includes a mode switch 681 suitable for use with the driving circuit 1630 in FIG. 34C. Referring to FIGS. 37B and 34C, mode switch 681 has three terminals 683, 684, and 685, wherein terminal 683 is coupled to driving output terminal 1522, terminal 684 is coupled to filtering output terminal 522, and terminal 685 is coupled to the inductor 1632 in driving circuit 1630.

When mode switching circuit 680 determines to perform a first driving mode, mode switch 681 conducts current in a first conductive path through terminals 683 and 685 and a second conductive path through terminals 683 and 684 is in a cutoff state. In this case, driving output terminal 1522 is coupled to inductor 1632, and therefore driving circuit 1630 is working normally, which working includes receiving a filtered signal from filtering output terminals 521 and 522 and then transforming the filtered signal into a driving signal, output at driving output terminals 1521 and 1522 for driving the LED module.

When mode switching circuit 680 determines to perform a second driving mode, mode switch 681 conducts current in the second conductive path through terminals 683 and 684 and the first conductive path through terminals 683 and 685 is in a cutoff state. In this case, driving output terminal 1522 is coupled to filtering output terminal 522, and therefore driving circuit 1630 stops working, and a filtered signal is input through filtering output terminals 521 and 522 to driving output terminals 1521 and 1522 for driving the LED module, while bypassing inductor 1632 and switch 1635 in driving circuit 1630.

Figure 37C:
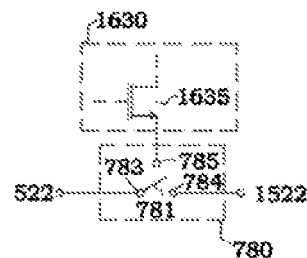
FIG. 37C is a schematic diagram of a mode switching circuit in an LED lamp according to some embodiments.

FIG. 37C is a schematic diagram of the mode switching circuit in an LED lamp according to an embodiment. Referring to FIG. 37C, a mode switching circuit 780 includes a mode switch 781 suitable for use with the driving circuit 1630 in FIG. 34C. Referring to FIGS. 37C and 34C, mode switch 781 has three terminals 783, 784, and 785, wherein terminal 783 is coupled to filtering output terminal 522, terminal 784 is coupled to driving output terminal 1522, and terminal 785 is coupled to switch 1635 in driving circuit 1630.

When mode switching circuit 780 determines to perform a first driving mode, mode switch 781 conducts current in a first conductive path through terminals 783 and 785 and a second conductive path through terminals 783 and 784 is in a cutoff state. In this case, filtering output terminal 522 is coupled to switch 1635, and therefore driving circuit 1630 is working normally, which working includes receiving a filtered signal from filtering output terminals 521 and 522 and then transforming the filtered signal into a driving signal, output at driving output terminals 1521 and 1522 for driving the LED module.

When mode switching circuit 780 determines to perform a second driving mode, mode switch 781 conducts current in the second conductive path through terminals 783 and 784 and the first conductive path through terminals 783 and 785 is in a cutoff state. In this case, driving output terminal 1522 is coupled to filtering output terminal 522, and therefore driving circuit 1630 stops working, and a filtered signal is input through filtering output terminals 521 and 522 to driving output terminals 1521 and 1522 for driving the LED module, while bypassing inductor 1632 and switch 1635 in driving circuit 1630.

Figure 37D:
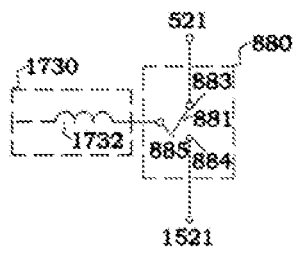
FIG. 37D is a schematic diagram of a mode switching circuit in an LED lamp according to some embodiments.

FIG. 37D is a schematic diagram of the mode switching circuit in an LED lamp according to an embodiment. Referring to FIG. 37D, a mode switching circuit 880 includes a mode switch 881 suitable for use with the driving circuit 1730 in FIG. 34D. Referring to FIGS. 37D and 34D, mode switch 881 has three terminals 883, 884, and 885, wherein terminal 883 is coupled to filtering output terminal 521, terminal 884 is coupled to driving output terminal 1521, and terminal 885 is coupled to inductor 1732 in driving circuit 1730.

When mode switching circuit 880 determines to perform a first driving mode, mode switch 881 conducts current in a first conductive path through terminals 883 and 885 and a second conductive path through terminals 883 and 884 is in a cutoff state. In this case, filtering output terminal 521 is coupled to inductor 1732, and therefore driving circuit 1730 is working normally, which working includes receiving a filtered signal from filtering output terminals 521 and 522 and then transforming the filtered signal into a driving signal, output at driving output terminals 1521 and 1522 for driving the LED module.

When mode switching circuit 880 determines to perform a second driving mode, mode switch 881 conducts current in the second conductive path through terminals 883 and 884 and the first conductive path through terminals 883 and 885 is in a cutoff state. In this case, driving output terminal 1521 is coupled to filtering output terminal 521, and therefore driving circuit 1730 stops working, and a filtered signal is input through filtering output terminals 521 and 522 to driving output terminals 1521 and 1522 for driving the LED module, while bypassing inductor 1732 and freewheeling diode 1733 in driving circuit 1730.

Figure 37E:
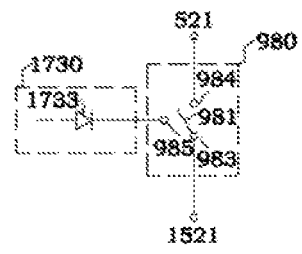
FIG. 37E is a schematic diagram of a mode switching circuit in an LED lamp according to some embodiments.

FIG. 37E is a schematic diagram of the mode switching circuit in an LED lamp according to an embodiment. Referring to FIG. 37E, a mode switching circuit 980 includes a mode switch 981 suitable for use with the driving circuit 1730 in FIG. 34D. Referring to FIGS. 37E and 34D, mode switch 981 has three terminals 983, 984, and 985, wherein terminal 983 is coupled to driving output terminal 1521, terminal 984 is coupled to filtering output terminal 521, and terminal 985 is coupled to the cathode of diode 1733 in driving circuit 1730.

When mode switching circuit 980 determines to perform a first driving mode, mode switch 981 conducts current in a first conductive path through terminals 983 and 985 and a second conductive path through terminals 983 and 984 is in a cutoff state. In this case, filtering output terminal 521 is coupled to the cathode of diode 1733, and therefore driving circuit 1730 is working normally, which working includes receiving a filtered signal from filtering output terminals 521 and 522 and then transforming the filtered signal into a driving signal, output at driving output terminals 1521 and 1522 for driving the LED module.

When mode switching circuit 980 determines to perform a second driving mode, mode switch 981 conducts current in the second conductive path through terminals 983 and 984 and the first conductive path through terminals 983 and 985 is in a cutoff state. In this case, driving output terminal 1521 is coupled to filtering output terminal 521, and therefore driving circuit 1730 stops working, and a filtered signal is input through filtering output terminals 521 and 522 to driving output terminals 1521 and 1522 for driving the LED module, while bypassing inductor 1732 and freewheeling diode 1733 in driving circuit 1730.

Figure 37F:
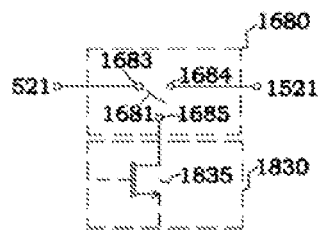
FIG. 37F is a schematic diagram of a mode switching circuit in an LED lamp according to some embodiments.

FIG. 37F is a schematic diagram of the mode switching circuit in an LED lamp according to an embodiment. Referring to FIG. 37F, a mode switching circuit 1680 includes a mode switch 1681 suitable for use with the driving circuit 1830 in FIG. 34E. Referring to FIGS. 37F and 34E, mode switch 1681 has three terminals 1683, 1684, and 1685, wherein terminal 1683 is coupled to filtering output terminal 521, terminal 1684 is coupled to driving output terminal 1521, and terminal 1685 is coupled to switch 1835 in driving circuit 1830.

When mode switching circuit 1680 determines to perform a first driving mode, mode switch 1681 conducts current in a first conductive path through terminals 1683 and 1685 and a second conductive path through terminals 1683 and 1684 is in a cutoff state. In this case, filtering output terminal 521 is coupled to switch 1835, and therefore driving circuit 1830 is working normally, which working includes receiving a filtered signal from filtering output terminals 521 and 522 and then transforming the filtered signal into a driving signal, output at driving output terminals 1521 and 1522 for driving the LED module.

When mode switching circuit 1680 determines to perform a second driving mode, mode switch 1681 conducts current in the second conductive path through terminals 1683 and 1684 and the first conductive path through terminals 1683 and 1685 is in a cutoff state. In this case, driving output terminal 1521 is coupled to filtering output terminal 521, and therefore driving circuit 1830 stops working, and a filtered signal is input through filtering output terminals 521 and 522 to driving output terminals 1521 and 1522 for driving the LED module, while bypassing inductor 1832 and switch 1835 in driving circuit 1830.

Figure 37G:
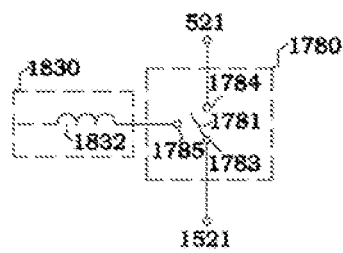
FIG. 37G is a schematic diagram of a mode switching circuit in an LED lamp according to some embodiments.

FIG. 37G is a schematic diagram of the mode switching circuit in an LED lamp according to an embodiment. Referring to FIG. 37G, a mode switching circuit 1780 includes a mode switch 1781 suitable for use with the driving circuit 1830 in FIG. 34E. Referring to FIGS. 37G and 34E, mode switch 1781 has three terminals 1783, 1784, and 1785, wherein terminal 1783 is coupled to filtering output terminal 521, terminal 1784 is coupled to driving output terminal 1521, and terminal 1785 is coupled to inductor 1832 in driving circuit 1830.

When mode switching circuit 1780 determines to perform a first driving mode, mode switch 1781 conducts current in a first conductive path through terminals 1783 and 1785 and a second conductive path through terminals 1783 and 1784 is in a cutoff state. In this case, filtering output terminal 521 is coupled to inductor 1832, and therefore driving circuit 1830 is working normally, which working includes receiving a filtered signal from filtering output terminals 521 and 522 and then transforming the filtered signal into a driving signal, output at driving output terminals 1521 and 1522 for driving the LED module.

When mode switching circuit 1780 determines to perform a second driving mode, mode switch 1781 conducts current in the second conductive path through terminals 1783 and 1784 and the first conductive path through terminals 1783 and 1785 is in a cutoff state. In this case, driving output terminal 1521 is coupled to filtering output terminal 521, and therefore driving circuit 1830 stops working, and a filtered signal is input through filtering output terminals 521 and 522 to driving output terminals 1521 and 1522 for driving the LED module, while bypassing inductor 1832 and switch 1835 in driving circuit 1830.

Figure 37H:
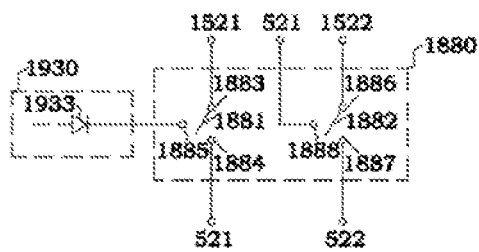
FIG. 37H is a schematic diagram of a mode switching circuit in an LED lamp according to some embodiments.

FIG. 37H is a schematic diagram of the mode switching circuit in an LED lamp according to an embodiment. Referring to FIG. 37H, a mode switching circuit 1880 includes mode switches 1881 and 1882 suitable for use with the driving circuit 1930 in FIG. 34F. Referring to FIGS. 37H and 34F, mode switch 1881 has three terminals 1883, 1884, and 1885, wherein terminal 1883 is coupled to driving output terminal 1521, terminal 1884 is coupled to filtering output terminal 521, and terminal 1885 is coupled to freewheeling diode 1933 in driving circuit 1930. And mode switch 1882 has three terminals 1886, 1887, and 1888, wherein terminal 1886 is coupled to driving output terminal 1522, terminal 1887 is coupled to filtering output terminal 522, and terminal 1888 is coupled to filtering output terminal 521.

When mode switching circuit 1880 determines to perform a first driving mode, mode switch 1881 conducts current in a first conductive path through terminals 1883 and 1885 and a second conductive path through terminals 1883 and 1884 is in a cutoff state, and mode switch 1882 conducts current in a third conductive path through terminals 1886 and 1888 and a fourth conductive path through terminals 1886 and 1887 is in a cutoff state. In this case, driving output terminal 1521 is coupled to freewheeling diode 1933, and filtering output terminal 521 is coupled to driving output terminal 1522. Therefore, driving circuit 1930 is working normally, which working includes receiving a filtered signal from filtering output terminals 521 and 522 and then transforming the filtered signal into a driving signal, output at driving output terminals 1521 and 1522 for driving the LED module.

When mode switching circuit 1880 determines to perform a second driving mode, mode switch 1881 conducts current in the second conductive path through terminals 1883 and 1884 and the first conductive path through terminals 1883 and 1885 is in a cutoff state, and mode switch 1882 conducts current in the fourth conductive path through terminals 1886 and 1887 and the third conductive path through terminals 1886 and 1888 is in a cutoff state. In this case, driving output terminal 1521 is coupled to filtering output terminal 521, and filtering output terminal 522 is coupled to driving output terminal 1522. Therefore, driving circuit 1930 stops working, and a filtered signal is input through filtering output terminals 521 and 522 to driving output terminals 1521 and 1522 for driving the LED module, while bypassing freewheeling diode 1933 and switch 1935 in driving circuit 1930.

Figure 37I:
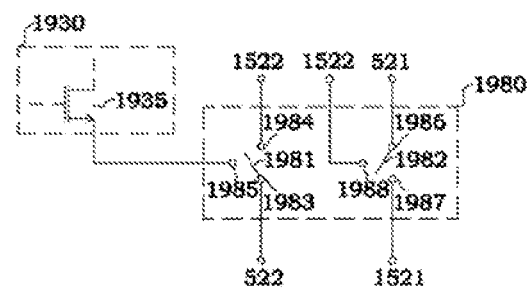
FIG. 37I is a schematic diagram of a mode switching circuit in an LED lamp according to some embodiment.

FIG. 37I is a schematic diagram of the mode switching circuit in an LED lamp according to an embodiment. Referring to FIG. 37I, a mode switching circuit 1980 includes mode switches 1981 and 1982 suitable for use with the driving circuit 1930 in FIG. 34F. Referring to FIGS. 37I and 34F, mode switch 1981 has three terminals 1983, 1984, and 1985, wherein terminal 1983 is coupled to filtering output terminal 522, terminal 1984 is coupled to driving output terminal 1522, and terminal 1985 is coupled to switch 1935 in driving circuit 1930. And mode switch 1982 has three terminals 1986, 1987, and 1988, wherein terminal 1986 is coupled to filtering output terminal 521, terminal 1987 is coupled to driving output terminal 1521, and terminal 1988 is coupled to driving output terminal 1522.

When mode switching circuit 1980 determines to perform a first driving mode, mode switch 1981 conducts current in a first conductive path through terminals 1983 and 1985 and a second conductive path through terminals 1983 and 1984 is in a cutoff state, and mode switch 1982 conducts current in a third conductive path through terminals 1986 and 1988 and a fourth conductive path through terminals 1986 and 1987 is in a cutoff state. In this case, driving output terminal 1522 is coupled to filtering output terminal 521, and filtering output terminal 522 is coupled to switch 1935. Therefore, driving circuit 1930 is working normally, which working includes receiving a filtered signal from filtering output terminals 521 and 522 and then transforming the filtered signal into a driving signal, output at driving output terminals 1521 and 1522 for driving the LED module.

When mode switching circuit 1980 determines to perform a second driving mode, mode switch 1981 conducts current in the second conductive path through terminals 1983 and 1984 and the first conductive path through terminals 1983 and 1985 is in a cutoff state, and mode switch 1982 conducts current in the fourth conductive path through terminals 1986 and 1987 and the third conductive path through terminals 1986 and 1988 is in a cutoff state. In this case, driving output terminal 1521 is coupled to filtering output terminal 521, and filtering output terminal 522 is coupled to driving output terminal 1522. Therefore, driving circuit 1930 stops working, and a filtered signal is input through filtering output terminals 521 and 522 to driving output terminals 1521 and 1522 for driving the LED module, while bypassing freewheeling diode 1933 and switch 1935 in driving circuit 1930.

In an embodiment, each of the mode switches comprises, for example, a single-pole double-throw switch, or comprises two semiconductor switches (such as metal oxide semiconductor transistors), for switching a conductive path on to conduct current while leaving the other conductive path cutoff. Each of the two conductive paths provides a path for conducting the filtered signal, allowing the current of the filtered signal to flow through one of the two paths, thereby achieving the function of mode switching or selection. For example, with reference to FIGS. 29A and 29C in addition, when the lamp driving circuit 505 is not present and the LED tube lamp 500 is directly supplied by the AC power supply 508, the mode switching circuit may determine on performing a first driving mode in which the driving circuit (such as driving circuit 1530, 1630, 1730, 1830, or 1930) transforms the filtered signal into a driving signal of a level meeting a required level to properly drive the LED module to emit light. On the other hand, when the lamp driving circuit 505 is present, the mode switching circuit may determine on performing a second driving mode in which the filtered signal is (almost) directly used to drive the LED module to emit light; or alternatively the mode switching circuit may determine on performing the first driving mode to drive the LED module to emit light.

Figure 38A:
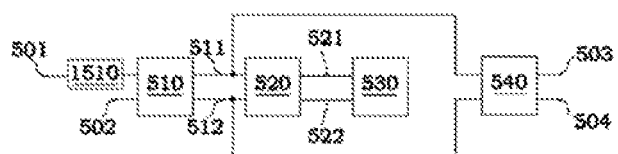
FIG. 38A is a block diagram of an LED lamp according to some embodiments.

FIG. 38A is a block diagram of an LED lamp according to an embodiment. Compared to FIG. 29D, the embodiment of FIG. 38A includes rectifying circuits 510 and 540, and a filtering circuit 520, and further includes a ballast-compatible circuit 1510; wherein the power supply module may also include some components of an LED lighting module 530. The ballast-compatible circuit 1510 may be coupled between pin 501 and/or pin 502 and rectifying circuit 510. This embodiment is explained assuming the ballast-compatible circuit 1510 to be coupled between pin 501 and rectifying circuit 510. With reference to FIGS. 29A and 29C in addition to FIG. 38A, lamp driving circuit 505 comprises a ballast configured to provide an AC driving signal to drive the LED lamp in this embodiment.

In an initial stage upon the activation of the driving system of lamp driving circuit 505, lamp driving circuit 505's ability to output relevant signal(s) has not risen to a standard state. However, in the initial stage the power supply module of the LED lamp instantly or rapidly receives or conducts the AC driving signal provided by lamp driving circuit 505, which initial conduction is likely to fail the starting of the LED lamp by lamp driving circuit 505 as lamp driving circuit 505 is initially loaded by the LED lamp in this stage. For example, internal components of lamp driving circuit 505 may retrieve power from a transformed output in lamp driving circuit 505, in order to maintain their operation upon the activation. In this case, the activation of lamp driving circuit 505 may end up failing as its output voltage could not normally rise to a required level in this initial stage; or the quality factor (Q) of a resonant circuit in lamp driving circuit 505 may vary as a result of the initial loading from the LED lamp, so as to cause the failure of the activation.

In this embodiment, in the initial stage upon activation, ballast-compatible circuit 1510 will be in an open-circuit state, preventing the energy of the AC driving signal from reaching the LED module. After a defined delay upon the AC driving signal as an external driving signal being input to the LED tube lamp, ballast-compatible circuit 1510 switches from a cutoff state during the delay to a conducting state, allowing the energy of the AC driving signal to start to reach the LED module. By means of the delayed conduction of ballast-compatible circuit 1510, operation of the LED lamp simulates the lamp-starting characteristics of a fluorescent lamp, that is, internal gases of the fluorescent lamp will normally discharge for light emission after a delay upon activation of a driving power supply. Therefore, ballast-compatible circuit 1510 further improves the compatibility of the LED lamp with lamp driving circuits 505 such as an electronic ballast.

In this embodiment, rectifying circuit 540 may be omitted and is therefore depicted by a dotted line in FIG. 38A.

It's noted that in any embodiments using the ballast-compatible circuit described with reference to FIGS. 38A~I in this disclosure, upon the external driving signal being initially input at the first pin and second pin, the ballast-compatible circuit will not enter a conduction state until a period of delay passes, wherein the period is typically between about 10 ms (or millisecond) and 1 second. And in some embodiments, the period may be between about 10 ms and 300 ms.

Figure 38B:
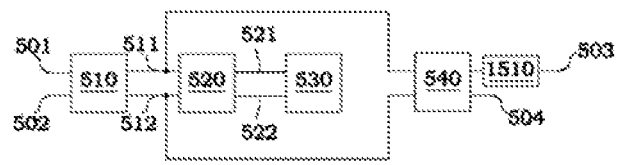
FIG. 38B is a block diagram of an LED lamp according to some embodiments.

FIG. 38B is a block diagram of an LED lamp according to an embodiment. Compared to FIG. 38A, ballast-compatible circuit 1510 in the embodiment of FIG. 38B is coupled between pin 503 and/or pin 504 and rectifying circuit 540. As explained regarding ballast-compatible circuit 1510 in FIG. 38A, ballast-compatible circuit 1510 in FIG. 38B performs the function of delaying the starting of the LED lamp, or causing the input of the AC driving signal to be delayed for a predefined time, in order to prevent the failure of starting by lamp driving circuits 505 such as an electronic ballast.

Figure 38C:
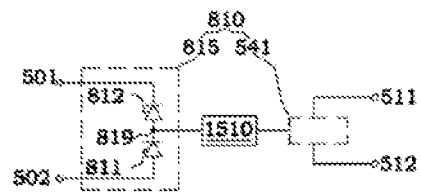
FIG. 38C illustrates an arrangement with a ballast-compatible circuit in an LED lamp according to some embodiments.

Apart from coupling ballast-compatible circuit 1510 between terminal pin(s) and rectifying circuit in the above embodiments, ballast-compatible circuit 1510 may alternatively be included within a rectifying circuit with a different structure. FIG. 38C illustrates an arrangement with a ballast-compatible circuit in an LED lamp according to an exemplary embodiment. Referring to FIG. 38C, the rectifying circuit assumes the circuit structure of rectifying circuit 810 in FIG. 30C. Rectifying circuit 810 includes rectifying unit 815 and terminal adapter circuit 541. Rectifying unit 815 is coupled to pins 501 and 502, terminal adapter circuit 541 is coupled to filtering output terminals 511 and 512, and the ballast-compatible circuit 1510 in FIG. 38C is coupled between rectifying unit 815 and terminal adapter circuit 541. In this case, in the initial stage upon activation of the ballast, an AC driving signal as an external driving signal is input to the LED tube lamp, where the AC driving signal can only reach rectifying unit 815, but cannot reach other circuits such as terminal adapter circuit 541, other internal filter circuitry, and the LED lighting module. Moreover, parasitic capacitors associated with rectifying diodes 811 and 812 within rectifying unit 815 are quite small in capacitance and may be ignored. Accordingly, lamp driving circuit 505 in the initial stage isn't loaded with or effectively connected to the equivalent capacitor or inductor of the power supply module of the LED lamp, and the quality factor (Q) of lamp driving circuit 505 is therefore not adversely affected in this stage, resulting in a successful starting of the LED lamp by lamp driving circuit 505.

It's worth noting that under the condition that terminal adapter circuit 541 doesn't include components such as capacitors or inductors, interchanging rectifying unit 815 and terminal adapter circuit 541 in position, meaning rectifying unit 815 is connected to filtering output terminals 511 and 512 and terminal adapter circuit 541 is connected to pins 501 and 502, doesn't affect or alter the function of ballast-compatible circuit 1510.

Further, as explained in FIGS. 30A-30D, when a rectifying circuit is connected to pins 503 and 504 instead of pins 501 and 502, this rectifying circuit may constitute the rectifying circuit 540. That is, the circuit arrangement with a ballast-compatible circuit 1510 in FIG. 38C may be alternatively included in rectifying circuit 540 instead of rectifying circuit 810, without affecting the function of ballast-compatible circuit 1510.

In some embodiments, as described above terminal adapter circuit 541 doesn't include components such as capacitors or inductors. Or when rectifying circuit 610 in FIG. 30A constitutes the rectifying circuit 510 or 540, parasitic capacitances in the rectifying circuit 510 or 540 are quite small and may be ignored. These conditions contribute to not affecting the quality factor of lamp driving circuit 505.

Figure 38D:
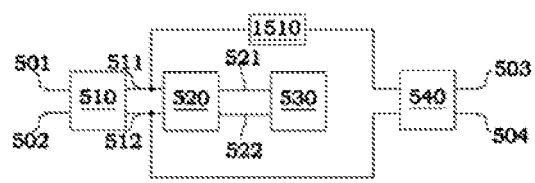
FIG. 38D is a block diagram of an LED lamp according to some embodiments.

FIG. 38D is a block diagram of an LED lamp according to an embodiment. Compared to the embodiment of FIG. 38A, ballast-compatible circuit 1510 in the embodiment of FIG. 38D is coupled between rectifying circuit 540 and filtering circuit 520. Since rectifying circuit 540 also doesn't include components such as capacitors or inductors, the function of ballast-compatible circuit 1510 in the embodiment of FIG. 38D will not be affected.

Figure 38E:
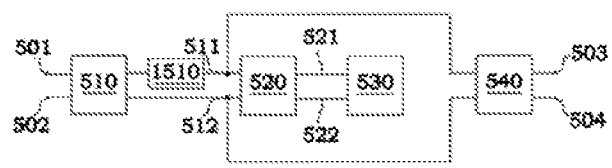
FIG. 38E is a block diagram of an LED lamp according to some embodiments.

FIG. 38E is a block diagram of an LED lamp according to an embodiment. Compared to FIG.

38A, ballast-compatible circuit 1510 in the embodiment of FIG. 38E is coupled between rectifying circuit 510 and filtering circuit 520. Similarly, since rectifying circuit 510 doesn't include components such as capacitors or inductors, the function of ballast-compatible circuit 1510 in the embodiment of FIG. 38E will not be affected.

Figure 38F:
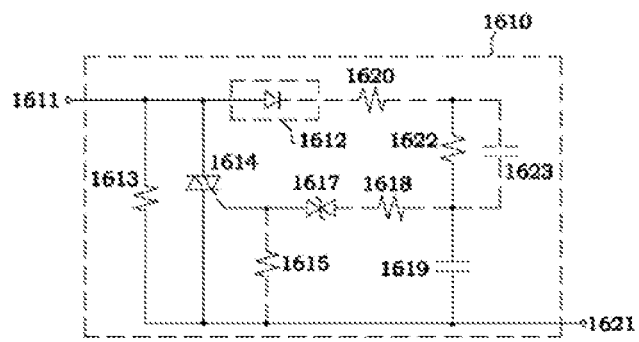
FIG. 38F is a schematic diagram of a ballast-compatible circuit according to some embodiments.

FIG. 38F is a schematic diagram of the ballast-compatible circuit according to an embodiment. Referring to FIG. 38F, a ballast-compatible circuit 1610 has an initial state in which an equivalent open-circuit is obtained at ballast-compatible circuit input and output terminals 1611 and 1621. Upon receiving an input signal at ballast-compatible circuit input terminal 1611, a delay will pass until a current conduction occurs through and between ballast-compatible circuit input and output terminals 1611 and 1621, transmitting the input signal to ballast-compatible circuit output terminal 1621.

Ballast-compatible circuit 1610 includes a diode 1612, resistors 1613, 1615, 1618, 1620, and 1622, a bidirectional triode thyristor (TRIAC) 1614, a DIAC or symmetrical trigger diode 1617, a capacitor 1619, and ballast-compatible circuit input and output terminals 1611 and 1621. It's noted that the resistance of resistor 1613 should be quite large so that when bidirectional triode thyristor 1614 is cutoff in an open-circuit state, an equivalent open-circuit is obtained at ballast-compatible circuit input and output terminals 1611 and 1621.

Bidirectional triode thyristor 1614 is coupled between ballast-compatible circuit input and output terminals 1611 and 1621, and resistor 1613 is also coupled between ballast-compatible circuit input and output terminals 1611 and 1621 and in parallel to bidirectional triode thyristor 1614. Diode 1612, resistors 1620 and 1622, and capacitor 1619 are serially connected in sequence between ballast-compatible circuit input and output terminals 1611 and 1621, and are connected in parallel to bidirectional triode thyristor 1614. Diode 1612 has an anode connected to bidirectional triode thyristor 1614, and has a cathode connected to an end of resistor 1620. Bidirectional triode thyristor 1614 has a control terminal connected to a terminal of symmetrical trigger diode 1617, which has another terminal connected to an end of resistor 1618, which has another end connected to a node connecting capacitor 1619 and resistor 1622. Resistor 1615 is connected between the control terminal of bidirectional triode thyristor 1614 and a node connecting resistor 1613 and capacitor 1619.

When an AC driving signal (such as a high-frequency high-voltage AC signal output by an electronic ballast) is initially input to ballast-compatible circuit input terminal 1611, bidirectional triode thyristor 1614 will be in an open-circuit state, not allowing the AC driving signal to pass through and the LED lamp is therefore also in an open-circuit state. In this state, the AC driving signal is charging capacitor 1619 through diode 1612 and resistors 1620 and 1622, gradually increasing the voltage of capacitor 1619. After charging continually, the voltage of capacitor 1619 increases to a level above the trigger voltage value of symmetrical trigger diode 1617 so that symmetrical trigger diode 1617 is turned on in a conducting state. Then the conducting symmetrical trigger diode 1617 will in turn trigger bidirectional triode thyristor 1614 on in a conducting state. In this situation, the conducting bidirectional triode thyristor 1614 electrically connects ballast-compatible circuit input and output terminals 1611 and 1621, allowing the AC driving signal to flow through ballast-compatible circuit input and output terminals 1611 and 1621, and starting the operation of the power supply module of the LED lamp. In this case the energy stored by capacitor 1619 will maintain the conducting state of bidirectional triode thyristor 1614, to prevent the AC variation of the AC driving signal from causing bidirectional triode thyristor 1614 and therefore ballast-compatible circuit 1610 to be cutoff again, or to prevent the problem of bidirectional triode thyristor 1614 alternating or switching between its conducting and cutoff states.

In general, in hundreds of milliseconds upon activation of a lamp driving circuit 505 such as an electronic ballast, the output voltage of the ballast has risen above a certain voltage value as the output voltage hasn't been adversely affected by the sudden initial loading from the LED lamp. A detection mechanism to detect whether lighting of a fluorescent lamp is achieved may be disposed in lamp driving circuits 505 such as an electronic ballast. In this detection mechanism, if a fluorescent lamp fails to light up for a determined period, an abnormal state of the fluorescent lamp is detected, causing the fluorescent lamp to enter a protection state. In certain embodiments, the delay provided by ballast-compatible circuit 1610 until conduction of ballast-compatible circuit 1610 and then the LED lamp may be in the range of about 0.1~3 seconds.

It's worth noting that an additional capacitor 1623 may be coupled in parallel to resistor 1622. Capacitor 1623 works to reflect or support instantaneous change in the voltage between ballast-compatible circuit input and output terminals 1611 and 1621, and will not affect the function of delayed conduction performed by ballast-compatible circuit 1610.

Figure 38G:
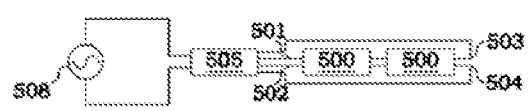
FIG. 38G is a block diagram of an exemplary power supply module in an LED lamp according to some embodiments.

FIG. 38G is a block diagram of a power supply system in an LED lamp according to an embodiment. Compared to the embodiment of FIG. 29C, lamp driving circuit 505 in the embodiment of FIG. 38G drives a plurality of LED tube lamps 500 connected in series, wherein a ballast-compatible circuit 1610 is disposed in each of the LED tube lamps 500. For the convenience of illustration, two serially connected LED tube lamps 500 are assumed for example and explained as follows.

Because the two ballast-compatible circuits 1610 respectively of the two LED tube lamps 500 potentially have different delays until conduction of the LED tube lamps 500, due to various factors such as errors occurring in production processes of some components, the actual timing of conduction of each of the ballast-compatible circuits 1610 is different. Upon activation of a lamp driving circuit 505, the voltage of the AC driving signal provided by lamp driving circuit 505 will be shared out by the two LED tube lamps 500 roughly equally. Subsequently when only one of the two LED tube lamps 500 first enters a conducting state, the voltage of the AC driving signal then will be borne mostly or entirely by the other LED tube lamp 500. This situation will cause the voltage across the ballast-compatible circuits 1610 in the other LED tube lamp 500 that's not conducting to suddenly increase or be doubled, meaning the voltage between ballast-compatible circuit input and output terminals 1611 and 1621 might even be suddenly doubled. In view of this, if capacitor 1623 is included, the voltage division effect between capacitors 1619 and 1623 will instantaneously increase the voltage of capacitor 1619, making symmetrical trigger diode 1617 triggering bidirectional triode thyristor 1614 into a conducting state, and causing the two ballast-compatible circuits 1610 respectively of the two LED tube lamps 500 to become conducting almost at the same time. Therefore, by introducing capacitor 1623, the situation, where one of the two ballast-compatible circuits 1610 respectively of the two serially connected LED tube lamps 500 that is first conducting has its bidirectional triode thyristor 1614 then suddenly cutoff as having insufficient current passing through due to the discrepancy between the delays provided by the two ballast-compatible circuits 1610 until their respective conductions, can be avoided. Therefore, using each ballast-compatible circuit 1610 with capacitor 1623 further improves the compatibility of the serially connected LED tube lamps with each of lamp driving circuits 505 such as an electronic ballast.

An exemplary range of the capacitance of capacitor 1623 may be about 10 pF to about 1 nF. In some embodiments, the range of the capacitance of capacitor 1623 may be about 10 pF to about 100 pF. For example, the capacitance of capacitor 1623 may be about 47 pF.

It's worth noting that diode 1612 is used or configured to rectify the signal for charging capacitor 1619. Therefore, with reference to FIGS. 38C, 38D, and 38E, in the case when ballast-compatible circuit 1610 is arranged following a rectifying unit or circuit, diode 1612 may be omitted. Diode 1612 is depicted by a dotted line in FIG. 38F.

Figure 38H:
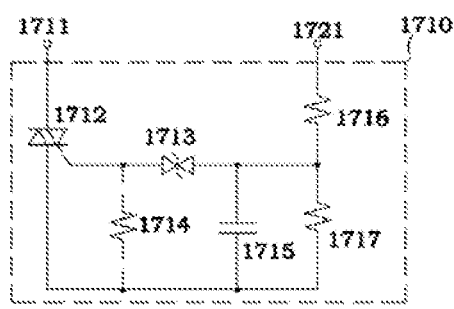
FIG. 38H is a schematic diagram of a ballast-compatible circuit according to some embodiments.

FIG. 38H is a schematic diagram of the ballast-compatible circuit according to another embodiment. Referring to FIG. 38H, a ballast-compatible circuit 1710 has an initial state in which an equivalent open-circuit is obtained at ballast-compatible circuit input and output terminals 1711 and 1721. Upon receiving an input signal at ballast-compatible circuit input terminal 1711, ballast-compatible circuit 1710 will be in a cutoff state when the level of the input external driving signal is below a defined value corresponding to a conduction delay of ballast-compatible circuit 1710; and ballast-compatible circuit 1710 will enter a conducting state upon the level of the input external driving signal reaching the defined value, thus transmitting the input signal to ballast-compatible circuit output terminal 1721.

Ballast-compatible circuit 1710 includes a bidirectional triode thyristor (TRIAC) 1712, a DIAC or symmetrical trigger diode 1713, resistors 1714, 1716, and 1717, and a capacitor 1715. Bidirectional triode thyristor 1712 has a first terminal connected to ballast-compatible circuit input terminal 1711; a control terminal connected to a terminal of symmetrical trigger diode 1713 and an end of resistor 1714; and a second terminal connected to another end of resistor 1714. Capacitor 1715 has an end connected to another terminal of symmetrical trigger diode 1713, and has another end connected to the second terminal of bidirectional triode thyristor 1712. Resistor 1717 is in parallel connection with capacitor 1715, and is therefore also connected to said another terminal of symmetrical trigger diode 1713 and the second terminal of bidirectional triode thyristor 1712. And resistor 1716 has an end connected to the node connecting capacitor 1715 and symmetrical trigger diode 1713, and has another end connected to ballast-compatible circuit output terminal 1721.

When an AC driving signal (such as a high-frequency high-voltage AC signal output by an electronic ballast) is initially input to ballast-compatible circuit input terminal 1711, bidirectional triode thyristor 1712 will be in an open-circuit state, not allowing the AC driving signal to pass through and the LED lamp is therefore also in an open-circuit state. The input of the AC driving signal causes a potential difference between ballast-compatible circuit input terminal 1711 and ballast-compatible circuit output terminal 1721. When the AC driving signal increases with time to eventually reach a sufficient amplitude (which is a defined level after the delay) after a period of time, the signal level at ballast-compatible circuit output terminal 1721 has a reflected voltage at the control terminal of bidirectional triode thyristor 1712 after passing through resistor 1716, parallel-connected capacitor 1715 and resistor 1717, and resistor 1714, wherein the reflected voltage then triggers bidirectional triode thyristor 1712 into a conducting state. This conducting state makes ballast-compatible circuit 1710 entering a conducting state which causes the LED lamp to operate normally. Upon bidirectional triode thyristor 1712 conducting, a current flows through resistor 1716 and then charges capacitor 1715 to store a specific voltage on capacitor 1715. In this case, the energy stored by capacitor 1715 will maintain the conducting state of bidirectional triode thyristor 1712, to prevent the AC variation of the AC driving signal from causing bidirectional triode thyristor 1712 and therefore ballast-compatible circuit 1710 to be cutoff again, or to prevent the situation of bidirectional triode thyristor 1712 alternating or switching between its conducting and cutoff states.

Figure 38I:
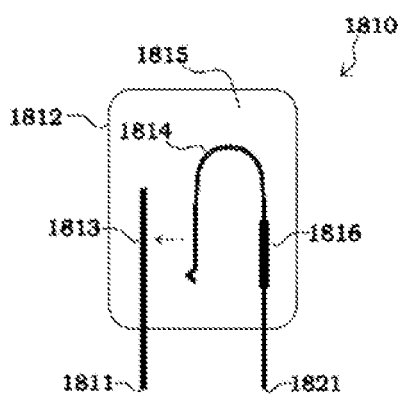
FIG. 38I illustrates a ballast-compatible circuit according to some embodiments.

FIG. 38I illustrates the ballast-compatible circuit according to an embodiment. Referring to FIG. 38I, a ballast-compatible circuit 1810 includes a housing 1812, a metallic electrode 1813, a bimetallic strip 1814, and a heating filament 1816. Metallic electrode 1813 and heating filament 1816 protrude from the housing 1812, so that they each have a portion inside the housing 1812 and a portion outside of the housing 1812. Metallic electrode 1813's outside portion has a ballast-compatible circuit input terminal 1811, and heating filament 1816's outside portion has a ballast-compatible circuit output terminal 1821. Housing 1812 is hermetic or tightly sealed and contains inert gas 1815 such as helium gas. Bimetallic strip 1814 is inside housing 1812 and is physically and electrically connected to the portion of heating filament 1816 that is inside the housing 1812. And there is a spacing between bimetallic strip 1814 and metallic electrode 1813, so that ballast-compatible circuit input terminal 1811 and ballast-compatible circuit output terminal 1821 are not electrically connected in the initial state of ballast-compatible circuit 1810. Bimetallic strip 1814 may include two metallic strips with different temperature coefficients, wherein the metallic strip closer to metallic electrode 1813 has a smaller temperature coefficient, and the metallic strip more away from metallic electrode 1813 has a larger temperature coefficient.

When an AC driving signal (such as a high-frequency high-voltage AC signal output by an electronic ballast) is initially input at ballast-compatible circuit input terminal 1811 and ballast-compatible circuit output terminal 1821, a potential difference between metallic electrode 1813 and heating filament 1816 is formed. When the potential difference increases enough to cause electric arc or arc discharge through inert gas 1815, meaning when the AC driving signal increases with time to eventually reach the defined level after a delay, then inert gas 1815 is then heated to cause bimetallic strip 1814 to swell toward metallic electrode 1813 (as in the direction of the broken-line arrow in FIG. 38I), with this swelling eventually causing bimetallic strip 1814 to bear against metallic electrode 1813, forming the physical and electrical connections between them. In this situation, there is electrical conduction between ballast-compatible circuit input terminal 1811 and ballast-compatible circuit output terminal 1821. Then the AC driving signal flows through and heats heating filament 1816. In this heating process, heating filament 1816 allows a current to flow through when electrical conduction exists between metallic electrode 1813 and bimetallic strip 1814, causing the temperature of bimetallic strip 1814 to be above a defined conduction temperature. As a result, since the respective temperature of the two metallic strips of bimetallic strip 1814 with different temperature coefficients are maintained above the defined conduction temperature, bimetallic strip 1814 will bend against or toward metallic electrode 1813, thus maintaining or supporting the physical joining or connection between bimetallic strip 1814 and metallic electrode 1813.

Therefore, upon receiving an input signal at ballast-compatible circuit input and output terminals 1811 and 1821, a delay will pass until an electrical/current conduction occurs through and between ballast-compatible circuit input and output terminals 1811 and 1821.

Therefore, an exemplary ballast-compatible circuit such as described herein may be coupled between any pin and any rectifying circuit described above, wherein the ballast-compatible circuit will be in a cutoff state in a defined delay upon an external driving signal being input to the LED tube lamp, and will enter a conducting state after the delay. Otherwise, the ballast-compatible circuit will be in a cutoff state when the level of the input external driving signal is below a defined value corresponding to a conduction delay of the ballast-compatible circuit; and ballast-compatible circuit will enter a conducting state upon the level of the input external driving signal reaching the defined value. Accordingly, the compatibility of the LED tube lamp described herein with lamp driving circuits 505 such as an electronic ballast is further improved by using such a ballast-compatible circuit.

Figure 39A:
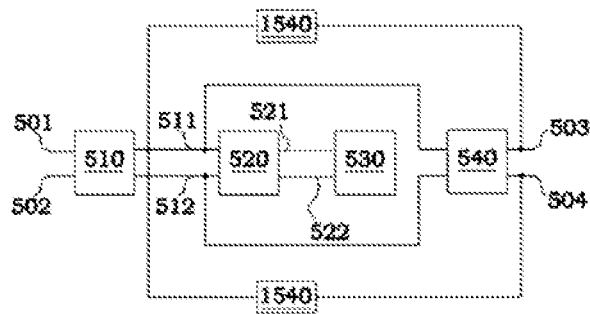
FIG. 39A is a block diagram of an LED tube lamp according to some embodiments.

FIG. 39A is a block diagram of an LED tube lamp according to an embodiment. Compared to that shown in FIG. 29D, the present embodiment comprises the rectifying circuits 510 and 540, and the filtering circuit 520, and further comprises two ballast-compatible circuits 1540; wherein the power supply module may also include some components of LED lighting module 530. The two ballast-compatible circuits 1540 are coupled respectively between the pin 503 and the rectifying output terminal 511 and between the pin 504 and the rectifying output terminal 511. Referring to FIG. 29A and FIG. 29C, the lamp driving circuit 505 is an electronic ballast for supplying an AC driving signal to drive the LED lamp.

Two ballast-compatible circuits 1540 are initially in conducting states, and then enter cutoff state in a delay. Therefore, in an initial stage upon activation of the lamp driving circuit 505, the AC driving signal is transmitted through the pin 503, the corresponding ballast-compatible circuit 1540, the rectifying output terminal 511 and the rectifying circuit 510, or through the pin 504, the corresponding ballast-compatible circuit 1540, the rectifying output terminal 511 and the rectifying circuit 510 of the LED lamp, and the filtering circuit 520 and LED lighting module 530 of the LED lamp are bypassed. Thereby, the LED lamp presents almost no load and does not affect the quality factor of the lamp driving circuit 505 at the beginning, and so the lamp driving circuit can be activated successfully. The two ballast-compatible circuits 1540 are cut off for a moment while the lamp driving circuit 505 has been activated successfully. After that, the lamp driving circuit 505 has a sufficient drive capability for driving the LED lamp to emit light.

Figure 39B:
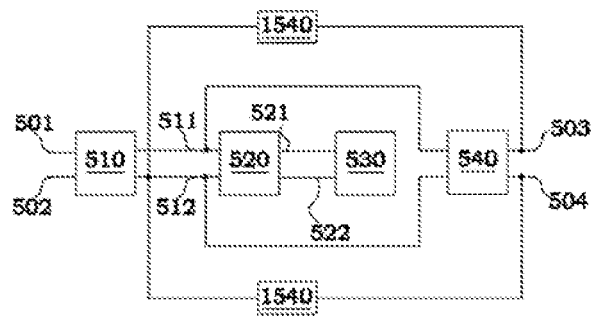
FIG. 39B is a block diagram of an LED tube lamp according to some embodiments.

FIG. 39B is a block diagram of an LED tube lamp according to an embodiment. Compared to that shown in FIG. 39A, the two ballast-compatible circuits 1540 are changed to be coupled respectively between the pin 503 and the rectifying output terminal 512 and between the pin 504 and the rectifying output terminal 512. Similarly, two ballast-compatible circuits 1540 are initially in conducting states, and then changed to cutoff states after an objective delay. Thereby, the lamp driving circuit 505 drives the LED lamp to emit light after the lamp driving circuit 505 has activated.

It is worth noting that the arrangement of the two ballast-compatible circuits 1540 may be changed to be coupled between the pin 501 and the rectifying terminal 511 and between the pin 501 and the rectifying terminal 511, or between the pin 501 and the rectifying terminal 512 and between the pin 501 and the rectifying terminal 512, for having the lamp driving circuit 505 drive the LED lamp to emit light after being activated.

Figure 39C:
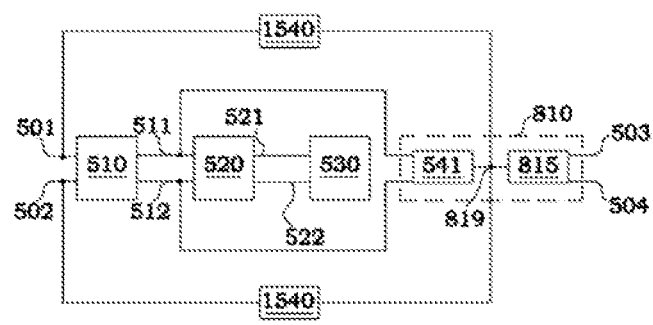
FIG. 39C is a block diagram of an LED tube lamp according to some embodiments.

FIG. 39C is a block diagram of an LED tube lamp according to an embodiment. Compared to that shown in FIGS. 39A and 39B, the rectifying circuit 810 shown in FIG. 30C replaces the rectifying circuit 540, and the rectifying unit 815 of the rectifying circuit 810 is coupled to the pins 503 and 504 and the terminal adapter circuit 541 thereof is coupled to the rectifying output terminals 511 and 512. The arrangement of the two ballast-compatible circuits 1540 is also changed to be coupled respectively between the pin 501 and the half-wave node 819 and between the pin 502 and the half-wave node 819. It's noted that the terminal adapter circuit is for transmitting (intended to encompass the meanings of "changing" and "transforming") the external driving signal received at the pin 501 and/or the pin 502.

In an initial stage upon activation of the lamp driving circuit 505, two ballast-compatible circuits 1540 are initially in conducting states. At this moment, the AC driving signal is transmitted through the pin 501, the corresponding ballast-compatible circuit 1540, the half-wave node 819 and the rectifying unit 815 or the pin 502, the corresponding ballast-compatible circuit 1540, the half-wave node 819 and the rectifying unit 815 of the LED lamp, and the terminal adapter circuit 541, the filtering circuit 520 and LED lighting module 530 of the LED lamp are bypassed. Thereby, the LED lamp presents almost no load and does not affect the quality factor of the lamp driving circuit 505 at the beginning, and so the lamp driving circuit can be activated successfully. The two ballast-compatible circuits 1540 are cut off for a moment while the lamp driving circuit 505 has been activated successfully. After that, the lamp driving circuit 505 has a sufficient drive capability for driving the LED lamp to emit light.

It is worth noting that the rectifying circuit 810 shown in FIG. 30C may replace the rectifying circuit 510 of the present embodiment shown in FIG. 39C instead of the rectifying circuit 540. Wherein, the rectifying unit 815 of the rectifying circuit 810 is coupled to the pins 501 and 502 and the terminal adapter circuit 541 thereof is coupled to the rectifying output terminals 511 and 512. The arrangement of the two ballast-compatible circuits 1540 is also changed to be coupled respectively between the pin 503 and the half-wave node 819 and between the pin 504 and the half-wave node 819.

Figure 39D:
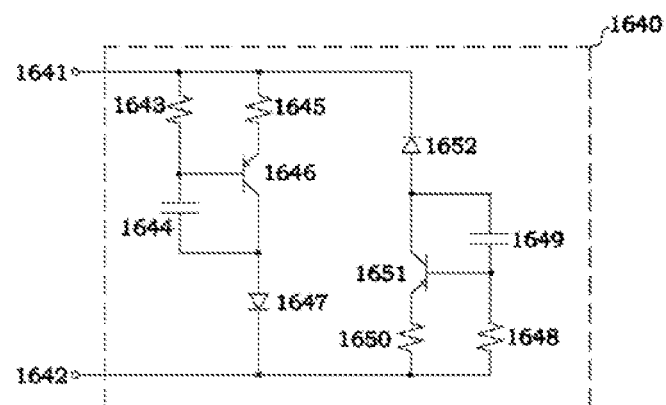
FIG. 39D is a schematic diagram of a ballast-compatible circuit according to some embodiments, which is applicable to the embodiments shown in FIGS. 39A and 39B and the described modification thereof.

FIG. 39D is a schematic diagram of a ballast-compatible circuit according to an embodiment, which is applicable to the embodiments shown in FIGS. 39A and 39B and the described modification thereof.

A ballast-compatible circuit 1640 comprises resistors 1643, 1645, 1648 and 1650, capacitors 1644 and 1649, diodes 1647 and 1652, bipolar junction transistors (BJT) 1646 and 1651, a ballast-compatible circuit terminal 1641 and a ballast-compatible circuit terminal 1642. One end of the resistor 1645 is coupled to the ballast-compatible circuit terminal 1641, and the other end is coupled to an emitter of the BJT 1646. A collector of the BJT 1646 is coupled to a positive end of the diode 1647, and a negative end thereof is coupled to the ballast-compatible circuit terminal 1642. The resistor 1643 and the capacitor 1644 are connected in series with each other and coupled between the emitter and the collector of the BJT 1646, and the connection node of the resistor 1643 and the capacitor 1644 is coupled to a base of the BJT 1646. One end of the resistor 1650 is coupled to the ballast-compatible circuit terminal 1642, and the other end is coupled to an emitter of the BJT 1651. A collector of the BJT 1651 is coupled to a positive end of the diode 1652, and a negative end thereof is coupled to the ballast-compatible circuit terminal 1641. The resistor 1648 and the capacitor 1649 are connected in series with each other and coupled between the emitter and the collector of the BJT 1651, and the connection node of the resistor 1648 and the capacitor 1649 is coupled to a base of the BJT 1651.

In an initial stage upon the lamp driving circuit 505, e.g. electronic ballast, being activated, voltages across the capacitors 1644 and 1649 are about zero. At this point, the BJTs 1646 and 1651 are in conducting state and the bases thereof allow currents to flow through. Therefore, in an initial stage upon activation of the lamp driving circuit 505, the ballast-compatible circuits 1640 are in conducting state. The AC driving signal charges the capacitor 1644 through the resistor 1643 and the diode 1647, and charges the capacitor 1649 through the resistor 1648 and the diode 1652. In a moment, the voltages across the capacitors 1644 and 1649 reach certain voltages for reducing the voltages of the resistors 1643 and 1648, thereby cutting off the BJTs 1646 and 1651, i.e., the states of the BJTs 1646 and 1651 are cutoff states. At this point, the state of the ballast-compatible circuit 1640 is changed to the cutoff state. Thereby, the internal capacitor(s) and inductor(s) do not affect in Q-factor of the lamp driving circuit 505 at the beginning for ensuring the lamp driving circuit activating. Hence, the ballast-compatible circuit 1640 improves the compatibility of LED lamp with the electronic ballast.

In summary, the two ballast-compatible circuits are respectively coupled between a connection node of the rectifying circuit and the filtering circuit (i.e., the rectifying output terminal 511 or 512) and the pin 501 and between the connection node and the pin 502, or coupled between the connection node and the pin 503 and the connection node and the pin 504. The two ballast-compatible circuits conduct for an objective delay upon the external driving signal being input into the LED tube lamp, and then are cut off for enhancing the compatibility of the LED lamp with the electronic ballast.

Figure 40A:
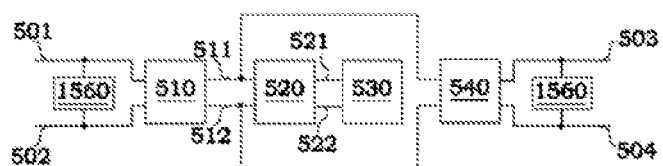
FIG. 40A is a block diagram of an LED tube lamp according to some embodiments.

FIG. 40A is a block diagram of an LED tube lamp according to an embodiment. Compared to that shown in FIG. 29D, the present embodiment comprises the rectifying circuits 510 and 540, the filtering circuit 520, and the LED lighting module 530, and further comprises two filament-simulating circuits 1560. The filament-simulating circuits 1560 are respectively coupled between the pins 501 and 502 and coupled between the pins 503 and 504, for improving a compatibility with a lamp driving circuit having filament detection function, e.g.: program-start ballast.

In an initial stage upon the lamp driving circuit having filament detection function being activated, the lamp driving circuit will determine whether the filaments of the lamp operate normally or are in an abnormal condition of short-circuit or open-circuit. When determining the abnormal condition of the filaments, the lamp driving circuit stops operating and enters a protection state. In order to avoid that the lamp driving circuit erroneously determines the LED tube lamp to be abnormal due to the LED tube lamp having no filament, the two filament-simulating circuits 1560 simulate the operation of actual filaments of a fluorescent tube to have the lamp driving circuit enter into a normal state to start the LED lamp normally.

Figure 40B:
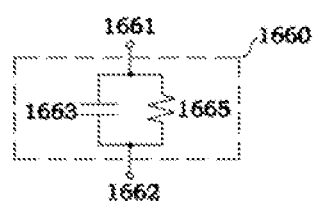
FIG. 40B is a schematic diagram of a filament-simulating circuit according to some embodiments.

FIG. 40B is a schematic diagram of a filament-simulating circuit according to an embodiment. The filament-simulating circuit comprises a capacitor 1663 and a resistor 1665 connected in parallel, and two ends of the capacitor 1663 and two ends of the resistor 1665 are re respectively coupled to filament simulating terminals 1661 and 1662. Referring to FIG. 40A, the two filament-simulating terminals 1661 and 1662 of the filament-simulating circuit 1660 are respectively coupled to the pins 501 and 502 and the pins 503 and 504. During the filament detection process, the lamp driving circuit outputs a detection signal to detect the state of the filaments. The detection signal passes the capacitor 1663 and the resistor 1665 and so the lamp driving circuit determines that the filaments of the LED lamp are normal.

In addition, a capacitance value of the capacitor 1663 is low and so a capacitive reactance (equivalent impedance) of the capacitor 1663 is far lower than an impedance of the resistor 1665 due to the lamp driving circuit outputting a high-frequency alternative current (AC) signal to drive LED lamp. Therefore, the filament-simulating circuit 1660 consumes relatively little power when the LED lamp operates normally, and so it almost does not affect the luminous efficiency of the LED lamp.

Figure 40C:
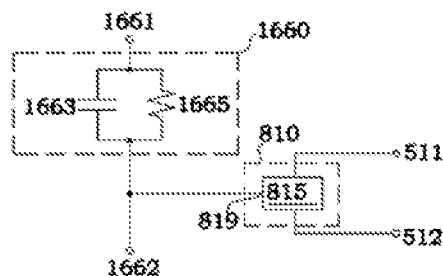
FIG. 40C is a schematic block diagram including a filament-simulating circuit according to some embodiments.

FIG. 40C is a schematic block diagram including a filament-simulating circuit according to an embodiment. In the present embodiment, the filament-simulating circuit 1660 replaces the terminal adapter circuit 541 of the rectifying circuit 810 shown in FIG. 30C, which is adopted as the rectifying circuit 510 or/and 540 in the LED lamp. For example, the filament-simulating circuit 1660 of the present embodiment has both of filament simulating and terminal adapting functions. Referring to FIG. 40A, the filament simulating terminals 1661 and 1662 of the filament-simulating circuit 1660 are respectively coupled to the pins 501 and 502 or/and pins 503 and 504. The half-wave node 819 of rectifying unit 815 in the rectifying circuit 810 is coupled to the filament simulating terminal 1662.

Figure 40D:
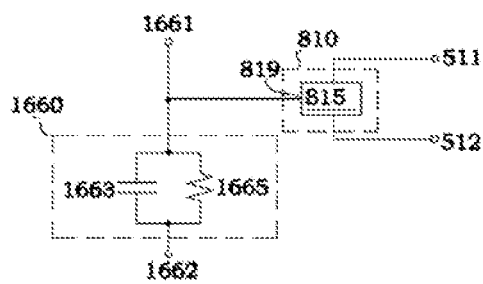
FIG. 40D is a schematic block diagram including a filament-simulating circuit according to some embodiments.

FIG. 40D is a schematic block diagram including a filament-simulating circuit according to another embodiment. Compared to that shown in FIG. 40C, the half-wave node is changed to be coupled to the filament simulating terminal 1661, and the filament-simulating circuit 1660 in the present embodiment still has both of filament simulating and terminal adapting functions.

Figure 40E:
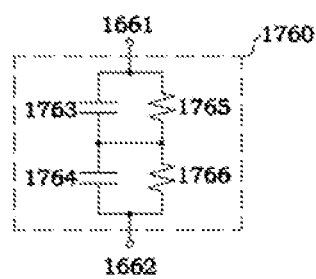
FIG. 40E is a schematic diagram of a filament-simulating circuit according to some embodiments.

FIG. 40E is a schematic diagram of a filament-simulating circuit according to another embodiment. A filament-simulating circuit 1760 comprises capacitors 1763 and 1764, and the resistors 1765 and 1766. The capacitors 1763 and 1764 are connected in series and coupled between the filament simulating terminals 1661 and 1662. The resistors 1765 and 1766 are connected in series and coupled between the filament simulating terminals 1661 and 1662. Furthermore, the connection node of capacitors 1763 and 1764 is coupled to that of the resistors 1765 and 1766. Referring to FIG. 40A, the filament simulating terminals 1661 and 1662 of the filament-simulating circuit 1760 are respectively coupled to the pins 501 and 502 and the pins 503 and 504. When the lamp driving circuit outputs the detection signal for detecting the state of the filament, the detection signal passes the capacitors 1763 and 1764 and the resistors 1765 and 1766 so that the lamp driving circuit determines that the filaments of the LED lamp are normal.

It is worth noting that in some embodiments, capacitance values of the capacitors 1763 and 1764 are low and so a capacitive reactance of the serially connected capacitors 1763 and 1764 is far lower than an impedance of the serially connected resistors 1765 and 1766 due to the lamp driving circuit outputting the high-frequency AC signal to drive LED lamp. Therefore, the filament-simulating circuit 1760 consumes little power when the LED lamp operates normally, and so it almost does not affect the luminous efficiency of the LED lamp. Moreover, any one of the capacitor 1763 and the resistor 1765 is short circuited or is an open circuit, or any one of the capacitor 1764 and the resistor 1766 is short circuited or is an open circuit, the detection signal still passes through the filament-simulating circuit 1760 between the filament simulating terminals 1661 and 1662. Therefore, the filament-simulating circuit 1760 still operates normally when any one of the capacitor 1763 and the resistor 1765 is short circuited or is an open circuit or any one of the capacitor 1764 and the resistor 1766 is short circuited or is an open circuit, and so it has quite high fault tolerance.

Figure 40F:
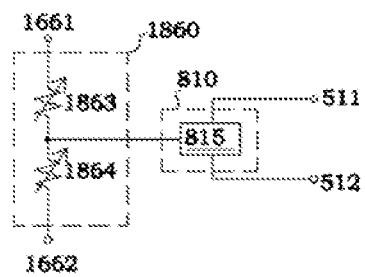
FIG. 40F is a schematic block diagram including a filament-simulating circuit according to some embodiments.

FIG. 40F is a schematic block diagram including a filament-simulating circuit according to an embodiment. In the present embodiment, the filament-simulating circuit 1860 replaces the terminal adapter circuit 541 of the rectifying circuit 810 shown in FIG. 30C, which is adopted as the rectifying circuit 510 or/and 540 in the LED lamp. For example, the filament-simulating circuit 1860 of the present embodiment has both of filament simulating and terminal adapting functions. An impedance of the filament-simulating circuit 1860 has a negative temperature coefficient (NTC), i.e., the impedance at a higher temperature is lower than that at a lower temperature. In the present embodiment, the filament-simulating circuit 1860 comprises two NTC resistors 1863 and 1864 connected in series and coupled to the filament simulating terminals 1661 and 1662. Referring to FIG. 40A, the filament simulating terminals 1661 and 1662 are respectively coupled to the pins 501 and 502 or/and the pins 503 and 504. The half-wave node 819 of the rectifying unit 815 in the rectifying circuit 810 is coupled to a connection node of the NTC resistors 1863 and 1864.

When the lamp driving circuit outputs the detection signal for detecting the state of the filament, the detection signal passes the NTC resistors 1863 and 1864 so that the lamp driving circuit determines that the filaments of the LED lamp are normal. The impedance of the serially connected NTC resistors 1863 and 1864 is gradually decreased with the gradually increasing of temperature due to the detection signal or a preheat process. When the lamp driving circuit enters into the normal state to start the LED lamp normally, the impedance of the serially connected NTC resistors 1863 and 1864 is decreased to a relative low value and so the power consumption of the filament simulation circuit 1860 is lower.

An exemplary impedance of the filament-simulating circuit 1860 can be 10 ohms or more at room temperature (25 degrees Celsius) and may be decreased to a range of about 2-10 ohms when the lamp driving circuit enters the normal state. In some embodiments, the impedance of the filament-simulating circuit 1860 may be decreased to a range of about 3-6 ohms when the lamp driving circuit enters the normal state.

Figure 41A:
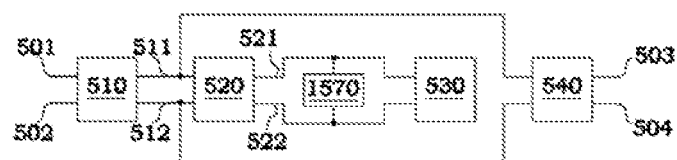
FIG. 41A is a block diagram of an LED tube lamp according to some embodiments.

FIG. 41A is a block diagram of an LED tube lamp according to an embodiment. Compared to that shown in FIG. 29D, the present embodiment comprises the rectifying circuits 510 and 540, the filtering circuit 520, and the LED lighting module 530, and further comprises an over voltage protection (OVP) circuit 1570. The OVP circuit 1570 is coupled to the filtering output terminals 521 and 522 for detecting the filtered signal. The OVP circuit 1570 clamps the level of the filtered signal when determining the level thereof higher than a defined OVP value. Hence, the OVP circuit 1570 protects the LED lighting module 530 from damage due to an OVP condition. The rectifying circuit 540 may be omitted and is therefore depicted by a dotted line.

Figure 41B:
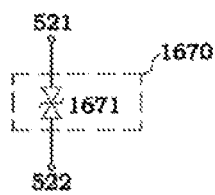
FIG. 41B is a schematic diagram of an OVP circuit according to an embodiment.

FIG. 41B is a schematic diagram of an overvoltage protection (OVP) circuit according to an embodiment. The OVP circuit 1670 comprises a voltage clamping diode 1671, such as Zener diode, coupled to the filtering output terminals 521 and 522. The voltage clamping diode 1671 is conducted to clamp a voltage difference at a breakdown voltage when the voltage difference of the filtering output terminals 521 and 522 (i.e., the level of the filtered signal) reaches the breakdown voltage. The breakdown voltage may be in a range of about 40 V to about 100 V. In some embodiments, the breakdown voltage may be in a range of about 55 V to about 75V.

Figure 42A:
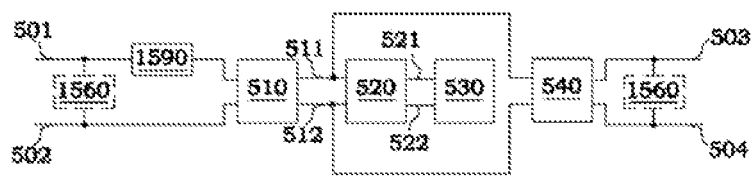
FIG. 42A is a block diagram of an LED tube lamp according to some embodiments.

FIG. 42A is a block diagram of an LED tube lamp according to an embodiment. Compared to that shown in FIG. 40A, the present embodiment comprises the rectifying circuits 510 and 540, the filtering circuit 520, the LED lighting module 530 and the two filament-simulating circuits 1560, and further comprises a ballast detection circuit 1590. The ballast detection circuit 1590 may be coupled to any one of the pins 501, 502, 503 and 504 and a corresponding rectifying circuit of the rectifying circuits 510 and 540. In the present embodiment, the ballast detection circuit 1590 is coupled between the pin 501 and the rectifying circuit 510.

The ballast detection circuit 1590 detects the AC driving signal or a signal input through the pins 501, 502, 503 and 504, and determines whether the input signal is provided by an electric ballast based on the detected result.

Figure 42B:
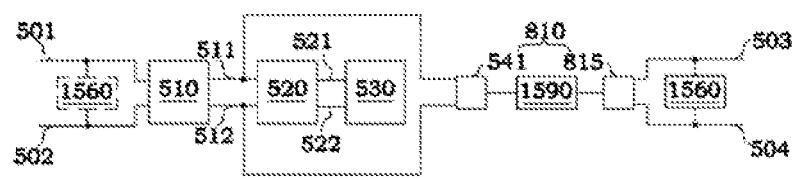
FIG. 42B is a block diagram of an LED tube lamp according to some embodiments.

FIG. 42B is a block diagram of an LED tube lamp according to an embodiment. Compared to that shown in FIG. 42A, the rectifying circuit 810 shown in FIG. 30C replaces the rectifying circuit 510. The ballast detection circuit 1590 is coupled between the rectifying unit 815 and the terminal adapter circuit 541. One of the rectifying unit 815 and the terminal adapter circuit 541 is coupled to the pines 503 and 504, and the other one is coupled to the rectifying output terminal 511 and 512. In the present embodiment, the rectifying unit 815 is coupled to the pins 503 and 504, and the terminal adapter circuit 541 is coupled to the rectifying output terminal 511 and 512. Similarly, the ballast detection circuit 1590 detects the signal input through the pins 503 and 504 for determining the input signal whether provided by an electric ballast according to the frequency of the input signal.

In addition, the rectifying circuit 810 may replace the rectifying circuit 510 instead of the rectifying circuit 540, and the ballast detection circuit 1590 is coupled between the rectifying unit 815 and the terminal adapter circuit 541 in the rectifying circuit 510.

Figure 42C:
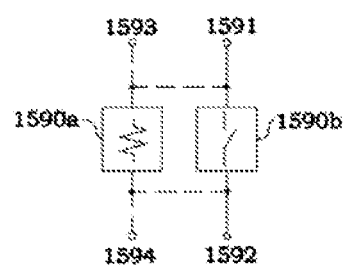
FIG. 42C is a block diagram of a ballast detection circuit according to some embodiments.

FIG. 42C is a block diagram of a ballast detection circuit according to an embodiment. The ballast detection circuit 1590 comprises a detection circuit 1590a and a switch circuit 1590b. The switch circuit 1590b is coupled to switch terminals 1591 and 1592. The detection circuit 1590a is coupled to the detection terminals 1593 and 1594 for detecting a signal transmitted through the detection terminals 1593 and 1594. Alternatively, the switch terminals 1591 and 1592 serves as the detection terminals and the detection terminals 1593 and 1594 are omitted. For example, in certain embodiments, the switch circuit 1590b and the detection circuit 1590a are commonly coupled to the switch terminals 1591 and 1592, and the detection circuit 1590a detects a signal transmitted through the switch terminals 1591 and 1592. Hence, the detection terminals 1593 and 1594 are depicted by dotted lines.

Figure 42D:
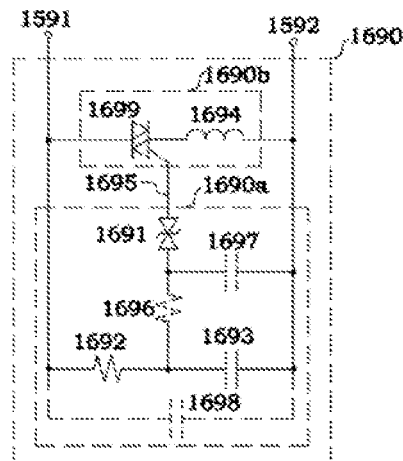
FIG. 42D is a schematic diagram of a ballast detection circuit according to some embodiments.

FIG. 42D is a schematic diagram of a ballast detection circuit according to an embodiment. The ballast detection circuit 1690 comprises a detection circuit 1690*a* and a switch circuit 1690*b*, and is coupled between the switch terminals 1591 and 1592. The detection circuit 1690*a* comprises a symmetrical trigger diode 1691, resistors 1692 and 1696 and capacitors 1693, 1697 and 1698. The switch circuit 1690*b* comprises a TRIAC 1699 and an inductor 1694.

The capacitor 1698 is coupled between the switch terminals 1591 and 1592 for generating a detection voltage in response to a signal transmitted through the switch terminals 1591 and 1592. When the signal is a high frequency signal, the capacitive reactance of the capacitor 1698 is fairly low and so the detection voltage generated thereby is quite high. The resistor 1692 and the capacitor 1693 are connected in series and coupled between two ends of the capacitor 1698. The serially connected resistor 1692 and the capacitor 1693 is used to filter the detection signal generated by the capacitor 1698 and generates a filtered detection signal at a connection node thereof. The filter function of the resistor 1692 and the capacitor 1693 is used to filter high frequency noise in the detection signal for preventing the switch circuit 1690*b* from malfunctioning due to the high frequency noise. The resistor 1696 and the capacitor 1697 are connected in series and coupled between two ends of the capacitor 1693, and transmit the filtered detection signal to one end of the symmetrical trigger diode 1691. The serially connected resistor 1696 and capacitor 1697 performs second filtering of the filtered detection signal to enhance the filter effect of the detection circuit 1690*a*. Based on requirement for filtering level of different application, the capacitor 1697 may be omitted and the end of the symmetrical trigger diode 1691 is coupled to the connection node of the resistor 1692 and the capacitor 1693 through the resistor 1696. Alternatively, both of the resistor 1696 and the capacitor 1697 are omitted and the end of the symmetrical trigger diode 1691 is directly coupled to the connection node of the resistor 1692 and the capacitor 1693. Therefore, the resistor 1696 and the capacitor 1697 are depicted by dotted lines. The other end of the symmetrical trigger diode 1691 is coupled to a control end of the TRIAC 1699 of the switch circuit 1690*b*. The symmetrical trigger diode 1691 determines whether to generate a control signal 1695 to trigger the TRIAC 1699 on according to a level of a received signal. A first end of the TRIAC 1699 is coupled to the switch terminal 1591 and a second end thereof is coupled to the switch terminal through the inductor 1694. The inductor 1694 is used to protect the TRIAC 1699 from damage due to a situation where the signal transmitted into the switch terminals 1591 and 1592 is over a maximum rate of rise of Commutation Voltage, a peak repetitive forward (off-state) voltage or a maximum rate of change of current.

When the switch terminals 1591 and 1592 receive a low frequency signal or a DC signal, the detection signal generated by the capacitor 1698 is high enough to make the symmetrical trigger diode 1691 generate the control signal 1695 to trigger the TRIAC 1699 on. At the same time, the switch terminals 1591 and 1592 are shorted to bypass the circuit(s) connected in parallel with the switch circuit 1690*b*, such as a circuit coupled between the switch terminals 1591 and 1592, the detection circuit 1690*a* and the capacitor 1698.

In some embodiments, when the switch terminals 1591 and 1592 receive a high frequency AC signal, the detection signal generated by the capacitor 1698 is not high enough to make the symmetrical trigger diode 1691 generate the control signal 1695 to trigger the TRIAC 1699 on. At the same time, the TRIAC 1699 is cut off and so the high frequency AC signal is mainly transmitted through external circuit or the detection circuit 1690*a*.

Hence, the ballast detection circuit 1690 can determine whether the input signal is a high frequency AC signal provided by an electric ballast. If yes, the high frequency AC signal is transmitted through the external circuit or the detection circuit 1690*a*; if no, the input signal is transmitted through the switch circuit 1690*b*, bypassing the external circuit and the detection circuit 1690*a*.

It is worth noting that the capacitor 1698 may be replaced by external capacitor(s), such as at least one capacitor in the terminal adapter circuits shown in FIG. 31A-C. Therefore, the capacitor 1698 may be omitted and be therefore depicted by a dotted line.

Figure 42E:
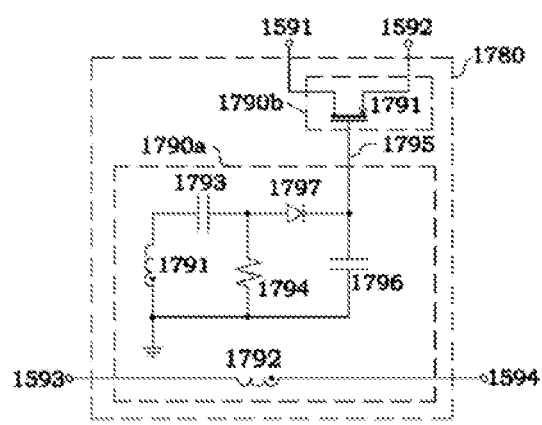
FIG. 42E is a schematic diagram of a ballast detection circuit according to some embodiments.

FIG. 42E is a schematic diagram of a ballast detection circuit according to an embodiment. The ballast detection circuit 1790 comprises a detection circuit 1790*a* and a switch circuit 1790*b*. The switch circuit 1790*b* is coupled between the switch terminals 1591 and 1592. The detection circuit 1790*a* is coupled between the detection terminals 1593 and 1594. The detection circuit 1790*a* comprises inductors 1791 and 1792 with mutual induction, capacitor 1793 and 1796, a resistor 1794 and a diode 1797. The switch circuit 1790*b* comprises a switch 1799. In the present embodiment, the switch 1799 is a P-type Depletion Mode MOSFET, which is cut off when the gate voltage is higher than a threshold voltage and conducted when the gate voltage is lower than the threshold voltage.

The inductor 1792 is coupled between the detection terminals 1593 and 1594 and induces a detection voltage in the inductor 1791 based on a current signal flowing through the detection terminals 1593 and 1594. The level of the detection voltage is varied with the frequency of the current signal, and may be increased with the increasing of that frequency and reduced with the decreasing of that frequency.

In some embodiments, when the signal is a high frequency signal, the inductive reactance of the inductor 1792 is quite high and so the inductor 1791 induces the detection voltage with a quite high level. When the signal is a low frequency signal or a DC signal, the inductive reactance of the inductor 1792 is quite low and so the inductor 1791 induces the detection voltage with a quite high level. One end of the inductor 1791 is grounded. The serially connected capacitor 1793 and resistor 1794 is connected in parallel with the inductor 1791. The capacitor 1793 and resistor 1794 receive the detection voltage generated by the inductor 1791 and filter a high frequency component of the detection voltage to generate a filtered detection voltage. The filtered detection voltage charges the capacitor 1796 through the diode 1797 to generate a control signal 1795. Due to the diode 1797 providing a one-way charge for the capacitor 1796, the level of control signal generated by the capacitor 1796 is the maximum value of the detection voltage. The capacitor 1796 is coupled to the control end of the switch 1799. First and second ends of the switch 1799 are respectively coupled to the switch terminals 1591 and 1592.

When the signal received by the detection terminal 1593 and 1594 is a low frequency signal or a DC signal, the control signal 1795 generated by the capacitor 1796 is lower than the threshold voltage of the switch 1799 and so the switch 1799 are conducted. At the same time, the switch terminals 1591 and 1592 are shorted to bypass the external circuit(s) connected in parallel with the switch circuit 1790*b*, such as the least one capacitor in the terminal adapter circuits show in FIG. 31A-c.

When the signal received by the detection terminal 1593 and 1594 is a high frequency signal, the control signal 1795 generated by the capacitor 1796 is higher than the threshold voltage of the switch 1799 and so the switch 1799 are cut off. At thesame time, the high frequency signal is transmitted by the external circuit(s).

Hence, the ballast detection circuit 1790 can determine whether the input signal is a high frequency AC signal provided by an electric ballast. If yes, the high frequency AC signal is transmitted through the external circuit(s); if no, the input signal is transmitted through the switch circuit 1790*b*, bypassing the external circuit.

Next, exemplary embodiments of the conduction (bypass) and cut off (not bypass) operations of the switch circuit in the ballast detection circuit of an LED lamp will be illustrated. For example, the switch terminals 1591 and 1592 are coupled to a capacitor connected in series with the LED lamp, e.g., a signal for driving the LED lamp also flows through the capacitor. The capacitor may be disposed inside the LED lamp to be connected in series with internal circuit(s) or outside the LED lamp to be connected in series with the LED lamp. Referring to FIG. 29A or 29C, the AC power supply 508 provides a low voltage and low frequency AC driving signal as an external driving signal to drive the LED tube lamp 500 while the lamp driving circuit 505 does not exist. At this moment, the switch circuit of the ballast detection circuit is conducted, and so the alternative driving signal is provided to directly drive the internal circuits of the LED tube lamp 500. When the lamp driving circuit 505 exists, the lamp driving circuit 505 provides a high voltage and high frequency AC driving signal as an external driving signal to drive the LED tube lamp 500. At this moment, the switch circuit of the ballast detection circuit is cut off, and so the capacitor is connected in series with an equivalent capacitor of the internal circuit(s) of the LED tube lamp for forming a capacitive voltage divider network. Thereby, a division voltage applied in the internal circuit(s) of the LED tube lamp is lower than the high voltage and high frequency AC driving signal, e.g.: the division voltage is in a range of 100-270V, and so no over voltage causes the internal circuit (s) damage. Alternatively, the switch terminals 1591 and 1592 is coupled to the capacitor(s) of the terminal adapter circuit shown in FIG. 31A to FIG. 31C to have the signal flowing through the half-wave node as well as the capacitor (s), e.g., the capacitor 642 in FIG. 31A, or the capacitor 842 in FIG. 31C. When the high voltage and high frequency AC signal generated by the lamp driving circuit 505 is input, the switch circuit is cut off and so the capacitive voltage divider is performed; and when the low frequency AC signal of the commercial power or the direct current of battery is input, the switch circuit bypasses the capacitor(s).

It is worth noting that the switch circuit may have plural switch unit to have two or more switch terminal for being connected in parallel with plural capacitors, (e.g., the capacitors 645 and 645 in FIG. 31A, the capacitors 643, 645 and 646 in FIG. 31A, the capacitors 743 and 744 or/and the capacitors 745 and 746 in FIG. 30B, the capacitors 843 and 844 in FIG. 31C, the capacitors 845 and 846 in FIG. 31C, the capacitors 842, 843 and 844 in FIG. 31C, the capacitors 842, 845 and 846 in FIG. 31C, and the capacitors 842, 843, 844, 845 and 846 in FIG. 31C) for bypassing the plural capacitor.

In addition, the ballast detection circuit can be used in conjunction with the mode switching circuits shown in FIG. 37A-37I. The switch circuit of the ballast detection circuit is replaced with the mode switching circuit. The detection circuit of the ballast detection circuit is coupled to one of the pins 501, 502, 503 and 504 for detecting the signal input into the LED lamp through the pins 501, 502, 503 and 504. The detection circuit generates a control signal to control the mode switching circuit being at the first mode or the second mode according to whether the signal is a high frequency, low frequency or DC signal, i.e., the frequency of the signal.

For example, when the signal is a high frequency signal and higher than a defined mode switch frequency, such as the signal provided by the lamp driving circuit 505, the control signal generated by the detection circuit makes the mode switching circuit be at the second mode for directly inputting the filtered signal into the LED module. When the signal is a low frequency signal or a direct signal and lower than the defined mode switch frequency, such as the signal provided by the commercial power or the battery, the control signal generated by the detection circuit makes the mode switching circuit be at the first mode for directly inputting the filtered signal into the driving circuit.

Figure 43A:
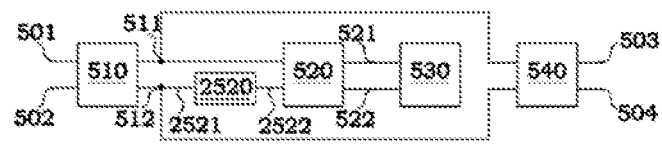
FIG. 43A is a block diagram of an LED tube lamp according to some embodiments.

Referring to FIG. 43A, a block diagram of an LED tube lamp in accordance with a preferred embodiment is illustrated. Compared to that shown in FIG. 29D, the present embodiment comprises two rectifying circuits 510 and 540, a filtering circuit 520, an LED lighting module 530, and further comprises an installation detection module 2520. The installation detection module 2520 is coupled to the rectifying circuit 510 (and/or the rectifying circuit 540) via an installation detection terminal 2521 and is coupled to the filtering circuit 520 via an installation detection terminal 2522. The installation detection module 2520 detects the signal through the installation detection terminals 2521 and 2522 and determines whether cutting off an external driving signal passing through the LED tube lamp based on the detected result. When an LED tube lamp is not installed on a lamp socket or holder yet, the installation detection module 2520 detects a smaller current and determines the signal passing through a high impedance, and then it is in a cut-off state to make the LED tube lamp stop working. Otherwise, the installation detection module 2520 determines that the LED tube lamp has already been installed on the lamp socket or holder, and it keeps on conducting to make the LED tube lamp working normally. That is, when a current passing through the installation detection terminals is bigger than or equal to a defined installation current (or a current value), the installation detection module is conductive to make the LED tube lamp operating in a conductive state based on determining that the LED tube lamp has correctly been installed on the lamp socket or holder. When the current passing through the installation detection terminals is smaller than the defined installation current (or the current value), the installation detection module cuts off to make the LED tube lamp entering in a non-conducting state based on determining that the LED tube lamp has been not installed on the lamp socket or holder. For example, the installation detection module 2520 determines conducting or cutting off based on the impedance detection to make the LED tube lamp operating in conducting or entering non-conducting state. Accordingly, the problem of electric shock caused by touching the conductive part of the LED tube lamp which is incorrectly installed on the lamp socket or holder can be avoided.

Figure 43B:
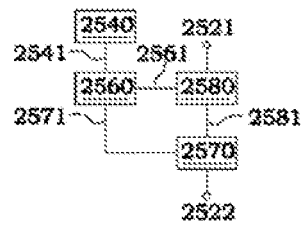
FIG. 43B is a block diagram of an installation detection module according to some embodiments.

Referring to FIG. 43B, a block diagram of an installation detection module in accordance with an exemplary embodiment is illustrated. The installation detection module includes a switch circuit 2580, a detection pulse generating module 2540, a detection result latching circuit 2560, and a detection determining circuit 2570. The detection determining circuit 2570 is coupled to and detects the signal between the installation detection terminals 2521 (through a switch circuit coupling terminal 2581 and the switch circuit 2580) and 2522. It is also coupled to the detection result latching circuit 2560 via a detection result terminal 2571 to transmit the detection result signal. The detection pulse generating module 2540 is coupled to the detection result latching circuit 2560 via a pulse signal output terminal 2541, and generates a pulse signal to inform the detection result latching circuit 2560 of a time point for latching (storing) the detection result. The detection result latching circuit 2560 stores the detection result according to the detection result signal (or detection result signal and pulse signal), and transmits or responds the detection result to the switch circuit 2580 coupled to the detection result latching circuit 2560 via a detection result latching terminal 2561. The switch circuit 2580 controls the state in conducting or cutting off between the installation detection terminals 2521 and 2522 according to the detection result.

Figure 43C:
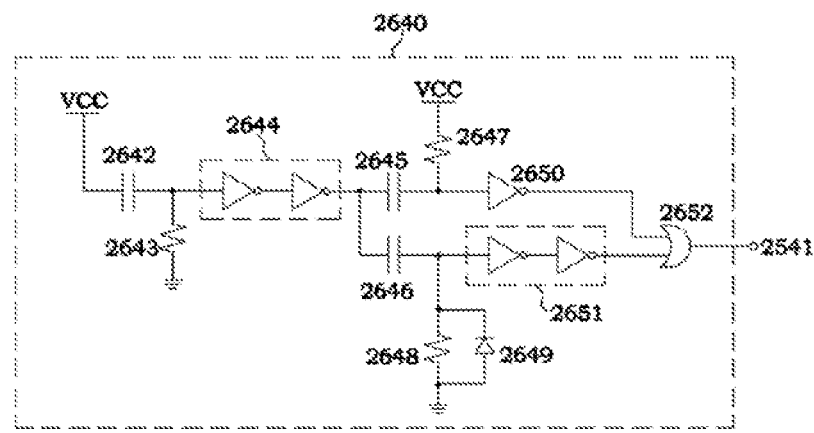
FIG. 43C is a schematic detection pulse generating module according to some embodiments.

Referring to FIG. 43C, a block diagram of a detection pulse generating module in accordance with an exemplary embodiment is illustrated. A detection pulse generating module 2640 includes multiple capacitors 2642, 2645, and 2646, multiple resistors 2643, 2647, and 2648, two buffers 2644, and 2651, an inverter 2650, a diode 2649, and an OR gate 2652. With use or operation, the capacitor 2642 and the resistor 2643 connect in serial between a driving voltage, such as VCC usually defined as a high logic level voltage, and a reference voltage (or potential), such as ground potential in this embodiment. The connection node of the capacitor 2642 and the resistor 2643 is coupled to an input terminal of the buffer 2644. The resistor 2647 is coupled between the driving voltage, so-called VCC, and an input terminal of the inverter 2650. The resistor 2648 is coupled between an input terminal of the buffer 2651 and the reference voltage, e.g. ground potential in this embodiment. An anode of the diode 2649 is grounded and a cathode thereof is coupled to the input terminal of the buffer 2651. One ends of the capacitors 2645 and 2646 are jointly coupled to an output terminal of the buffer 2644, the other ends of the capacitors 2645 and 2646 are respectively coupled to the input terminal of the inverter 2650 and the input terminal of the buffer 2651. An output terminal of the inverter 2650 and an output terminal of the buffer 2651 are coupled to two input terminals of the OR gate 2652. It's noteworthy that the voltage (or potential) for "high logic level" and "low logic level" mentioned in this specification are all relative to another voltage (or potential) or a certain referred voltage (or potential) in circuits, and further the voltage (or potential) for "logic high logic level" and "logic low logic level."

When an end cap of an LED tube lamp inserts a lamp socket and the other end cap thereof is electrically coupled to human body or both end caps of the LED tube lamp insert the lamp socket, the LED tube lamp is conductive with electricity. At this moment, the installation detection module enters a detection stage. The voltage on the connection node of the capacitor 2642 and the resistor 2643 is high initially (equals to the driving voltage, VCC) and decreases with time to zero finally. The input terminal of the buffer 2644 is coupled to the connection node of the capacitor 2642 and the resistor 2643, so the buffer 2644 outputs a high logic level signal at the beginning and changes to output a low logic level signal when the voltage on the connection node of the capacitor 2642 and the resistor 2643 decreases to a low logic trigger logic level. That means, the buffer 2644 produces an input pulse signal and then keeps in low logic level thereafter (stops outputting the input pulse signal). The pulse-width for the input pulse signal is equal to one (initial setting) specific duration keeping the signal level of the input pulse signal on a logic high level, which is decided by the capacitance value of the capacitor 2642 and the resistance value of the resistor 2643.

Next, the operations for the buffer 2644 to produce the pulse signal with setting the time interval will be described below. Since the voltage on the one ends of the capacitor 2645 and the resistor 2647 is equal to the driving voltage VCC, the voltage on the connection node of the capacitor 2645 and the resistor 2647 is also at a high logic level. The one end of the resistor 2648 is grounded and the one end of the capacitor 2646 receives the pulse signal from the buffer 2644, so the connection node of the capacitor 2646 and the resistor 2648 has a high logic level voltage at the beginning but this voltage decreases with time to zero (in the meanwhile, the capacitor stores the voltage being equal to or approaching the driving voltage VCC.) Accordingly, the inverter 2650 outputs a low logic level signal and the buffer 2651 outputs a high logic level signal, and hence the OR gate 2652 outputs a high logic level signal (a first pulse signal) at the pulse signal output terminal 2541. At this moment, the detection result latching circuit 2560 stores the detection result for the first time according to the detection result signal and the pulse signal. When the voltage on the connection node of the capacitor 2646 and the resistor 2648 decreases to the low logic trigger logic level, the buffer 2651 changes to output a low logic level signal to make the OR gate 2652 output a low logic level signal at the pulse signal output terminal 2541 (stops outputting the first pulse signal.) The width of the first pulse signal output from the OR gate 2652 is determined by the capacitance value of the capacitor 2646 and the resistance value of the resistor 2648.

The operation after the buffer 2644 stopping outputting the pulse signal is described as below. That is, the operation is in an operating stage. Since the capacitor 2646 stores the voltage being almost equal to the driving voltage VCC, and when the buffer 2644 instantaneously changes its output from a high logic level signal to a low logic level signal, the voltage on the connection node of the capacitor 2646 and the resistor 2648 is below zero but will be pulled up to zero by the diode 2649 rapidly charging the capacitor. Therefore, the buffer 2651 still outputs a low logic level signal.

On the other hand, when the buffer 2644 instantaneously changes its output from a high logic level signal to a low logic level signal, the voltage on the one end of the capacitor 2645 also changes from the driving voltage VCC to zero instantly. This makes the connection node of the capacitor 2645 and the resistor 2647 have a low logic level signal. At this moment, the output of the inverter 2650 changes to a high logic level signal to make the OR gate output a high logic level signal (a second pulse signal.) The detection result latching circuit 2560 stores the detection result for second time according to the detection result signal and the pulse signal. Next, the driving voltage VCC charges the capacitor 2645 through the resistor 2647 to make the voltage on the connection node of the capacitor 2645 and the resistor 2647 increases with the time to the driving voltage VCC. When the voltage on the connection node of the capacitor 2645 and the resistor 2647 increases to reach a high logic trigger logic level, the inverter 2650 outputs a low logic level signal again to make the OR gate 2652 stop outputting the second pulse signal. The width of the second pulse signal is determined by the capacitance value of the capacitor 2645 and the resistance value of the resistor 2647.

As those mentioned above, the detection pulse generating module 2640 generates two high logic level pulse signals in the detection stage, which are the first pulse signal and the second pulse signal and are output from the pulse signal output terminal 2541. Moreover, there is an interval with a defined time between the first and second pulse signals, and the defined time is decided by the capacitance value of the capacitor 2642 and the resistance value of the resistor 2643.

Figure 43D:
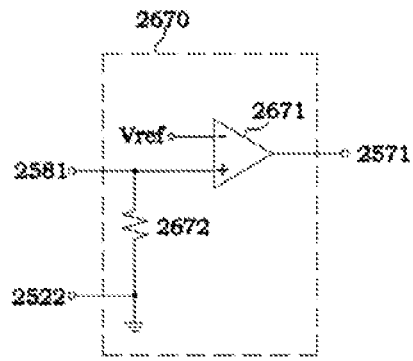
FIG. 43D is a schematic detection determining circuit according to some embodiments.

From the detection stage entering the operating stage, the detection pulse generating module 2640 does not produce the pulse signal any more, and keeps the pulse signal output terminal 2541 on a low logic level potential. Referring to FIG. 43D, a detection determining circuit in accordance with an exemplary embodiment is illustrated. A detection determining circuit 2670 includes a comparator 2671, and a resistor 2672. A negative input terminal of the comparator 2671 receives a reference logic level signal (or a reference voltage) Vref, a positive input terminal thereof is grounded through the resistor 2672 and is also coupled to a switch circuit coupling terminal 2581. Referring to FIGS. 43A and 43D, the signal flowing into the switch circuit 2580 from the installation detection terminal 2521 outputs to the switch circuit coupling terminal 2581 via the resistor 2672. When the current of the signal passing through the resistor 2672 is too big (that is, bigger than or equal to a defined current for installation, e.g. 2A) and this makes the voltage on the resistor 2672 bigger than the reference voltage Vref (referring to two end caps inserting into the lamp socket) the comparator 2671 produces a high logic level detection result signal and outputs it to the detection result terminal 2571. For example, when an LED tube lamp is correctly installed on a lamp socket, the comparator 2671 outputs a high logic level detection result signal at the detection result terminal 2571, whereas the comparator 2671 generates a low logic level detection result signal and outputs it to the detection result terminal 2571 when a current passing through the resistor 2672 is insufficient to make the voltage on the resistor 2672 higher than the reference voltage Vref (referring to only one end cap inserting the lamp socket.) For example, when the LED tube lamp is incorrectly installed on the lamp socket or one end cap thereof is inserted into the lamp socket but the other one is grounded by a human body, the current will be too small to make the comparator 2671 output a low logic level detection result signal to the detection result terminal 2571.

Figure 43E:
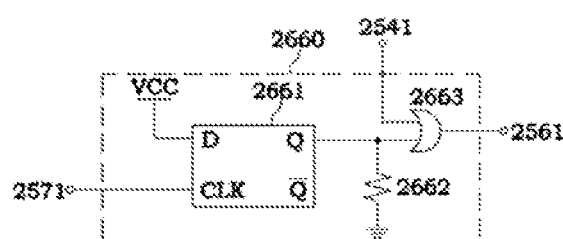
FIG. 43E is a schematic detection result latching circuit according to some embodiments.

Referring to FIG. 43E, a schematic detection result latching circuit according to some embodiments is illustrated. A detection result latching circuit 2660 includes a D flip-flop 2661, a resistor 2662, and an OR gate 2663. The D flip-flop 2661 has a CLK input terminal coupled to a detection result terminal 2571, and a D input terminal coupled to a driving voltage VCC. When the detection result terminal 2571 outputs a low logic level detection result signal, the D flip-flop 2661 outputs a low logic level signal at a Q output terminal thereof, but the D flip-flop 2661 outputs a high logic level signal at the Q output terminal thereof when the detection result terminal 2571 outputs a high logic level detection result signal. The resistor 2662 is coupled between the Q output terminal of the D flip-flop 2661 and a reference voltage, such as ground potential. When the OR gate 2663 receives the first or second pulse signals from the pulse signal output terminal 2541 or receives a high logic level signal from the Q output terminal of the D flip-flop 2661, the OR gate 2663 outputs a high logic level detection result latching signal at a detection result latching terminal 2561. The detection pulse generating module 2640 only in the detection stage outputs the first and the second pulse signals to make the OR gate 2663 output the high logic level detection result latching signal, and the D flip-flop 2661 decides the detection result latching signal to be high logic level or low logic level in the rest time, e.g. including the operating stage after the detection stage. Accordingly, when the detection result terminal 2571 has no a high logic level detection result signal, the D flip-flop 2661 keeps a low logic level signal at the Q output terminal to make the detection result latching terminal 2561 also keeping a low logic level detection result latching signal in the operating stage. On the contrary, once the detection result terminal 2571 having a high logic level detection result signal, the D flip-flop 2661 stores it and outputs and keeps a high logic level signal at the Q output terminal. In this way, the detection result latching terminal 2561 keeps a high logic level detection result latching signal in the operating stage as well.

Figure 43F:
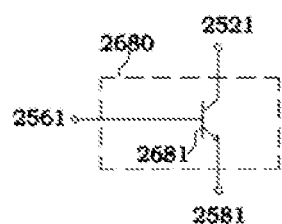
FIG. 43F is a schematic switch circuit according to some embodiments.

Referring to FIG. 43F, a schematic switch circuit according to some embodiments is illustrated. A switch circuit 2680 includes a transistor, such as a bipolar junction transistor (BJT) 2681, as being a power transistor, which has the ability of dealing with high current/power and is suitable for the switch circuit. The BJT 2681 has a collector coupled to an installation detection terminal 2521, a base coupled to a detection result latching terminal 2561, and an emitter coupled to a switch circuit coupling terminal 2581. When the detection pulse generating module 2640 produces the first and second pulse signals, the BJT 2681 is in a transient conduction state. This allows the detection determining circuit 2670 to perform the detection for determining the detection result latching signal to be high logic level or low logic level. When the detection result latching circuit 2660 outputs a high logic level detection result latching signal at the detection result latching terminal 2561, the BJT 2681 is in the conducting state to make the installation detection terminals 2521 and 2522 conducting. In contrast, when the detection result latching circuit 2660 outputs a low logic level detection result latching signal at the detection result latching terminal 2561, the BJT 2681 is cutting-off or in the blocking state to make the installation detection terminals 2521 and 2522 cutting-off or blocking.

The external driving signal is an AC signal. To avoid the detection error resulted from the logic level of the external driving signal being just around zero when the detection determining circuit 2670 detects, the detection pulse generating module 2640 generates the first and second pulse signals to let the detection determining circuit 2670 performing twice detections. Consequently, the problem of the logic level of the external driving signal being just around zero in single detection can be avoided. In some embodiments, the time difference between the productions of the first and second pulse signals is not multiple times of half one cycle of the external driving signal. For example, it does not correspond to the multiple phase differences in 180 degrees of the external driving signal. In this way, when one of the first and second pulse signals is generated and unfortunately the external driving signal is around zero, it can be avoided that the external driving signal is also around zero as another being generated.

The time difference between the productions of the first and second pulse signals, for example, an interval with a defined time between them can be represented as following:

Interval=$(X+Y)(T/2)$, where T represents the cycle of external driving signal, X is a natural number, $0<Y<1$, and Y is in the range of 0.05-0.95. In some embodiments, Y may be in the range of from 0.15 to 0.85.

To prevent the installation detection module from entering the detection stage from misjudgment resulting from the logic level of the driving voltage VCC being too small, the first pulse signal can be set to be produced when the driving voltage VCC reaches or is higher than a defined logic level. For example, in certain embodiments, the detection determining circuit 2670 works after the driving voltage VCC reaches a threshold logic level to prevent the installation detection module from malfunctioning due to an insufficient logic level.

According to certain embodiments mentioned above, when one end cap of an LED tube lamp is inserted into a lamp socket and the other one floats or electrically couples to a human body, the detection determining circuit outputs a low logic level detection result signal because of high impedance. The detection result latching circuit stores the low logic level detection result signal based on the pulse signal of the detection pulse generating module, making it as the low logic level detection result latching signal, and keeps the detection result in the operating stage. In this way, the switch circuit keeps cutting-off or blocking instead of conducting continually. And further, the electric shock situation can be prevented and the requirement of safety standard can also be met. On the other hand, when two end caps of the LED tube lamp are correctly inserted into the lamp socket, the detection determining circuit outputs a high logic level detection result signal because the impedance of the circuit for the LED tube lamp itself is small. The detection result latching circuit stores the high logic level detection result signal based on the pulse signal of the detection pulse generating module, making it as the high logic level detection result latching signal, and keeps the detection result in the operating stage. Thus, the switch circuit keeps conducting to make the LED tube lamp work normally in the operating stage.

In some embodiments, when one end cap of the LED tube lamp is inserted into the lamp socket and the other one floats or electrically couples to a human body, the detection determining circuit outputs a low logic level detection result signal to the detection result latching circuit, and then the detection pulse generating module outputs a low logic level signal to the detection result latching circuit to make the detection result latching circuit output a low logic level detection result latching signal to make the switch circuit cutting-off or blocking. Wherein, the switch circuit blocking makes the installation detection terminals, e.g. the first and second installation detection terminals, blocking. That is, the LED tube lame is in non-conducting or blocking state.

However, in some embodiments, when two end caps of the LED tube lamp are correctly inserted into the lamp socket, the detection determining circuit outputs a high logic level detection result signal to the detection result latching circuit to make the detection result latching circuit output a high logic level detection result latching signal to make the switch circuit conducting. Wherein, the switch circuit conducting makes the installation detection terminals, e.g. the first and second installation detection terminals, conducting. That is, the LED tube lame operates in conducting state.

It is worth noting that in certain embodiments, the width of the pulse signal generated by the detection pulse generating module is between 10 us to 1 ms, and it is used to make the switch circuit conducting for a short period when the LED tube lamp conducts instantaneously. In this case, a pulse current is generated to pass through the detection determining circuit for detecting and determining. Since the pulse is for a short time and not for a long time, the electric shock situation will not occur. Furthermore, the detection result latching circuit also keeps the detection result in the operating stage, and is no longer changing the detection result stored previously complying with the circuit state changing. The problem resulting from changing the detection result may be avoided. The installation detection module, such as the switch circuit, the detection pulse generating module, the detection result latching circuit, and the detection determining circuit, could be integrated into a chip and then embedded in circuits for saving the circuit cost and layout space.

The LED tube lamps according to various different embodiments are described as above. With respect to an entire LED tube lamp, the features mentioned herein and in the embodiment may be applied in practice singly or integrally such that one or more of the mentioned features is practiced or simultaneously practiced.

According to certain embodiments of the power supply module, the external driving signal may be low frequency AC signal (e.g., commercial power), high frequency AC signal (e.g., that provided by a ballast), or a DC signal (e.g., that provided by a battery), input into the LED tube lamp through a drive architecture of single-end power supply or dual-end power supply. For the drive architecture of dual-end power supply, the external driving signal may be input by using only one end thereof as single-end power supply.

The LED tube lamp may omit the rectifying circuit when the external driving signal is a DC signal.

According to certain embodiments of the rectifying circuit in the power supply module, there may be a signal rectifying circuit, or dual rectifying circuit. First and second rectifying circuits of the dual rectifying circuit are respectively coupled to the two end caps disposed on two ends of the LED tube lamp. The single rectifying circuit is applicable to the drive architecture of signal-end power supply, and the dual rectifying circuit is applicable to the drive architecture of dual-end power supply. Furthermore, the LED tube lamp having at least one rectifying circuit is applicable to the drive architecture of low frequency AC signal, high frequency AC signal or DC signal.

The single rectifying circuit may be a half-wave rectifier circuit or full-wave bridge rectifying circuit. The dual rectifying circuit may comprise two half-wave rectifier circuits, two full-wave bridge rectifying circuits or one half-wave rectifier circuit and one full-wave bridge rectifying circuit.

According to certain embodiments of the pin in the power supply module, there may be two pins in a single end (the other end has no pin), two pins in corresponding end of two ends, or four pins in corresponding end of two ends. The designs of two pins in single end two pins in corresponding end of two ends are applicable to signal rectifying circuit design of the of the rectifying circuit. The design of four pins in corresponding end of two ends is applicable to dual rectifying circuit design of the of the rectifying circuit, and the external driving signal can be received by two pins in only one end or in two ends. And the pins may alternatively be called input terminals.

According to certain embodiments of the filtering circuit of the power supply module, there may be a single capacitor, or n filter circuit. The filtering circuit filers the high frequency component of the rectified signal for providing a DC signal with a low ripple voltage as the filtered signal. The filtering circuit also further comprises the LC filtering circuit having a high impedance for a specific frequency for conforming to current limitations in specific frequencies of the UL standard. Moreover, the filtering circuit according to some embodiments further comprises a filtering unit coupled between a rectifying circuit and the pin(s) for reducing the EMI.

According to certain embodiments of the LED lighting module in some embodiments, the LED lighting module may comprise the LED module and the driving circuit, or only the LED module. The LED module is coupled to a voltage stabilization circuit for preventing the LED module from overvoltage. The voltage stabilization circuit may be a voltage clamping circuit, such as Zener diode, DIAC and so on. When the rectifying circuit has a capacitive circuit, in some embodiments, two capacitors are respectively coupled between corresponding two pins in two end caps and so the two capacitors and the capacitive circuit as a voltage stabilization circuit perform a capacitive voltage divider.

If there are only the LED module in the LED lighting module and the external driving signal is a high frequency AC signal, a capacitive circuit is in at least one rectifying circuit and the capacitive circuit is connected in series with a half-wave rectifier circuit or a full-wave bridge rectifying circuit of the rectifying circuit and serves as a current modulation circuit to modulate the current of the LED module due to that the capacitor equates a resistor for a high frequency signal. Thereby, even different ballasts provide high frequency signals with different voltage levels, the current of the LED module can be modulated into a defined current range for preventing overcurrent. In addition, an energy-releasing circuit is connected in parallel with the LED module. When the external driving signal is no longer supplied, the energy-releasing circuit releases the energy stored in the filtering circuit to lower a resonance effect of the filtering circuit and other circuits for restraining the flicker of the LED module.

In some embodiments, if there are the LED module and the driving circuit in the LED lighting module, the driving circuit may be a buck converter, a boost converter, or a buck-boost converter. The driving circuit stabilizes the current of the LED module at a defined current value, and the defined current value may be modulated based on the external driving signal. For example, the defined current value may be increased with the increasing of the level of the external driving signal and reduced with the reducing of the level of the external driving signal. Moreover, a mode switching circuit may be added between the LED module and the driving circuit for switching the current from the filtering circuit directly or through the driving circuit inputting into the LED module.

A protection circuit may be additionally added to protect the LED module. The protection circuit detects the current and/or the voltage of the LED module to determine whether to enable corresponding over current and/or over voltage protection.

According to certain embodiments of the ballast detection circuit of the power supply module, the ballast detection circuit is substantially connected in parallel with a capacitor connected in series with the LED module and determines the external driving signal whether flowing through the capacitor or the ballast detection circuit (i.e. bypassing the capacitor) based on the frequency of the external driving signal. The capacitor may be a capacitive circuit in the rectifying circuit.

According to certain embodiments of the filament-simulating circuit of the power supply module, there is a single set of a parallel-connected capacitor and resistor, two serially connected sets, each having a parallel-connected capacitor and resistor, or a negative temperature coefficient circuit. The filament-simulating circuit is applicable to program-start ballast for avoiding the program-start ballast determining the filament abnormally, and so the compatibility of the LED tube lamp with program-start ballast is enhanced. Furthermore, the filament-simulating circuit almost does not affect the compatibilities for other ballasts, e.g., instant-start and rapid-start ballasts.

According to certain embodiments of the ballast-compatible circuit of the power supply module in some embodiments, the ballast-compatible circuit can be connected in series with the rectifying circuit or connected in parallel with the filtering circuit and the LED lighting module. Under the design of being connected in series with the rectifying circuit, the ballast-compatible circuit is initially in a cutoff state and then changes to a conducting state in an objective delay. Under the design of being connected in parallel with the filtering circuit and the LED lighting module, the ballast-compatible circuit is initially in a conducting state and then changes to a cutoff state in an objective delay. The ballast-compatible circuit activates electronic ballast during the starting stage and enhances the compatibility for instant-start ballast. Furthermore, the ballast-compatible circuit almost does not affect the compatibilities with other ballasts, e.g., program-start and rapid-start ballasts.

According to certain embodiments of the LED module of the power supply module, the LED module comprises a plurality of strings of LEDs connected in parallel with each other, wherein each LED may have a single LED chip or plural LED chips emitting different spectrums. Each LEDs in different LED strings is connected with each other to form a mesh connection.

Having described at least one of the embodiments with reference to the accompanying drawings, it will be apparent to those skills in the art that the disclosure is not limited to those precise embodiments, and that various modifications and variations can be made in the presently disclosed system without departing from the scope or spirit of the disclosure. It is intended that the present disclosure cover modifications and variations of this disclosure provided they come within the scope of the appended claims and their equivalents. Specifically, one or more limitations recited throughout the specification can be combined in any level of details to the extent they are described to improve the LED tube lamp. These limitations include, but are not limited to: light transmissive portion and reinforcing portion; platform and bracing structure; vertical rib, horizontal rib and curvilinear rib; thermally conductive plastic and light transmissive plastic; silicone-based matrix having good thermal conductivity; anti-reflection layer; roughened surface; electrically conductive wiring layer; wiring protection layer; ridge; maintaining stick; and shock-preventing safety switch.

While various aspects of the inventive concept have been described with reference to exemplary embodiments, it will be apparent to those skilled in the art that various changes and modifications may be made without departing from the spirit and scope of the inventive concept. Therefore, it should be understood that the disclosed embodiments are not limiting, but illustrative.

What is claimed is:
1. An LED tube lamp, comprising:
a glass lamp tube;
an LED light strip disposed inside the glass lamp tube and comprising a mounting region and a connecting region, a plurality of LED light sources mounted on the mounting region and two first connecting pads arranged on the connecting region, the plurality of LED light sources constituting an LED module;

a fixing structure disposed inside the glass lamp tube and extending along the longitudinal direction of the glass lamp tube, the fixing structure comprising a first end fixedly connected to the inner circumferential surface of the glass lamp tube and a second end fixedly connected to the LED light strip; and a power supply module comprising
- a circuit board separate from the LED light strip, the circuit board electrically connecting to the LED light strip and stacked with a portion of the connecting region in a radial direction of the glass lamp tube;
- a first rectifying circuit, coupled to a first pin and a second pin, which are coupled to a first end of the glass lamp tube, and configured to rectify an external driving signal transmitted from the first pin and/or the second pin;
- a second rectifying circuit coupled to a third pin coupled to a second end of the glass lamp tube, and configured to rectify the external driving signal with the first rectifying circuit;
- a filtering circuit, coupled to the first rectifying circuit and configured to filter the rectified signal; and
- a driving circuit coupled to the filtering circuit, and configured to receive a filtered signal from the filtering circuit and drive the LED module to emit light when performing a first driving mode, wherein the driving circuit does not drive the LED module to emit light when performing a second driving mode under which the LED module is driven to emit light by the filtered signal, wherein when performing the first driving mode, the external driving signal is a low frequency signal input and transmitted through the first and second pins, and when performing the second driving mode, the external driving signal is a high frequency signal input and transmitted through one of the first and second pins and the third pin across the two ends of the glass lamp tube, wherein the LED light strip further comprises a wiring layer, and the plurality of LED light sources are mounted on the wiring layer, and wherein the LED light strip further comprises a protection layer disposed on a first surface of the wiring layer and the plurality of LED light sources are mounted on the first surface of the wiring layer.

2. The LED tube lamp of claim 1, wherein the external driving signal as a low frequency signal is a signal having a frequency between 0 and 60 Hz.

3. The LED tube lamp of claim 1, wherein the external driving signal as a low frequency signal is from an AC power line and is not provided by an electrical ballast.

4. The LED tube lamp of claim 1, wherein the external driving signal as a high frequency signal is provided by an electrical ballast.

5. The LED tube lamp of claim 1, wherein the power supply module further comprises a mode switching circuit, coupled to the filtering circuit and the driving circuit, and configured to determine whether to perform the first driving mode or the second driving mode.

6. The LED tube lamp of claim 1, wherein the power supply module further comprises a mode switching circuit coupled to the two rectifying circuits and the driving circuit, and configured to cause the rectified signal or the filtered signal to be used by the driving circuit when performing the first driving mode.

7. The LED tube lamp of claim 1, wherein the driving circuit includes a controller, a switching circuit, and an energy storage circuit coupled to the switching circuit, and the controller is configured for determining when to turn the switching circuit on or off according to a detection signal.

8. The LED tube lamp of claim 7, wherein when performing the first driving mode the mode switching circuit is switched such that current flows through the driving circuit, allowing the controller to turn on the switching circuit to supply current to the LED module for emitting light.

9. The LED tube lamp of claim 7, wherein when performing the second driving mode, the mode switching circuit is switched such that the driving circuit causes the controller to turn off the switching circuit.

10. The LED tube lamp of claim 1, wherein the filtered signal bypasses the driving circuit to drive the LED module to emit light when performing the second driving mode.

11. An LED tube lamp, comprising:
- a glass lamp tube;
- an LED light strip disposed inside the glass lamp tube and comprising a mounting region and a connecting region, a plurality of LED light sources mounted on the mounting region and two first connecting pads arranged on the connecting region, the plurality of LED light sources constituting an LED module;
- a fixing structure disposed inside the glass lamp tube and extending along the longitudinal direction of the glass lamp tube, the fixing structure comprising a first end fixedly connected to the inner circumferential surface of the glass lamp tube and a second end fixedly connected to the LED light strip; and
- a power supply module comprising:
  - a circuit board separate from the LED light strip, the circuit board electrically connecting to the LED light strip and stacked with a portion of the connecting region in a radial direction of the glass lamp tube;
  - a first rectifying circuit, coupled to a first pin and a second pin, which are coupled to a first end of the glass lamp tube, and configured to rectify an external driving signal transmitted from the first pin and/or the second pin;
  - a second rectifying circuit coupled to a third pin coupled to a second end of the glass lamp tube, and configured to rectify the external driving signal with the first rectifying circuit;
  - an adapter circuit, coupled to the second rectifying circuit and the third pin, and configured for enabling the LED tube lamp to operate to emit light when the LED tube lamp is being powered by the external driving signal input and transmitted through one of the first and second pins and the third pin across the two ends of the glass lamp tube;
  - a filtering circuit, coupled to the first rectifying circuit and configured to filter the rectified signal; and
  - a driving circuit coupled to the filtering circuit, and configured to receive a filtered signal from the filtering circuit and drive the LED module to emit light when performing a first driving mode, wherein the driving circuit does not drive the LED module to emit light when performing a second driving mode under which the LED module is driven to emit light by the filtered signal, wherein when performing the first driving mode, the external driving signal is a low frequency signal input and transmitted through the first and second pins, and when performing the second driving mode, the external driving signal is a high frequency signal input and transmitted through one of the first and second pins and the third pin across the two ends of the glass lamp tube, wherein the LED light strip further comprises a wiring layer, and the plurality of LED light sources are mounted on the wiring layer, and wherein the LED light strip further comprises a protection layer disposed on a first surface of the wiring layer and the plurality of LED light sources are mounted on the first surface of the wiring layer.

12. The LED tube lamp of claim 11, wherein the external driving signal as a low frequency signal is a signal having a frequency between 0 and 60 Hz.

13. The LED tube lamp of claim 11, wherein the external driving signal as a low frequency signal is from an AC powerline and is not provided by an electrical ballast.

14. The LED tube lamp of claim 11, wherein the external driving signal as a high frequency signal is provided by an electrical ballast.

15. The LED tube lamp of claim 11, wherein the power supply module further comprises a mode switching circuit, coupled to the filtering circuit and the driving circuit, and configured to determine whether to perform the first driving mode or the second driving mode.

16. The LED tube lamp of claim 11, wherein the driving circuit includes a controller, a switching circuit, and an energy storage circuit coupled to the switching circuit, and the controller is configured for determining when to turn the switching circuit on or off according to a detection signal.

17. The LED tube lamp of claim 16, wherein when performing the first driving mode the mode switching circuit is switched such that current flows through the driving circuit allowing the controller to turn on the switching circuit to supply current to the LED module for emitting light.

18. The LED tube lamp of claim 16, wherein when performing the second driving mode the mode switching circuit is switched such that the driving circuit causes the controller to turn off the switching circuit.

19. The LED tube lamp of claim 11, wherein the adapter circuit has a current-limiting function and comprises one or more of a resistor, a capacitor, an inductor, and a fuse.

20. The LED tube lamp of claim 11, wherein the adapter circuit is a mode determination circuit enabling the LED tube lamp to perform the second driving mode to emit light.

* * * * *